United States Patent
Jung

(10) Patent No.: US 11,963,054 B2
(45) Date of Patent: Apr. 16, 2024

(54) METHOD AND APPARATUS FOR PERFORMING CELL RESELECTION IN WIRELESS COMMUNICATION SYSTEM

(71) Applicant: Samsung Electronics Co., Ltd., Suwon-si (KR)

(72) Inventor: Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/821,260

(22) Filed: Mar. 17, 2020

(65) Prior Publication Data

US 2020/0305039 A1 Sep. 24, 2020

(30) Foreign Application Priority Data

Mar. 20, 2019 (KR) .......... 10-2019-0031907

(51) Int. Cl.
| | | |
|---|---|---|
| *H04W 36/00* | (2009.01) | |
| *H04W 36/30* | (2009.01) | |
| *H04W 48/08* | (2009.01) | |
| *H04W 48/16* | (2009.01) | |
| *H04W 48/18* | (2009.01) | |
| *H04W 48/20* | (2009.01) | |

(52) U.S. Cl.
CPC ... *H04W 36/0085* (2018.08); *H04W 36/0061* (2013.01); *H04W 36/00835* (2018.08); *H04W 36/00837* (2018.08); *H04W 36/30* (2013.01); *H04W 48/08* (2013.01); *H04W 48/20* (2013.01); *H04W 48/16* (2013.01); *H04W 48/18* (2013.01)

(58) Field of Classification Search
None
See application file for complete search history.

(56) References Cited

U.S. PATENT DOCUMENTS

| | | | |
|---|---|---|---|
| 2010/0222060 A1* | 9/2010 | Zhang | H04W 36/30 455/436 |
| 2014/0004862 A1 | 1/2014 | Ekemark | |
| 2015/0264618 A1 | 9/2015 | Jung et al. | |
| 2017/0013551 A1* | 1/2017 | Martin | H04W 48/20 |
| 2017/0070931 A1* | 3/2017 | Huang | H04W 36/08 |
| 2020/0015236 A1* | 1/2020 | Kung | H04B 7/04 |
| 2020/0022054 A1* | 1/2020 | Hong | H04W 36/0085 |
| 2020/0053620 A1* | 2/2020 | Kim | H04W 16/14 |
| 2020/0221372 A1* | 7/2020 | Shih | H04W 48/18 |
| 2020/0322856 A1* | 10/2020 | Wang | H04W 36/04 |
| 2020/0344628 A1* | 10/2020 | Awada | H04W 24/10 |
| 2021/0176697 A1* | 6/2021 | Lu | H04W 72/085 |
| 2022/0150776 A1* | 5/2022 | Lee | H04W 36/0072 |

OTHER PUBLICATIONS

ETSI TS 138 304 v15.6.0, Jan. 2020 (Year: 2020).*
U.S. Appl. No. 62/788,223, filed Jan. 2019 (Year: 2019).*

(Continued)

*Primary Examiner* — Jay L Vogel
(74) *Attorney, Agent, or Firm* — Jefferson IP Law, LLP

(57) ABSTRACT

A method and user equipment (UE) for performing a cell reselection procedure is provided. The method includes receiving priority information about frequencies, performing cell measurement, based on the priority information, and performing a cell reselection procedure, based on a result of the cell measurement.

10 Claims, 12 Drawing Sheets

(56) References Cited

OTHER PUBLICATIONS

ETSI TS 138 304 V15.0.0 (Sep. 2018) ("ETSI") (Year: 2018).*
3GPP; TSG RAN; NR; User Equipment (UE) procedures in Idle mode and RRC Inactive state (Release 15), sections 5.2.4-5.2.4.2, 5.2.4.6-5.2.4.7.03GPP TS 38.304 V15.2.0, Jan. 14, 2019.
Huawei et al., 'Correction to 38.304 on cell reselection in multi-beam scenario', R2-1900590, 3GPP TSG-RAN WG2 Meeting #105, Athens, Greece, Feb. 15, 2019, section 5.2.4.6.
Intel Corporation,'Clarification on rangeToBestCell, nrofSS-BlocksToAverage and abs ThreshSS- BlocksConsolidation', R2-1902095, 3GPP TSG-RAN WG2 Meeting #105, Athens, Greece, Feb. 15, 2019.
International Search Report dated Jun. 19, 2020, issued in International Application No. PCT/KR2020/003649.
Extended European Search Report dated Mar. 18, 2022, issued in a counterpart European Application No. 20773304.9.
3rd Generation Partnership Project; Technical Specification Group Radio Access Network; NR; Requirements for support of radio resource management (Release 15), 3GPP TS 38.133 V15.4.0, Jan. 17, 2019. pp. 1-876, XP051591817.
3rd Generation Partnership Project; Technical Specification Group Radio Access Network; NR; Radio Resource Control (RRC) protocol specification (Release 15),3GPP TS 38.331, Jan. 14, 2019. pp. 1-474, XP051591713.
Korean Office Action dated Aug. 22, 2023, issued in Korean Patent Application No. 10-2019-0031907.

* cited by examiner

METHOD AND APPARATUS FOR PERFORMING CELL RESELECTION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0031907, filed on Mar. 20, 2019, in the Korean Intellectual Property Office, the disclosure of which is incorporated by reference herein in its entirety.

BACKGROUND

1. Field

The disclosure relates to a method and apparatus for performing cell reselection in a wireless communication system.

2. Description of Related Art

To meet increasing demand with respect wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60-gigahertz (GHz) band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of cloud radio access network (Cloud-RAN) as the above-described big data processing technology may be an example of convergence of 5G communication technology and IoT technology.

Because various services may be provided due to the aforementioned technical features and the development of wireless communication systems, methods for effectively providing these services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for efficiently providing a service in a wireless communication system.

Additional aspects will be set forth in part in the description which follows and, in part, will be apparent from the description, or may be learned by practice of the presented embodiments.

In accordance with an aspect of the disclosure, a method, performed by a user equipment (UE), of performing a cell reselection procedure is provided. The method includes receiving priority information about frequencies, performing cell measurement, based on the priority information, and performing a cell reselection procedure, based on a result of the cell measurement.

The performing of the cell reselection procedure may include, when a priority of at least one cell at a New Radio (NR) inter-frequency and an inter-Radio Access Technology (RAT) frequency is higher than priority of a serving cell, selecting, from among the at least one cell at the NR inter-frequency and the inter-RAT frequency, at least one cell whose signal quality or signal power measured during a preset duration is greater than a first preset threshold value, and performing the cell reselection procedure on the selected at least one cell whose signal quality or signal power measured during the preset duration is greater than the first preset threshold value, and when the priority of the at least one cell at the NR inter-frequency and the inter-RAT frequency is lower than the priority of the serving cell, and a signal quality or signal power of the serving cell is smaller than a first threshold value during the preset duration, selecting, from among the at least one cell at the NR inter-frequency and the inter-RAT frequency, at least one cell whose signal quality or signal power measured during the preset duration is greater than a second threshold value, and performing the selected at least one cell reselection procedure on the cell whose signal quality or signal power measured during the preset duration is greater than the second threshold value.

The cell reselection procedure may be performed after at least 1 second has elapsed after the UE camped on the serving cell.

When the selected at least one cell is plural a plurality of selected cells, and a frequency band of highest priority is a NR frequency, the performing of the cell reselection procedure may include determining respective rankings of the plurality of selected cells, determining whether information about an optimal cell ranking range (rangeToBestCell) is configured in received system information, and selecting one of the plurality of selected cells, based on a result of the determining of whether the information about the optimal cell ranking range (rangeToBestCell) is configured.

The selecting of one of the plurality of selected cells, based on the result of the determining of whether the information about the optimal cell ranking range (rangeTo-BestCell) is configured, may include, when the information about the optimal cell ranking range (rangeToBestCell) is not configured, selecting a highest-ranked cell of the plurality of selected cells.

The selecting of one of the plurality of selected cells, based on the result of the determining of whether the information about the optimal cell ranking range (rangeTo-BestCell) is configured, may include, when the information about the optimal cell ranking range (rangeToBestCell) is configured, selecting a cell of the plurality of selected cells having a highest number of beams that are greater than a preset threshold value, the selected cell being from among a highest-ranked cell and cells whose ranking values are within the optimal cell ranking range.

The preset threshold value may be determined due to absThreshSS-BlocksConsolidation, and the absThreshSS-BlocksConsolidation may be transmitted for each of NR inter-frequencies.

When absThreshSS-BlocksConsolidation is not configured for a preset NR frequency, a cell at the preset NR frequency may be determined to have one beam that is greater than the preset threshold value.

When the performing of the cell reselection procedure is performed on at least one cell at an inter frequency and at least one cell at an intra frequency and whose priorities are equal to the serving cell, the performing of the cell reselection procedure may include determining respective rankings of the serving cell, the at least one cell at the inter frequency and the at least one cell at the intra frequency, determining whether information about an optimal cell ranking range (rangeToBestCell) is configured in received system information, and selecting one of the serving cell, the at least one cell at the inter frequency and the at least one cell at the intra frequency, based on a result of the determining of whether the information about the optimal cell ranking range (rangeToBestCell) is configured.

The receiving of the priority information may include receiving the priority information in system information or a Radio Resource Control (RRC) Release message.

In accordance with another aspect of the disclosure, a UE for performing a cell reselection procedure is provided. The UE includes a transceiver, and a processor operatively coupled to the transceiver and configured to receive priority information about frequencies, perform cell measurement, based on the priority information, and perform a cell reselection procedure, based on a result of the cell measurement.

The processor may be further configured to, when a priority of at least one cell at a NR inter-frequency and an inter-RAT frequency is higher than priority of a serving cell, select, from among the at least one cell at the NR inter-frequency and the inter-RAT frequency, at least one cell whose signal quality or signal power measured during a preset duration is greater than a first preset threshold value, and perform the cell reselection procedure on the selected at least one cell whose signal quality or signal power measured during the preset duration is greater than the first preset threshold value, and when the priority of the at least one cell at the NR inter-frequency and the inter-RAT frequency is lower than the priority of the serving cell, and a signal quality or signal power of the serving cell is smaller than a first threshold value during the preset duration, select, from among the at least one cell at the NR inter-frequency and the inter-RAT frequency, at least one cell whose signal quality or signal power measured during the preset duration is greater than a second threshold value, and perform the cell reselection procedure on the selected at least one cell whose signal quality or signal power measured during the preset duration is greater than the second threshold value.

The processor may be further configured to perform the cell reselection procedure after at least 1 second has elapsed after the UE camped on the serving cell.

When the selected at least one cell is a plurality of selected cells, and a frequency band of highest priority is a NR frequency, the processor may be further configured to perform the cell reselection procedure by determining respective rankings of the plurality of selected cells, determining whether information about an optimal cell ranking range (rangeToBestCell) is configured in received system information, and selecting one of the plurality of selected cells, based on a result of the determining of whether the information about the optimal cell ranking range (rangeToBestCell) is configured.

The processor may be further configured to, when the information about the optimal cell ranking range (rangeToBestCell) is not configured, select a highest-ranked cell of the plurality of selected cells.

The processor may be further configured to, when the information about the optimal cell ranking range (rangeToBestCell) is configured, select a cell of the plurality of selected cells having a highest number of beams that are greater than a preset threshold value, the selected cell being from among a highest-ranked cell and cells whose ranking values are within the optimal cell ranking range.

The preset threshold value may be determined due to absThreshSS-BlocksConsolidation, and the absThreshSS-BlocksConsolidation may be transmitted for each of NR inter-frequencies.

When absThreshSS-BlocksConsolidation is not configured for a preset NR frequency, a cell at the preset NR frequency may be determined to have one beam that is greater than the preset threshold value.

The processor may be further configured to perform the cell reselection procedure on at least one cell at an inter frequency and at least one cell at an intra frequency and whose priorities are equal to the serving cell, by determining respective rankings of the serving cell and the at least one cell at the inter frequency and the at least one cell at the intra frequency, determining whether information about an optimal cell ranking range (rangeToBestCell) is configured in received system information, and selecting one of the serving cell, the at least one cell at the inter frequency and the at least one cell at the intra frequency, based on a result of the determining of whether the information about the optimal cell ranking range (rangeToBestCell) is configured.

The processor may be further configured to receive the priority information in system information or an RRCRelease message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
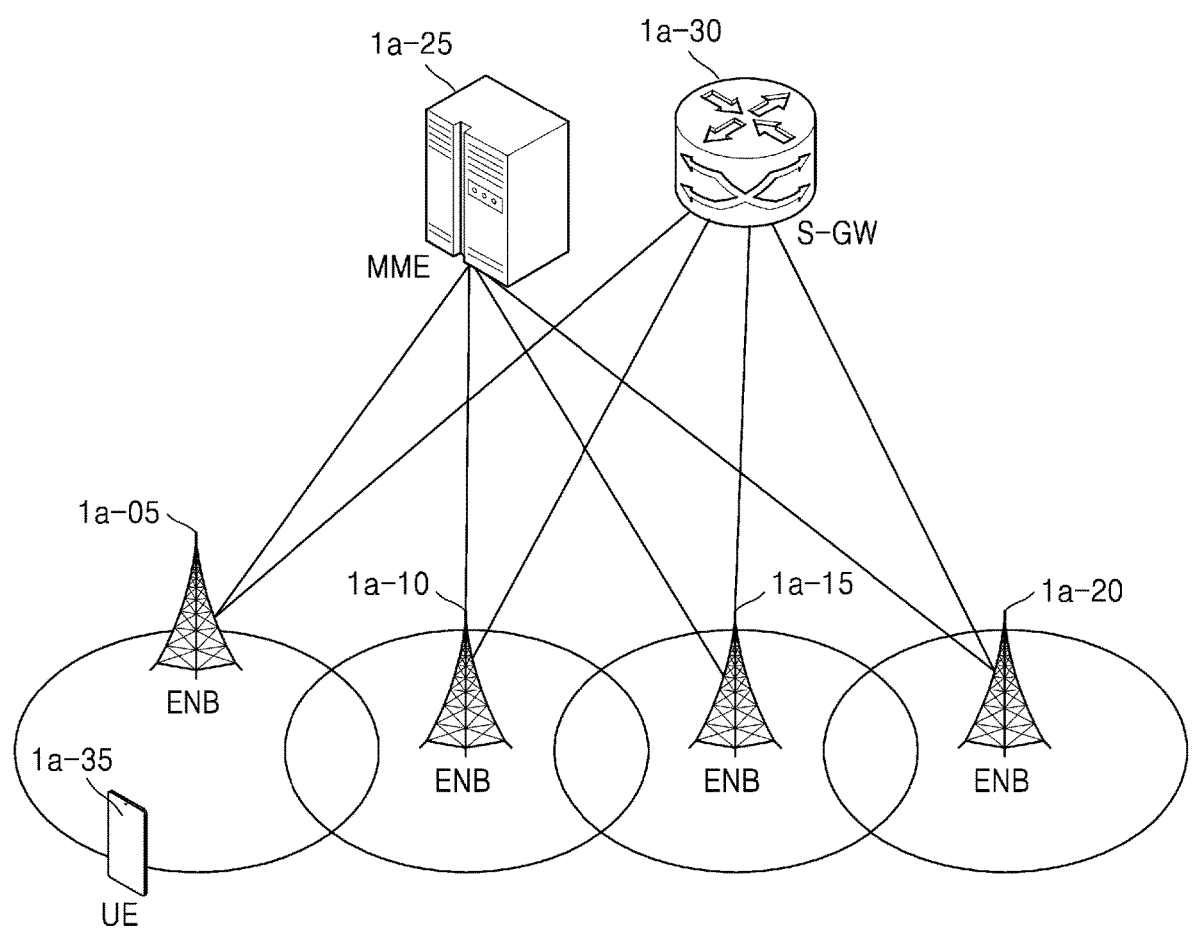
FIG. 1A is a diagram illustrating a configuration of a long term evolution (LTE) system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as mere examples. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements in the drawings are exaggerated, omitted, or schematically illustrated. Also, the size of each element does not entirely reflect the actual size. In the drawings, the same or corresponding elements are denoted by the same reference numerals.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. Throughout the specification, like reference numerals refer to like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the disclosure, refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, a "unit" may include one or more processors in embodiments of the disclosure.

In the following descriptions of the disclosure, well-known functions or configurations are not described in detail because they would obscure the disclosure with unnecessary details. Hereinafter, embodiments of the disclosure will be described in detail with reference to accompanying drawings.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

For convenience of description, the disclosure uses terms and names defined in the 3rd Generation Partnership Project (3GPP) long term evolution (LTE) standards. However, the disclosure is not limited to these terms and names, and may be equally applied to communication systems conforming to other standards. In the disclosure, an evolved node B (eNB) may be interchangeably used with a next-generation node B (gNB) for convenience of explanation. That is, a BS described by an eNB may represent a gNB.

In the following description, the term "base station" refers to an entity for allocating resources to a user equipment (UE) and may be used interchangeably with at least one of a gNode B, an eNode B, a node B, a base station (BS), a radio access unit, a base station controller (BSC), or a node over a network The term "terminal" may be used interchangeably with a user equipment (UE), a mobile station (MS), a cellular phone, a smartphone, a computer, or a multimedia system capable of performing communication functions. Herein, an uplink (UL) refers to a radio link from a UE to an eNB. However, the disclosure is not limited to the aforementioned examples.

In particular, the disclosure may be applied to 3GPP New Radio (NR) (5G mobile communication standard). The disclosure is applicable to intelligent services (e.g., smart home, smart building, smart city, smart car or connected car, health care, digital education, retail, security, and safety services) based on 5G communication technology and Internet of things (IoT) technology. In the disclosure, an eNB may be interchangeably used with a gNB for convenience of explanation. That is, a BS described by an eNB may represent a gNB. In the disclosure, the term "terminals" may refer to not only mobile phones, narrowband IoT (NB-IoT) devices, and sensors but also other wireless communication devices.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-Advanced (LTE-A), and LTE-Pro of the 3GPP, high rate packet data (HRPD) and ultra mobile broadband (UMB) of 3GPP2, 802.16e of the Institute of Electrical and Electronic Engineers (IEEE), or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an UL. The UL refers to a radio link through which a UE (also referred to as a mobile station (MS)) transmits data or a control signal to a BS (e.g., eNB), and the DL refers to a radio link through which a BS transmits data or a control signal to a UE. The above-described multiconnection scheme distinguishes between data or control information of different users by assigning time-frequency resources for the data or control information of the users not to overlap each other, i.e., to achieve orthogonality therebetween.

Post-LTE systems, that is, 5G systems need to simultaneously support services capable of reflecting and satisfying various requirements of users, service providers, etc. Services considered for the 5G systems include enhanced mobile broadband (eMBB), massive machine-type communication (mMTC), ultra-reliability low-latency communication (URLLC) services or the like.

The eMBB service may be aimed to provide a more enhanced data rate compared to a data rate supported by LTE, LTE-A, or LTE-Pro. For example, the eMBB service in the 5G communication systems need to provide a peak data rate of 20 gigabits per second (Gbps) for a DL and provide a peak data rate of 10 Gbps for a UL in view of a single base station. At the same time, the 5G communication systems may simultaneously provide a maximum data rate and provide an increased user perceived data rate. To satisfy these requirements, the 5G communication systems may require various enhanced transmission/reception technologies including enhanced multiple-input and multiple-output (MIMO). The data rate required for the 5G communication systems may be satisfied by using a frequency bandwidth wider than 20 megahertz (MHz) in a frequency band of 3 to 6 GHz or over 6 GHz compared to LTE systems currently using a transmission bandwidth of up to 20 MHz in a 2 GHz band.

At the same time, the mMTC service is considered for the 5G communication systems to support application services such as IoT. The mMTC service may be required to, for example, support massive user access within a cell, enhance UE coverage, increase battery time, and reduce user charges, to efficiently provide the IoT service. The IoT service provides a communication function by using a variety of sensors attached to various devices, and thus needs to support a large number of UEs within a cell (e.g., 1,000,000 UEs/km$^2$). In addition, because UEs supporting mMTC may be located in a shadow zone, e.g., a basement of a building, due to service characteristics, the mMTC service may require a wider coverage compared to other services provided by the 5G communication systems. The UEs supporting mMTC need to be low-priced, and are not able to frequently replace batteries and thus require a very long battery life time, e.g., 10 to 15 years.

Lastly, the URLLC service is a mission-critical cellular-based wireless communication service and may be used for remote control of robots or machinery, industrial automation, unmanned aerial vehicles, remote healthcare, emergency alert, etc. Thus, URLLC communication may have to provide a very low latency (e.g., ultra-low latency) and a very high reliability (e.g., ultra-reliability). For example, the URLLC service needs to satisfy an air interface latency smaller than 0.5 millisecond (ms) and, at the same time, may require a packet error rate equal to or smaller than $10^{-5}$. Therefore, for the URLLC service, the 5G communication systems need to provide a smaller transmit time interval (TTI) compared to other services and, at the same time, may be required to broadly allocate resources in a frequency band to ensure reliability of a communication link.

The above-described three services considered for the 5G communication systems, i.e., the eMBB, URLLC, and mMTC services, may be multiplexed and provided by a single system. In this case, the services may use different transmission/reception schemes and different transmission/reception parameters to satisfy different requirements for the services. The above-described mMTC, URLLC, and eMBB services are merely examples and the types of services to which the disclosure is applicable are not limited thereto.

Although LTE, LTE-A, LTE Pro, or 5G (or NR) systems are mentioned as examples in the following description, embodiments of the disclosure may also be applied to other communication systems having similar technical backgrounds or channel types. Furthermore, the embodiments of the disclosure may also be applied to other communication systems through partial modification without greatly departing from the scope of the disclosure based on determination by one of ordinary skill in the art.

FIG. 1A is a diagram illustrating a configuration of an LTE system, according to an embodiment of the disclosure.

Referring to FIG. 1A, a radio access network (RAN) of the LTE system includes a plurality of evolved nodes B (eNBs) (or nodes B or base stations) 1a-05, 1a-10, 1a-15, and 1a-20, a mobility management entity (MME) 1a-25, and a serving-gateway (S-GW) 1a-30. A UE (or a terminal) 1a-35 may access an external network via the eNB 1a-05, 1a-10, 1a-15, or 1a-20 and the S-GW 1a-30.

In FIG. 1A, the eNB 1a-05, 1a-10, 1a-15, or 1a-20 may correspond to an existing node B of a universal mobile telecommunications system (UMTS). The eNB 1a-05, 1a-10, 1a-15, or 1a-20 may be connected to the UE 1a-35 through wireless channels and may perform complex functions compared to the existing node B. All user traffic data including real-time services such as voice over Internet protocol (VoIP) may be serviced through shared channels in the LTE system, and thus an entity for collating status information, e.g., buffer status information, available transmission power status information, and channel state information, of UEs and performing scheduling may be required and the eNB 1a-05, 1a-10, 1a-15, or 1a-20 may operate as such an entity. One eNB generally controls a plurality of cells. For example, the LTE system may use radio access technology such as OFDM at a bandwidth of 20 MHz to achieve a data rate of 100 megabits per second (Mbps). However, the disclosure is not limited thereto. The eNB 1a-05, 1a-10, 1a-15, or 1a-20 may also use adaptive modulation & coding (AMC) to determine a modulation scheme and a channel coding rate in accordance with a channel state of the UE 1a-35. The S-GW 1a-30 is an entity for providing data bearers and may establish and release the data bearers by the control of the MME 1a-25. The MME 1a-25 is an entity for performing a mobility management function and various control functions on the UE 1a-35 and is connected to the plurality of eNBs 1a-05, 1a-10, 1a-15, and 1a-20.

Figure 1B:
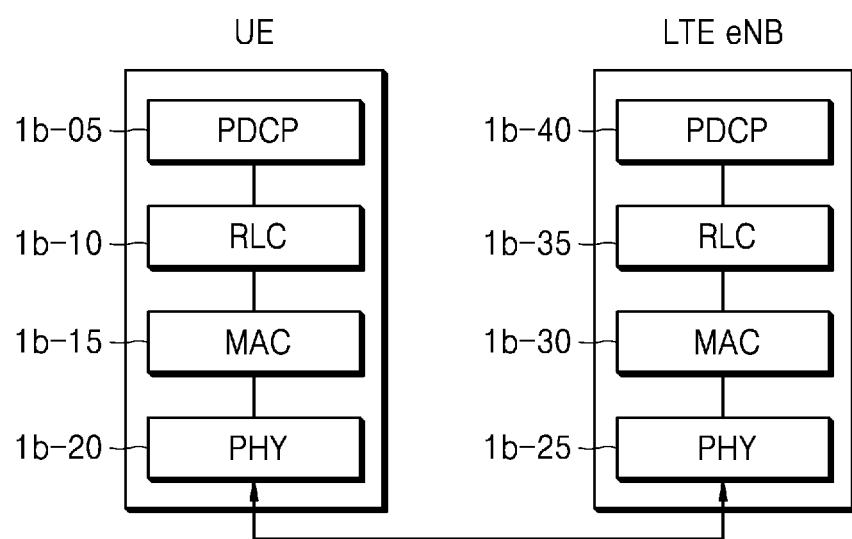
FIG. 1B is a diagram illustrating a radio protocol architecture of an LTE system, according to an embodiment of the disclosure.

FIG. 1B is a diagram illustrating a radio protocol architecture of an LTE system, according to an embodiment of the disclosure.

Referring to FIG. 1B, the radio protocol architecture of the LTE system may include Packet Data Convergence Protocol (PDCP) layers 1b-05 and 1b-40, Radio Link Control (RLC) layers 1b-10 and 1b-35, and Medium Access Control (MAC) layers 1b-15 and 1b-30 respectively for a UE and an eNB. The PDCP layer 1b-05 or 1b-40 may perform, for example, IP header compression/decompression. Main functions of the PDCP layer 1b-05 or 1b-40 are summarized as shown below. However, the functions thereof are not limited thereto.

Header compression and decompression: robust header compression (ROHC) only

Transfer of user data

In-sequence delivery of upper layer packet data units (PDUs) at PDCP re-establishment procedure for RLC acknowledged mode (AM)

For split bearers in dual connectivity (DC) (only support for RLC AM): PDCP PDU routing for transmission and PDCP PDU reordering for reception Duplicate detection of lower layer service data units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLC layer 1b-10 or 1b-35 may perform an automatic repeat request (ARQ) operation by reconfiguring Packet Data Convergence Protocol Packet Data Units (PDCP PDUs) to appropriate sizes. Main functions of the RLC layer 1b-10 or 1b-35 may be summarized as shown below. However, the functions thereof are not limited thereto.

Transfer of upper layer PDUs

Error correction through ARQ (only for AM data transfer)

Concatenation, segmentation and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 1b-15 or 1b-30 may be connected to a plurality of RLC layers configured for one UE and may multiplex RLC PDUs into a MAC PDU and may demultiplex the RLC PDUs from the MAC PDU. Main functions of the MAC layer 1b-15 or 1b-30 may be summarized as shown below. However, the functions thereof are not limited thereto.

Mapping between logical channels and transport channels

Multiplexing/demultiplexing of MAC SDUs belonging to one or different logical channels into/from transport blocks (TBs) delivered to/from the physical layer on transport channels Scheduling information reporting Error correction through hybrid ARQ (HARQ)

Priority handling between logical channels of one UE

Priority handling between UEs by means of dynamic scheduling

Multimedia broadcast/multicast service (MBMS) service identification

Transport format selection

Padding

A physical (PHY) layer 1b-20 or 1b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer. However, the functions thereof are not limited thereto.

Figure 1C:
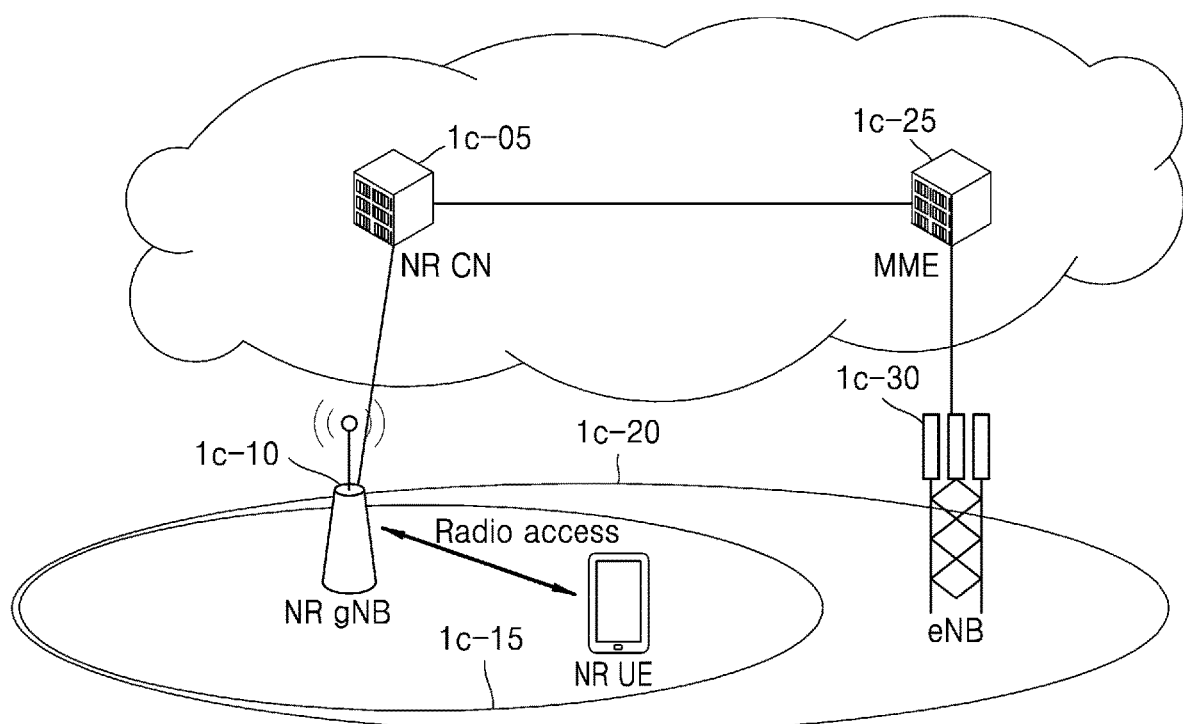
FIG. 1C is a diagram illustrating a next-generation mobile communication system, according to an embodiment of the disclosure.

FIG. 1C is a diagram illustrating a next-generation mobile communication system, according to an embodiment of the disclosure.

Referring to FIG. 1C, as illustrated, a radio access network of the next-generation mobile communication system (hereinafter, referred to as the NR or 5G communication system) includes a new radio node B (NR gNB, NR NB, or gNB) 1c-10 and a new radio core network (NR CN) 1c-05. A NR UE (or terminal) 1c-15 accesses an external network via the NR gNB 1c-10 and the NR CN 1c-05.

Referring to FIG. 1C, the NR gNB 1c-10 corresponds to an existing eNB of an LTE system. The NR gNB 1c-10 may be connected to the NR UE 1c-15 through wireless channels and may provide superior services compared to an existing node B. All user traffic data may be serviced through shared channels in the NR or 5G mobile communication system, and thus, an entity for collating buffer status information of UEs, available transmission power status information, and channel state information and performing scheduling may be required and the NR gNB 1c-10 may operate as such an entity. One NR gNB generally controls a plurality of cells. According to an embodiment of the disclosure, the NR or 5G communication system may have a bandwidth greater than the maximum bandwidth of the existing LTE system so as to achieve an ultrahigh data rate, compared to the existing LTE system, and may use OFDM as a radio access technology and may additionally use a beamforming technology. According to an embodiment of the disclosure, the NR gNB 1c-10 may use AMC to determine a modulation scheme and a channel coding rate in accordance with a channel state of the NR UE 1c-15. The NR CN 1c-05 may perform functions such as mobility support, bearer configuration, and quality of service (QoS) configuration. The NR CN 1c-05 is an entity for performing a mobility management function and various control functions on the NR UE 1c-15 and may be connected to a plurality of base stations. The NR or 5G mobile communication system may cooperate with the existing LTE system, and the NR CN 1c-05 may be connected to an MME 1c-25 through a network interface. The MME 1c-25 may be connected to an eNB 1c-30 that is an existing base station.

Figure 1D:
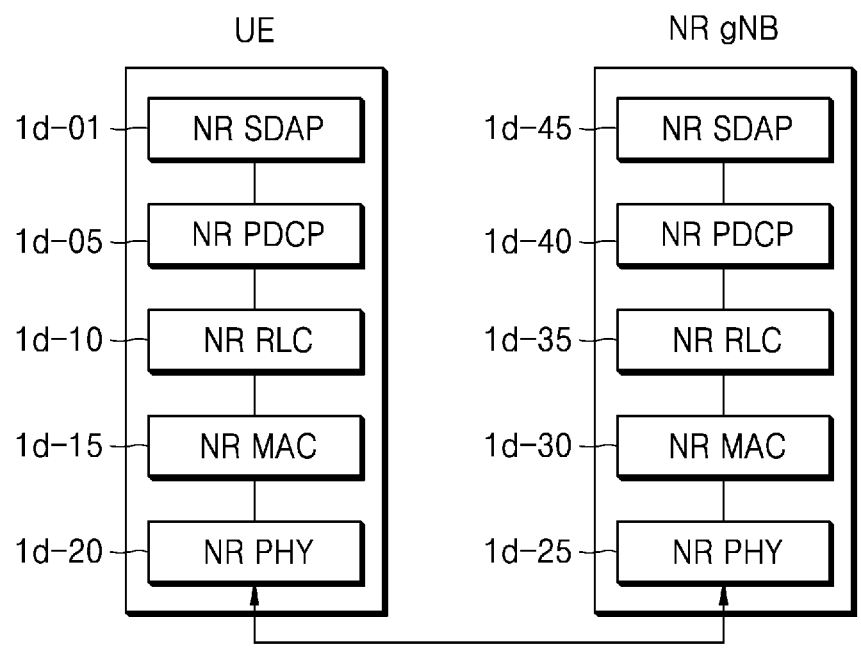
FIG. 1D is a diagram illustrating a radio protocol architecture of a New Radio (NR) or $5^{th}$ generation (5G) mobile communication system, according to an embodiment of the disclosure.

FIG. 1D is a diagram illustrating a radio protocol architecture of a NR or 5G mobile communication system, according to an embodiment of the disclosure.

Referring to FIG. 1D, the radio protocol architecture of the NR or 5G mobile communication system may include NR Service Data Adaptation Protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

According to an embodiment of the disclosure, main functions of the NR SDAP layer 1d-01 or 1d-45 may include some of the following functions. However, the functions thereof are not limited thereto.

Transfer of user plane data

Mapping between a QoS flow and a Data Radio Bearer (DRB) for both DL and UL

Marking QoS flow identifier (ID) in both DL and UL packets

Reflective QoS flow to DRB mapping for the UL SDAP PDUs

With regard to a SDAP layer, the UE may be configured, through an RRC message, whether to use a header of the SDAP layer or to use functions of the SDAP layer per PDCP layer, per bearer, or per logical channel. When the SDAP header is configured, a 1-bit non access stratum (NAS) reflective QoS indicator and a 1-bit access stratum (AS) reflective QoS indicator of the SDAP header may indicate the UE to update or reconfigure UL and DL QoS flow and data bearer mapping information. The SDAP header may include QoS flow ID information indicating QoS. According to an embodiment of the disclosure, QoS information may be used as data processing priority information or scheduling information for appropriately supporting a service.

According to an embodiment of the disclosure, main functions of the NR PDCP layer 1d-05 or 1d-40 may include some of the following functions. However, the functions thereof are not limited thereto.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

According to an embodiment of the disclosure, the reordering function of the NR PDCP layer 1d-05 or 1d-40 may indicate a function of reordering PDCP PDUs received from a lower layer, on a PDCP sequence number (SN) basis. The reordering function of the NR PDCP layer 1d-05 or 1d-40 may include at least one of a function of delivering the reordered data to an upper layer in order or out of order, a function of recording missing PDCP PDUs by reordering the received PDCP PDUs, a function of reporting status information of the missing PDCP PDUs to a transmitter, or a function of requesting to retransmit the missing PDCP PDUs.

According to an embodiment of the disclosure, main functions of the NR RLC layer 1d-10 or 1d-35 may include some of the following functions. However, the functions thereof are not limited thereto.

Transfer of upper layer PDUs
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment According to an embodiment of the disclosure, the in-sequence delivery function of the NR RLC layer 1d-10 or 1d-35 may indicate a function of delivering RLC SDUs received from a lower layer, to an upper layer in order. According to some embodiments of the disclosure, the in-sequence delivery function of the NR RLC layer 1d-10 or 1d-35 may include at least one of a function of reassembling the RLC SDUs and delivering the reassembled RLC SDU when a plurality of RLC SDUs segmented from one RLC SDU are received, a function of reordering received RLC PDUs on a RLC SN or PDCP SN basis, a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order although a missing RLC SDU exists when a certain timer expires, or a function of delivering all RLC SDUs received up to a current time, to an upper layer in order when a certain timer expires, even when a missing RLC SDU exists.

According to an embodiment of the disclosure, the NR RLC layer 1d-10 or 1d-35 may process the RLC PDUs in order of reception and deliver the RLC PDUs to the NR PDCP layer 1d-05 or 1d-40 regardless of SNs (out-of-sequence delivery), and when a segment is received, the NR RLC layer 1d-10 or 1d-35 may reassemble the segment with other segments stored in a buffer or subsequently received, into a whole RLC PDU and may deliver the RLC PDU to the NR PDCP layer 1d-05 or 1d-40.

According to an embodiment of the disclosure, the NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

According to an embodiment of the disclosure, the out-of-sequence delivery function of the NR RLC layer 1d-10 or 1d-35 may include at least one of a function of directly delivering RLC SDUs received from a lower layer, to an upper layer out of order, a function of reassembling a plurality of RLC SDUs segmented from one RLC SDU and delivering the reassembled RLC SDU when the segmented RLC SDUs are received, or a function of recording missing RLC PDUs by storing RLC SNs or PDCP SNs of received RLC PDUs and reordering the received RLC PDUs.

According to an embodiment of the disclosure, the NR MAC layer 1d-15 or 1d-30 may be connected to a plurality of NR RLC layers configured for one UE, and main functions of the NR MAC layer 1d-15 or 1d-30 may include some of the following functions. However, the functions thereof are not limited thereto.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding According to an embodiment of the disclosure, an NR PHY layer 1d-20 or 1d-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer. However, the functions thereof are not limited thereto.

Figure 1E:
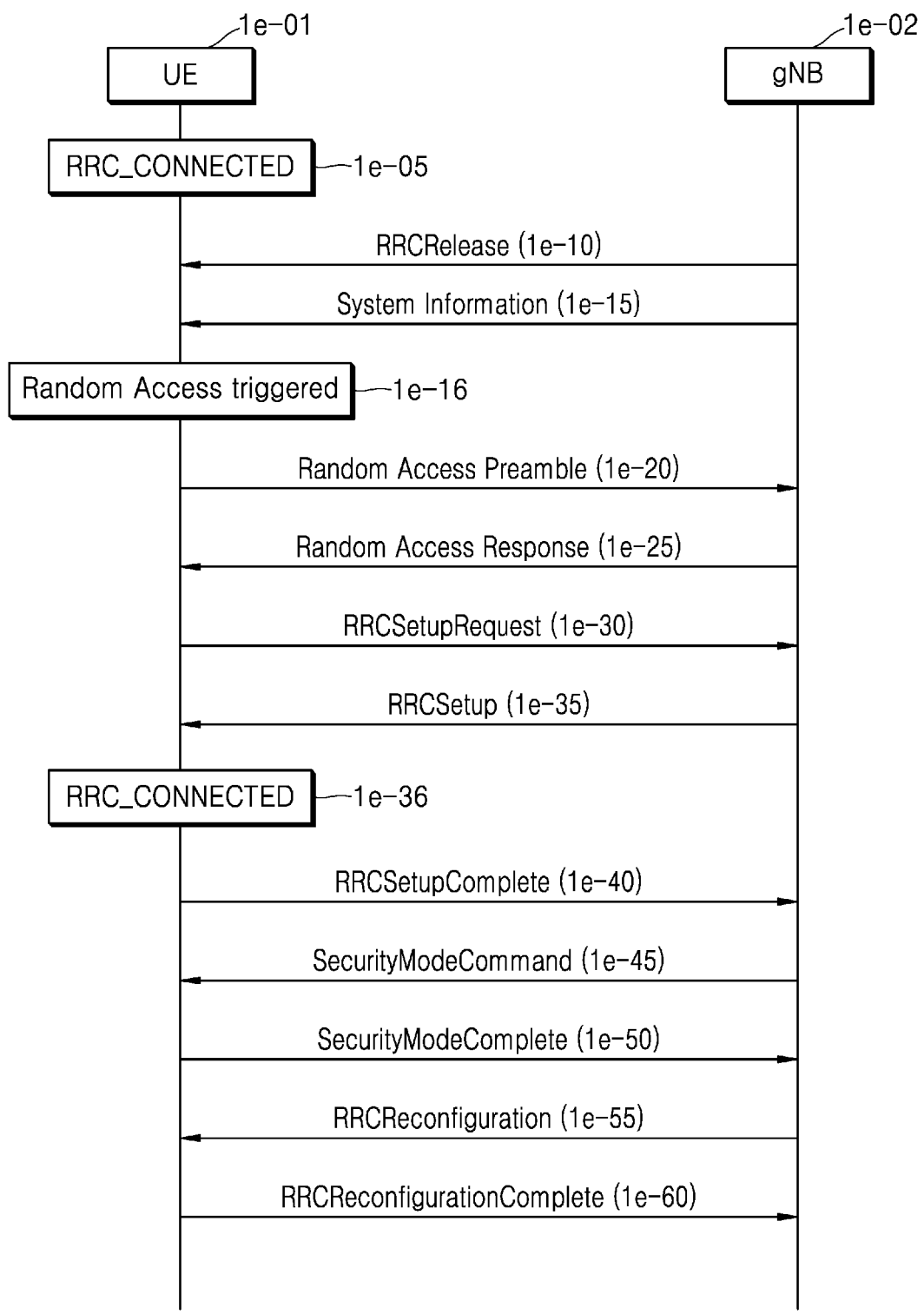
FIG. 1E is a diagram for describing a procedure of transiting from a Radio Resource Control (RRC) connected mode to an RRC idle mode, and a procedure of transiting from the RRC idle mode to the RRC connected mode, according to an embodiment of the disclosure.

FIG. 1E is a diagram for describing a procedure in which a BS releases connection to a UE and thus the UE transits from a Radio Resource Control (RRC) connected mode (RRC_CONNECTED) to an RRC idle mode (RRC IDLE), and a procedure in which the UE establishes connection with the BS and thus transits from the RRC idle mode (RRC_IDLE) to the RRC connected mode (RRC CONNECTED), according to an embodiment of the disclosure.

Referring to FIG. 1E, a UE 1e-01 may establish RRC connection with a gNB 1e-02 and thus may be in an RRC connected mode (RRC_CONNECTED) (1e-05). When the UE 1e-01 that transmits or receives data in the RRC connected mode does not transmit or receive data for a certain reason or for a certain time, the gNB 1e-02 may transmit an RRCRelease message not including suspended configuration information (suspendConfig) to the UE 1e-01, thereby controlling the UE 1e-01 to switch to the RRC idle mode (RRC_IDLE) in operation 1e-10. The RRCRelease message may include cell reselection priority information (cellReselectionPriorities), carrier redirection information (redirectedCarrierInfo), or the like. However, the disclosure is not limited thereto.

The UE 1e-01 in the RRC idle mode may receive system information via a cell reselection procedure and/or by searching for and camping on a suitable cell via the cell reselection procedure in operation 1e-15. The received system information may include the cell reselection priority information. In operation 1e-15, in a case where the UE 1e-01 in the RRC idle mode performs the cell reselection procedure, when the RRCRelease message includes cell reselection priority information, the UE 1e-01 may ignore the cell reselection priority information included in the system information. However, the disclosure is not limited thereto.

The UE 1e-01 may perform a random access procedure to establish RRC connection with the gNB 1e-02. When random access is triggered in operation 1e-16, the UE 1e-01 may select a Physical Random Access Channel (PRACH) occasion and transmit a random access preamble to the gNB 1e-02 in operation 1e-20. Upon reception of the random access preamble, the gNB 1e-02 may transmit a Random Access Response (RAR) message to the UE 1e-01 in operation 1e-25. The UE 1e-01 in the RRC idle mode may establish inverse direction transmission synchronization with the gNB 1e-02 through operations 1e-20 and 1e-25.

The UE 1e-01 in the RRC idle mode, which has established inverse direction transmission synchronization, may perform an RRC connection establishment procedure with the gNB 1e-02. First, the UE 1e-01 may transmit an RRCSetupRequest message to the gNB 1e-02 in operation 1e-30. The RRCSetupRequest message may include an identity of the UE 1e-01, an establishment cause for establishing RCC connection, or the like. Upon reception of the RRCSetupRequest message, the gNB 1e-02 may transmit an RRCSetup message to the UE 1e-01 in operation 1e-35. The RRCSetup message may include radio bearer configuration information (radioBearerConfig), master cell group configuration information (masterCellGroup), etc. For example, the radio bearer configuration information and the master cell group configuration information may include at least one of a plurality of pieces of information including information accompanied by Signaling Radio Bearer1 (SRB1) connection, RLC bearer configuration information about SRB1, MAC cell group configuration information (mac-CellGroupConfig), physical cell group configuration information (physicalCellGroupConfig), or the like. That is, RRCSetup establishment may accompany SRB1 connection and may not accompany connection of radio bearer except for SRB1 (e.g., the RRCSetup establishment does not accompany SRB2 for a UE and a BS to transmit and receive a NAS message nor accompany DRB connection for the UE and the BS to transmit and receive data). Upon reception of the RRCSetup message, the UE 1e-01 may apply the received information and may switch to the RRC connected mode in operation 1e-36. The UE 1e-01 in the RRC connected mode may transmit an RRCSetupComplete message to the gNB 1e-02 through SRB1 in operation 1e-40. The RRCSetupComplete message may include a service request message by which the UE 1e-01 requests an Access and Mobility Management Function (AMF) or an MME for bearer configuration for a certain service.

When the RRC connection establishment procedure is successfully performed, the gNB 1e-02 may transmit a SecurityModeCommand message to the UE 1e-01 so as to activate AS Security with the UE 1e-01 in the RRC connected mode in operation 1e-45. Upon reception of the SecurityModeCommand message, the UE 1e-01 may transmit a SecurityModeComplete message to the gNB 1e-02 in operation 1e-50.

When the gNB 1e-02 transmits the SecurityModeCommand message, the gNB 1e-02 may perform an RRC reconfiguration procedure with the UE 1e-01 after transmission of the SecurityModeCommand message or after reception of the SecurityModeComplete message. First, the gNB 1e-02 may transmit an RRCReconfiguration message to the UE 1e-01 in operation 1e-55. The RRCReconfiguration message may include configuration information of a DRB through which user data is to be processed or configuration information of SRB2 through which a NAS message is to be transmitted. Upon reception of the RRCReconfiguration message, the UE 1e-01 may transmit an RRCReconfigurationComplete message to the gNB 1e-02 in operation 1e-60.

As described above, in order for the UE 1e-01 to set up RRC connection and thus to transit from the RRC idle mode to the RRC connected mode, many signaling procedures are required. Therefore, a NR or 5G mobile communication system may newly define an RRC inactive mode (RRC_INACTIVE). In a new mode such as the RRC inactive mode, the UE 1e-01 and the gNB 1e-02 store context of the UE 1e-01, and thus, when the UE 1e-01 in the RRC inactive mode attempts to re-access a network, the UE 1e-01 may further rapidly access via less signaling procedures through an RRC connection resume procedure proposed below, and may transmit or receive data.

Figure 1F:
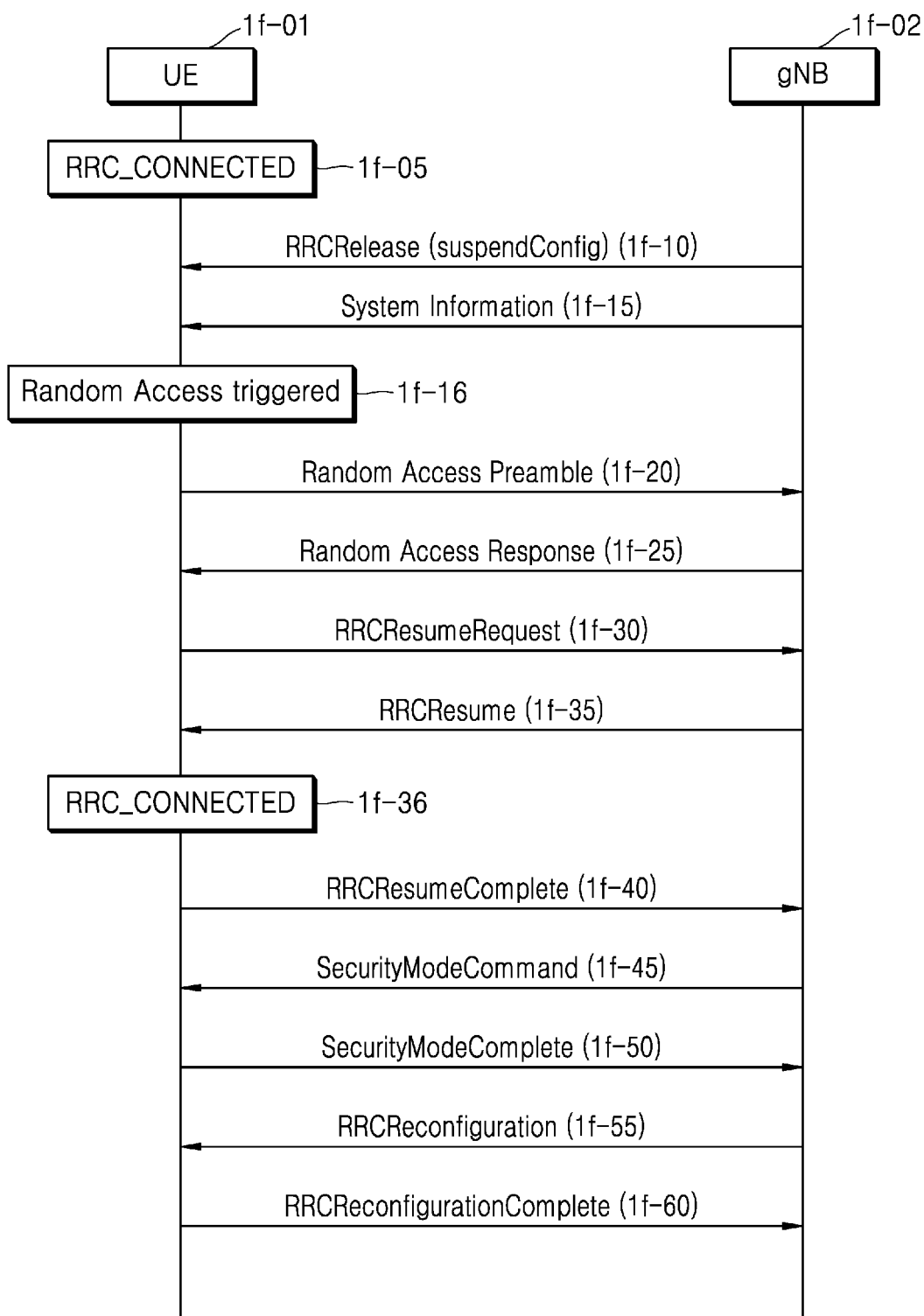
FIG. 1F is a diagram for describing a procedure in which a user equipment (UE) transits from an RRC connected mode to an RRC inactive mode, and a procedure in which the UE transits from the RRC inactive mode to the RRC connected mode, according to an embodiment of the disclosure.

FIG. 1F is a diagram for describing a procedure in which a BS releases connection to a UE and thus the UE transits from an RRC connected mode (RRC_CONNECTED) to an RRC inactive mode (RRC_INACTIVE), and a procedure in which the UE establishes connection with the BS and thus transits from the RRC inactive mode (RRC_INACTIVE) to the RRC connected mode (RRC_CONNECTED), according to an embodiment of the disclosure.

Referring to FIG. 1F, a UE 1f-01 may establish RRC connection with a gNB 1f-02 and thus may be in an RRC connected mode (RRC_CONNECTED) (1f-05). When the UE 1f-01 that transmits or receives data in the RRC connected mode does not transmit or receive data for a certain reason or for a certain time, the gNB 1f-02 may transmit an RRCRelease message including suspended configuration information (suspendConfig) to the UE 1f-01, thereby controlling the UE 1f-01 to switch to the RRC inactive mode (RRC_INACTIVE) in operation 1f-10. The RRCRelease message may include cell reselection priority information (cellReselectionPriorities), carrier redirection information (redirectedCarrierInfo), or the like.

The UE 1e-01 in the RRC inactive mode may receive system information via a cell reselection procedure and/or by searching for and camping on a suitable cell via the cell reselection procedure in operation 1f-15. The received system information may include the cell reselection priority information. In operation 1f-15, in a case where the UE 1f-01 in the RRC inactive mode performs the cell reselection procedure, when the RRCRelease message includes cell reselection priority information, the UE 1f-01 may ignore the cell reselection priority information included in the system information. However, the disclosure is not limited thereto.

The UE 1f-01 may perform a random access procedure to establish RRC connection with the gNB 1f-02. When random access is triggered in operation 1f-16, the UE 1f-01 may select a PRACH occasion and transmit a random access preamble to the gNB 1f-02 in operation 1f-20. Upon reception of the random access preamble, the gNB 1f-02 may transmit a RAR message to the UE 1f-01 in operation 1f-25. The UE 1f-01 in the RRC inactive mode may establish inverse direction transmission synchronization with the gNB 1f-02 through operations 1f-20 and 1f-25.

The UE 1f-01 in the RRC inactive mode, which has established inverse direction transmission synchronization, may perform an RRC connection establishment procedure with the gNB 1f-02. First, the UE 1f-01 may transmit an RRCResumeRequest message or an RRCResumeRequest1 message to the gNB 1f-02 in operation 1f-30. The RRCResumeRequest message or the RRCResumeRequest1 message may include at least one of a plurality of pieces of information including UE-identity (resumeIdentity) for retrieving context of the UE 1f-01 from the gNB 1f-02, resumption ciphering information (resumeMAC-I), a resumption cause (resumeCause) for resuming RRC connection, or the like. Upon reception of the RRCResumeRequest message or the RRCResumeRequest1 message, the gNB 1f-02 may transmit an RRCResume message to the UE 1f-01 in operation 1f-35. The RRCResume message may include at least one of a plurality of pieces of information including radio bearer configuration information (radioBearerConfig), master cell group configuration information (masterCellGroup), measurement configuration information (measConfig), or the like. For example, the radio bearer configuration information and the master cell group configuration information may include at least one of a plurality of pieces of information including configuration information about one or more SRBs to be resumed, configuration information about one or more DRBs, RLC bearer configuration information about the SRBs and DRBs, MAC cell group configuration information (mac-CellGroupConfig), physical cell group configuration information (physicalCellGroupConfig), or the like.

Upon reception of the RRCResume message, the UE 1f-01 may apply the received information and may switch to the RRC connected mode in operation 1f-36. The UE 1f-01 in the RRC connected mode may transmit an RRCResumeComplete message to the gNB 1f-02 through SRB1 in operation 1f-40.

When the RRC connection resume procedure is successfully performed, the gNB 1f-02 may transmit a SecurityModeCommand message to the UE 1f-01 so as to activate AS Security with the UE 1f-01 in the RRC connected mode in operation 1f-45. Upon reception of the SecurityModeCommand message, the UE 1f-01 may transmit a SecurityModeComplete message to the gNB 1f-02 in operation 1f-50.

When the gNB 1f-02 transmits the SecurityModeCommand message, the gNB 1f-02 may perform an RRC reconfiguration procedure with the UE 1f-01 after transmission of the SecurityModeCommand message or after reception of the SecurityModeComplete message. First, the gNB 1f-02 may transmit an RRCReconfiguration message to the UE 1f-01 in operation 1f-55. Upon reception of the RRCReconfiguration message, the UE 1f-01 may transmit an RRCReconfigurationComplete message to the gNB 1f-02 in operation 1f-60.

Figure 1G:
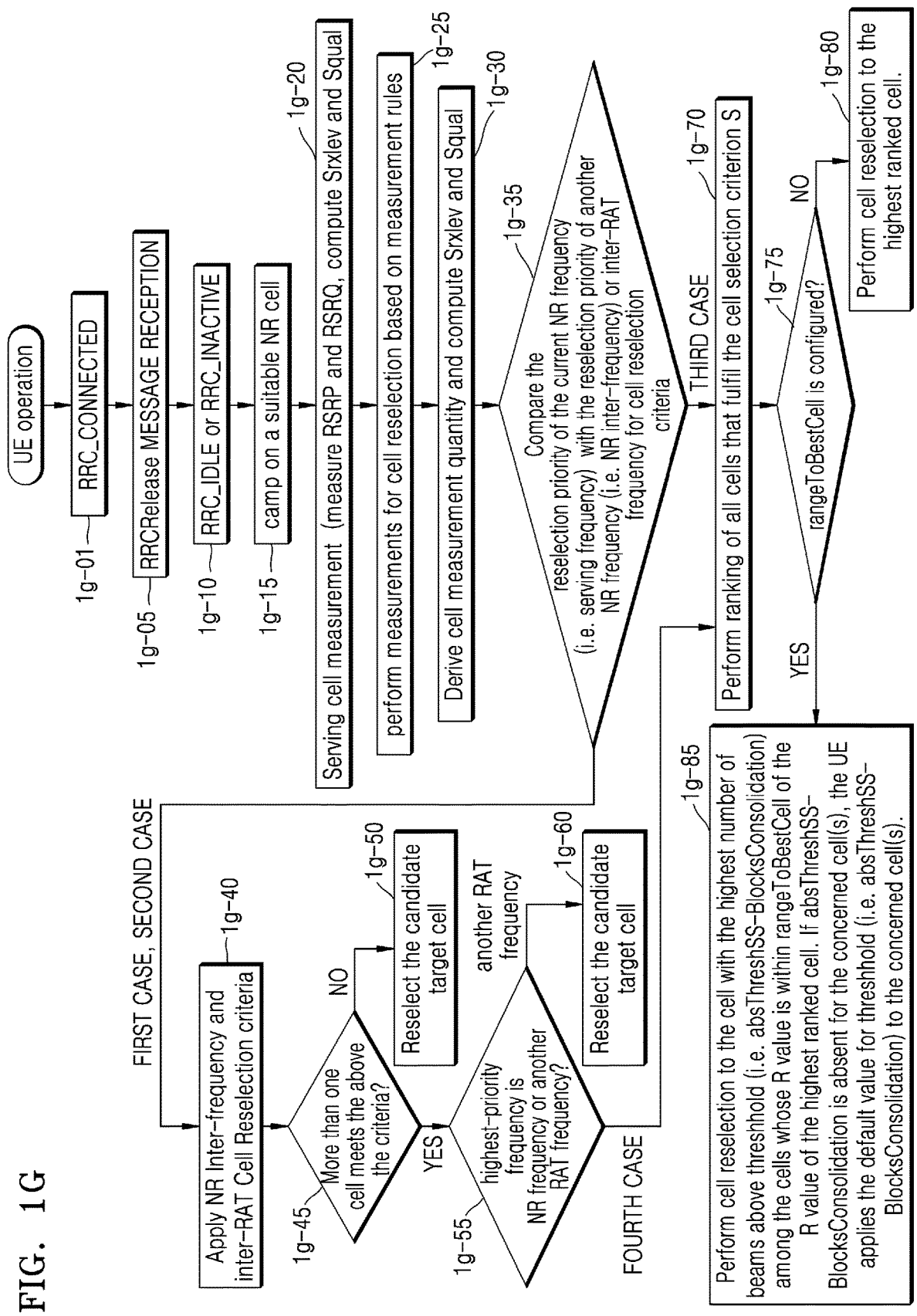
FIG. 1G is a diagram for describing a procedure in which a UE transits from an RRC connected mode to an RRC inactive mode or an RRC idle mode, and then performs a cell reselection procedure, according to an embodiment of the disclosure.

FIG. 1G is a diagram for describing a procedure in which a BS releases connection to a UE and thus the UE transits from an RRC connected mode (RRC_CONNECTED) to an RRC inactive mode (RRC_INACTIVE) or an RRC idle mode (RRC_IDLE), and then the UE in the RRC inactive mode (RRC_INACTIVE) or the RRC idle mode (RRC_IDLE) performs a cell reselection procedure, according to an embodiment of the disclosure.

The cell reselection procedure may refer to a procedure in which, when a service quality of a serving cell deteriorates compared to a service quality of a neighbor cell, the UE in the RRC inactive mode (RRC_INACTIVE) or the RRC idle mode (RRC_IDLE) determines whether to maintain a current serving cell or to reselect the neighbor cell.

In handover, whether to operate handover is determined due to a network (an MME, an AMF, a source eNB, or a source gNB) whereas, in cell reselection, the UE may autonomously determine whether to reselect a cell, based on a cell measurement value. A cell to be reselected by a moving UE may refer to a cell using a same NR frequency (a NR intra-frequency) as a serving cell that the UE currently camps on, a cell using a different NR frequency (a NR intra-frequency) as the serving cell, or a cell using a frequency (inter-Radio Access Technology (RAT) frequency) used in a different RAT.

Referring to FIG. 1G, the UE may be in an RRC connected mode (RRC_CONNECTED) (1g-01).

In operation 1g-05, the UE in the RRC connected mode may receive an RRCRelease message from a BS.

In operation 1g-10, the UE may switch to an RRC inactive mode (RRC_INACTIVE) or an RRC idle mode (RRC_IDLE), according to whether the RRCRelease message received in operation 1g-05 includes suspended configuration information (suspendConfig). For example, when the UE successfully receives the RRCRelease message including the suspended configuration information, the UE in the RRC connected mode may switch to the RRC inactive mode. On the other hand, when the UE successfully receives the RRCRelease message not including the suspended configuration information, the UE in the RRC connected mode may switch to the RRC idle mode.

In operation 1g-15, the UE in the RRC idle mode or the RRC inactive mode may search for and camp on a suitable cell by performing a cell selection procedure. The suitable cell that the UE in the RRC idle mode or the RRC inactive mode found and camped on may be called a serving cell. To perform the cell selection procedure, the UE may receive system information (e.g., Master Information Block (MIB) and/or System Information Block1 (SIB1) broadcast from a cell. Alternatively, before or after the UE camps on the cell, the UE may receive system information (e.g., SIB2 and/or SIB3 and/or SIB4 and/or SIB5) broadcast from the cell. SIB2 may include information/parameters that are commonly applied to when the UE in the RRC idle mode or the RRC inactive mode reselects a NR intra-frequency cell, a NR inter-frequency cell, and an inter-RAT frequency cell. SIB3 may include information/parameters that are applied to only when the UE in the RRC idle mode or the RRC inactive mode reselects a NR intra-frequency cell. SIB4 may include information/parameters that are applied to only when the UE in the RRC idle mode or the RRC inactive mode reselects a NR inter-frequency cell. SIB5 may include information/parameters that are applied to only when the UE in the RRC idle mode or the RRC inactive mode reselects an inter-RAT frequency cell.

In operation 1g-20, the UE in the RRC idle mode or the RRC inactive mode may measure Reference Signal Received Power (RSRP) $Q_{rxlevmeas}$ and Reference Signal Received Quality (RSRQ) $Q_{qualmeas}$. In detail, the UE may calculate a reception level $S_{rxlev}$ and a reception quality $S_{qual}$ of the serving cell by using the parameters included in SIB1 received in operation 1g-15. For example, the UE may calculate the reception level $S_{rxlev}$ and the reception quality $S_{qual}$ of the serving cell by using Equation 1 below.

$$S\text{rxlev} = Q_{rxlevmeas} - (Q_{rxlevmin} + Q_{rxlevminoffset}) - P_{compensation} - Q\text{offset}_{temp},$$

$$S\text{qual} = Q_{qualmeas} - (Q_{qualmin} + Q_{qualminoffset}) - Q\text{offset}_{temp}. \quad \text{Equation 1}$$

Definitions of parameters used in Equation 1 may be determined according to the 3GPP standard specification titled "38.304: User Equipment (UE) procedures in Idle mode and RRC Inactive state". Hereinafter, the definitions are equally applied to embodiments of the disclosure to which Equation 1 is applied.

In operation 1g-25, the UE in the RRC idle mode or the RRC inactive mode may perform measurement for cell reselection. In this regard, the UE may perform the neighbor cell measurement based on measurement rules so as to minimize consumption of a battery power or due to a certain reason.

When the reception level and the reception quality of the serving cell are greater than a threshold value ($S_{rxlev} > S_{IntraSearchP}$ and $S_{IntraSearchQ}$), the UE may not perform NR intra-frequency cell measurement.

When the reception level and the reception quality of the serving cell are equal to or smaller than the threshold value ($S_{rxlev} \leq S_{IntraSearchP}$ and $S_{IntraSearchQ}$), the UE may perform NR intra-frequency cell measurement.

For a NR inter-frequency cell or an inter-RAT frequency cell whose reselection priority is higher than a NR frequency of a current serving cell, the UE may perform measurement.

When the reception level and the reception quality of the serving cell are greater than the threshold value ($S_{rxlev} > S_{IntraSearchP}$ and $S_{intraSearchQ}$), the UE may not perform measurement on a NR inter-frequency cell whose reselection priority is equal to or lower than the NR frequency of the current serving cell or an inter-RAT frequency cell whose reselection priority is lower than the NR frequency of the current serving cell.

When the reception level and the reception quality of the serving cell are equal to or smaller than the threshold value ($S_{rxlev} \leq S_{nonIntraSearchP}$ and $S_{nonintraSearchQ}$), the UE may perform measurement on a NR inter-frequency cell whose reselection priority is equal to or lower than the NR frequency of the current serving cell or an inter-RAT frequency cell whose reselection priority is lower than the NR frequency of the current serving cell.

When the RRCRelease message received in operation 1g-05 includes cell reselection priority information, frequency priority information may indicate frequency priority information included in the cell reselection priority information included in the RRCRelease message. When the RRCRelease message received in operation 1g-05 does not include cell reselection priority information, frequency priority information may indicate cell reselection priority information included in the system information received in operation 1g-15.

The aforementioned threshold values of $S_{IntraSearchP}$, $S_{intraSearchQ}$, $S_{nonIntraSearchP}$, and $S_{nonintraSearchQ}$ may be included in SIB2.

In operation 1g-30, to reselect a cell that performs a multi-beam operation, the UE in the RRC idle mode or the RRC inactive mode may derive a measurement quantity value of each cell, based on beams respectively corresponding to cells with respect to a SS/PBCH block According to an embodiment of the disclosure, the UE may derive a measurement quantity value of a cell by using one of methods below.

In a case where condition 1 below is satisfied, the UE may derive, as a highest beam measurement quantity value, a measurement quantity value of a neighbor cell at a same NR frequency (a NR intra-frequency) as the serving cell.—In a case where condition 1 below is not satisfied, the UE may derive a measurement quantity value of a neighbor cell at a same NR intra-frequency as the serving cell by performing linear averaging on the power values up to nrofSS-BlocksToAverage of highest beam measurement quantity values that are greater than absThreshSS-BlocksConsolidation The case where condition 1 is satisfied may indicate a case where at least one of three conditions below is satisfied.

when nrofSS-BlocksToAverage is not configured in SIB2 or when absThreshSS-BlocksConsolidation is not configured in SIB2 or when a highest beam measurement quantity value is equal to or smaller than absThreshSS-BlocksConsolidation In a case where condition 2 below is satisfied, the UE may derive, as a highest beam measurement quantity value, a measurement quantity value of a neighbor cell at a different NR frequency (a NR inter-frequency) from that of the serving cell.—In a case where condition 2 below is not satisfied, the UE may derive a measurement quantity value of a neighbor cell at a different NR frequency (a NR inter-frequency) from that of the serving cell by performing linear averaging on the power values up to nrofSS-BlocksToAverage of highest beam measurement quantity values above absThreshSS-BlocksConsolidation.

The case where condition 2 is satisfied may indicate a case where at least one of three conditions below is satisfied.

when nrofSS-BlocksToAverage is not configured in SIB4 or when absThreshSS-BlocksConsolidation is not configured in SIB4 or when a highest beam measurement quantity value is equal to or smaller than absThreshSS-BlocksConsolidation nrofSS-BlocksToAverage and absThreshSS-BlocksConsolidation may be signaled in SIB4 at each NR inter-frequency, and thus, the UE may derive a measurement quantity value of a neighbor cell at a NR inter-frequency by applying condition 2 to each of NR inter-frequencies.

In operation 1g-30, the UE in the RRC idle mode or the RRC inactive mode may derive a measurement quantity value of each cell so as to reselect a cell (e.g., a LTE cell in an inter-RAT frequency) that does not perform the multi-beam operation. The measurement quantity value may indicate RSRP $Q_{rxlevmeas}$ or RSRQ $Q_{qualmeas}$.

In operation 1g-30, the UE may derive a reception level and a reception quality of each cell, based on the derived measurement quantity value of each cell. In detail, the UE may derive a reception level and a reception quality of a neighbor cell according to Equation 1 by using parameters included in SIB2 or SIB3 received in operation 1g-15, the neighbor cell being at a same NR frequency (a NR intra-frequency) as the serving cell. The UE may derive a reception level and a reception quality of a neighbor cell according to Equation 1 by using parameters included in SIB2 or SIB4 received in operation 1g-15, the neighbor cell being at a different NR frequency (a NR inter-frequency) as the serving cell. The UE may derive a reception level and a reception quality of a neighbor cell according to Equation 1 by using parameters included in SIB2 or SIB5 received in operation 1g-15, the neighbor cell being at a different RAT frequency (an inter-RAT frequency) as the serving cell.

The UE in the RRC idle mode or the RRC inactive mode may apply different cell reselection criteria, according to frequency priorities. Therefore, in operation 1g-35, the UE may compare a priority of the current serving cell with a priority of a NR inter-frequency cell or the priority of the current serving cell with a priority of an inter-RAT frequency cell. The UE may apply different cell reselection criteria to four cases below.

First case:
When at least one of a NR inter-frequency or an inter-RAT frequency whose priority is higher than that of a current serving frequency is present Second case:
When at least one of a NR inter-frequency or an inter-RAT frequency whose priority is lower than that of the current serving frequency is present Third case:
When the current serving frequency or at least one NR inter-frequency whose priority is equal to that of the current serving frequency is present Fourth case:
When there are a plurality of NR cells that satisfy the cell reselection criteria related to First case or Second case When the plurality of NR cells that satisfy the cell reselection criteria have different priorities, the UE may perform cell reselection according to a condition where RAT/frequency having a higher priority take precedence over RAT/frequency having a lower priority (Cell reselection to a higher priority RAT/frequency shall take precedence over a lower priority RAT/frequency if multiple cells of different priorities fulfill the cell reselection criteria). For example, the UE may perform cell reselection, giving highest precedence on First case or Fourth case caused by First case. When First case or Fourth case caused by First case is not satisfied, the UE may perform cell reselection according to Third case. When Third case is not satisfied, the UE may perform cell reselection, according to Second case or Fourth case caused by Second case. That is, the UE may perform cell reselection by sequentially considering whether First case (and Fourth case caused by First case), Third case, and Second case (and Fourth case caused by Second case) are satisfied. When the UE applies the cell reselection criteria, based on First case, in operation 1g-40, the UE in the RRC idle mode or the RRC inactive mode may apply NR Inter-frequency and inter-RAT cell reselection criteria. NR Inter-frequency and inter-RAT cell reselection criteria are below.

When the serving cell broadcasts system information (e.g., SIB2) including threshServingLowQ is broadcast and 1 second has elapsed after the UE camped on the serving cell, the UE may determine whether a cell or one of a plurality of cells at respective frequencies satisfies condition A below, and thus may derive a candidate target cell list of each frequency. Treselection$_{RAT}$ parameter and Thresh$_{X,HighQ}$ parameter used in condition A may be included in the system information. For example, with respect to a cell at a NR frequency whose priority is higher than the serving frequency, parameters may be included in SIB4, and with respect to a cell at an inter-RAT frequency whose priority is higher than the serving frequency, the parameters may be included in SIB5.

Condition A: When a reception quality S$_{qual}$ of a cell at a NR frequency or an E-UTRAN RAT frequency having a higher priority satisfies S$_{qual}$>Thresh$_{X,HighQ}$ during a time interval Treselection$_{RAT}$ (A cell of a higher priority NR or E-UTRAN RAT/frequency fulfills Squal>Thresh$_{X,HighQ}$ during a time interval Treselection$_{RAT}$)

Otherwise the UE may determine whether a cell or one of a plurality of cells at respective frequencies satisfies condition B below, and thus may derive a candidate target cell list of each frequency. Treselection$_{RAT}$ parameter and Thresh$_{X,HighP}$ parameter used in condition B may be included in the system information. For example, with respect to a cell at a NR frequency whose priority is higher than the serving frequency, parameters may be included in SIB4, and with respect to a cell at an inter-RAT frequency whose priority is higher than the serving frequency, the parameters may be included in SIB5.

Condition B: When at least 1 second has elapsed after the UE camped on the current serving cell, and a reception level S$_{rxlev}$ of a cell at a RAT frequency having a higher priority satisfies S$_{rxlev}$>Thresh$_{X,HighP}$ during a time interval Treselection$_{RAT}$ (A cell of a higher priority RAT/frequency fulfills Srxlev>Thresh$_{X,HighP}$ during a time interval Treselection$_{RAT}$)

In operation 1g-45, the UE may determine whether there are a plurality of cells that satisfy the cell reselection criteria applied to operation 1g-40. In this regard, the plurality of cells may indicate multiple cells at one highest-priority frequency. Also, when there are highest-priority frequencies and one or more cells are present for each of the highest-priority frequencies, the plurality of cells may indicate all of the one or more cells at the highest-priority frequencies.

In operation 1g-50, when one final candidate target cell is present, the UE may perform cell reselection on the target cell. In this regard, the UE may receive MIB and SIB1 broadcast from the target cell, may determine that a cell status is "barred" is not indicated or is not to be treated as if the cell status is "barred" with respect to the target cell, may newly derive a reception level and a reception quality of the target cell, based on the received SIB1, may determine whether the reception level and the reception quality satisfy the cell reselection criteria (S$_{rxlev}$>0 AND S$_{qual}$>0), and then may finally reselect the target cell.

In operation 1g-55, the UE may determine whether a highest-priority frequency of final candidate target cells is a NR frequency or a frequency of a different RAT.

In operation 1g-60, the UE may reselect a highest-ranked cell from among cells at the highest priority frequency(ies) satisfying cell reselection criteria of the RAT. The UE may receive MIB and SIB1 broadcast from the highest-ranked cell, may determine that a cell status is "barred" is not indicated or is not to be treated as if the cell status is "barred" with respect to the highest-ranked cell, may newly derive a reception level and a reception quality of the highest-ranked cell, based on the received SIB1, may determine whether the reception level and the reception quality satisfy the cell reselection criteria (S$_{rxlev}$>0 AND S$_{qual}$>0), and then may finally reselect the highest-ranked cell.

In operation 1g-55, when the highest-priority frequency is the NR frequency, the UE may perform operation 1g-70. Cells on which the UE performs operation 1g-70 may indicate multiple cells at one highest-priority frequency. Also, when there are highest-priority frequencies and one or more cells are present for each of the highest-priority frequencies, the plurality of cells may indicate all of the one or more cells at the highest-priority frequencies.

When the UE has to apply the cell reselection criteria due to Fourth case caused by First case, in operation 1g-70, the UE may perform ranking on all cells that satisfy the cell reselection criteria (The UE shall perform ranking of all cells that fulfill the cell selection criterion S). In this regard, the UE may perform ranking only on cells at frequency(ies) derived in operation 1g-55. A cell that satisfies the cell reselection criteria may indicate a cell whose reception level S$_{rxlev}$ and reception quality S$_{qual}$ derived by the UE in operation 1g-30 are greater than 0. Operation 1g-70 may be performed in any one of operations 1g-40, 1g-46, 1g-47, 1g-48, and 1g-49. The UE may derive, based on RSRP measurement quantity values, rankings of the respective cells that satisfy the cell reselection criteria. Rankings of the serving cell and a neighbor cell may be respectively calculated by using Equation 2 below.

$$R_s = Q_{meas,s} + Q_{hyst} - Qoffset_{temp}$$

$$R_n = Q_{meas,n} - Qoffset - Qoffset_{temp} \quad \text{Equation 2}$$

where:

| | |
|---|---|
| $Q_{meas}$ | RSRP measurement quantity used in cell reselections. |
| Qoffset | For intra-frequency: Equals to Qoffset$_{s,\,n}$, if Qoffset$_{s,\,n}$ is valid, otherwise this equals to zero.<br>For inter-frequency: Equals to Qoffset$_{s,\,n}$ plus Qoffset$_{frequency}$, if Qoffset$_{s,\,n}$ is valid, otherwise this equals to Qoffset$_{frequency}$. |
| Qoffset$_{temp}$ | Offset temporarily applied to a cell as specified in TS 38.331 [3]. |

In this regard, $Q_{meas,s}$ denotes a RSRP measurement quantity value of the serving cell, $Q_{meas,n}$ denotes a RSRP measurement quantity value of the neighbor cell, $Q_{hyst}$ denotes a hysteresis value of the serving cell, and Qoffset indicates an offset between the serving cell and the neighbor cell. SIB2 includes a $Q_{hyst}$ value, and the $Q_{hyst}$ value may be commonly used in reselecting intra-frequency/inter-frequency cells. When the intra-frequency cell is reselected, Qoffset is signaled according to each cell, is applied only to a designated cell, and is included in SIB3 When the inter-frequency cell is reselected, Qoffset is signaled according to each cell, is applied only to a designated cell, and is included in SIB4.

In operation 1g-75, the UE in the RRC idle mode or the RRC inactive mode may determine whether rangeToBestCell is configured in the system information. rangeToBestCell may be signaled in SIB2 and may be commonly used in reselecting intra-frequency/inter-frequency cells. Also, rangeToBestCell may be signaled in SIB4 and may be used only in reselecting an inter-frequency cell.

In operation 1g-80, the UE in the RRC idle mode or the RRC inactive mode may reselect the highest-ranked cell derived in operation 1g-70. In order for the UE to reselect a new cell (the highest-ranked cell), conditions below have to be satisfied.

A cell that satisfies the cell reselection criteria during a time interval Treselection$_{RAT}$ has to be better than the current serving cell (the new cell is better than the serving cell according to the cell reselection criteria during a time interval Treselection$_{RAT}$).

At least 1 second has to have elapsed after the UE camped on the current serving cell.

The UE may receive MIB and SIB1 broadcast from the cell that satisfies the cell reselection criteria, may determine that a cell status is "barred" is not indicated or is not to be treated as if the cell status is "barred" with respect to the cell, may newly derive a reception level and a reception quality of the cell, based on the received SIB1, may determine whether the reception level and the reception quality satisfy the cell reselection criteria ($S_{rxlev}>0$ AND $S_{qual}>0$), and then may finally reselect the cell.

In operation 1g-85, the UE in the RRC idle mode or the RRC inactive mode may perform cell reselection on a cell with the highest number of beams above the threshold (i.e. absThreshSS-BlocksConsolidation) from among cells whose R value is within rangeToBestCell of the R value of the highest-ranked cell.

In this regard, absThreshSS-BlocksConsolidation may be signaled in SIB4 according to each of NR inter-frequencies. When one NR inter-frequency having the highest priority is derived in operation 1g-55 and a plurality of candidate target cells are present at the one NR inter-frequency, absThreshSS-BlocksConsolidation with respect to the one NR inter-frequency may not be configured in SIB4. In this case, an operation of the UE to reselect a cell may be uncertain. Also, in a case where a plurality of NR inter-frequencies having the highest priority (highest-priority frequencies) are derived in operation 1g-55, and one or more candidate target cells are present at each of the NR inter-frequencies, when absThreshSS-BlocksConsolidation with respect to at least one of the NR inter-frequencies is not configured in SIB4, an operation of the UE to reselect a cell may be uncertain. Therefore, when absThreshSS-BlocksConsolidation is not configured with respect to a NR inter-frequency on which one or more candidate target cells are present, the disclosure proposes that the UE according to an embodiment of the disclosure applies the cell reselection criteria by configuring absThreshSS-BlocksConsolidation as a default value. As the default value, different values may be applied to frequencies, respectively, or a same value may be applied thereto. When absThreshSS-BlocksConsolidation is configured with respect to a NR inter-frequency on which one or more candidate target cells are present, the UE may apply the cell reselection criteria by configuring a signaled value as absThreshSS-BlocksConsolidation.

| If absThreshSS-BlocksConsolidation in SIB4 is signaled for the concerned highest-priority NR inter-frequency(ies) | Cell reselection criteria |
|---|---|
| Yes, use signaled value for threshold (i.e. absThreshSS-BlocksConsolidation) | Highest # of beams above threshold (i.e. absThreshSS-BlocksConsolidation) among the cells whose R value is within rangetoBestCell of the R value of the highest ranked cell |
| No, use default value for threshold (i.e. absThreshSS-BlocksConsolidation) | |

In order for the UE to reselect a new cell (the highest-ranked cell) that satisfies the conditions, conditions below have to be satisfied.

The new cell that satisfies the cell reselection criteria during a time interval Treselection$_{RAT}$ has to be better than the current serving cell (the new cell is better than the serving cell according to the cell reselection criteria during a time interval TreselectionRAT).

At least 1 second has to have elapsed after the UE camped on the current serving cell.

When one cell satisfies the conditions above, the UE may determine the one cell as a final candidate cell and thus may reselect the one cell. When a plurality of cells satisfy the conditions above, the UE may determine a highest-ranked cell as a final candidate cell, the highest-ranked cell being from among the plurality of cells, and thus may reselect the highest-ranked cell (If there are multiple such cells, the UE shall perform cell reselection to the highest ranked cell among them). The UE may receive MIB and SIB1 broadcast from the final candidate cell, may determine that a cell status is "barred" is not indicated or is not to be treated as if the cell status is "barred" with respect to the final candidate cell, may newly derive a reception level and a reception quality of the final candidate cell, based on the received SIB1, may determine whether the reception level and the reception quality satisfy the cell reselection criteria ($S_{rxlev}>0$ AND $S_{qual}>0$), and then may finally reselect the final candidate cell.

When the UE has to apply the cell reselection criteria, based on Second case, in operation 1g-40, the UE in the RRC idle mode or the RRC inactive mode may apply NR Inter-frequency and inter-RAT cell reselection criteria. NR Inter-frequency and inter-RAT cell reselection criteria are below.

When the serving cell broadcasts system information (e.g., SIB2) including threshServingLowQ is broadcast and 1 second has elapsed after the UE camped on the serving cell, the UE may determine whether a cell or one of a plurality of cells at respective frequencies satisfies condition C below, and thus may derive a candidate target cell list of each frequency. Treselection$_{RAT}$ parameter, Thresh$_{Serving,LowQ}$ parameter, and Thresh$_{X,LowQ}$ parameter used in condition C may be included in the system information. For example, a parameter (e.g., Thresh$_{Serving,LowQ}$) related to a serving frequency may be included in SIB2, and with respect to a cell at a NR frequency whose priority is lower than the serving frequency, parameters (e.g., Treselection$_{RAT}$, Thresh$_{X,LowQ}$) may be included in SIB4, and with respect to a cell at an inter-RAT frequency whose priority is lower than the serving frequency, the parameters (e.g., Treselection$_{RAT}$, Thresh$_{X,LowQ}$) may be included in SIB5.

Condition C: When a reception quality S$_{qual}$ of the current serving cell is lower than Thresh$_{Serving,LowQ}$, and a reception quality S$_{qual}$ of a cell at a NR frequency or an E-UTRAN/RAT frequency having a lower priority is higher than Thresh$_{X,LowQ}$ (The serving frequency fulfills Squal<Thresh$_{Serving,LowQ}$ and a cell of a lower priority NR or E-UTRAN RAT/frequency fulfils Squal-Thresh$_{X,LowQ}$ during a time interval Treselection$_{RAT}$)

Otherwise the UE may determine whether a cell or one of a plurality of cells at respective frequencies satisfies condition D below, and thus may derive a candidate target cell list of each frequency. TreselectionRAT parameter, Thresh$_{Serving,LowP}$ parameter, and Thresh$_{X,LowP}$ parameter used in condition D may be included in the system information. For example, a parameter (e.g., Thresh$_{Serving,LowP}$) related to the serving frequency may be included in SIB2, and with respect to a cell at a NR frequency having a lower priority than the serving frequency, the parameters (e.g., Treselection$_{RAT}$, Thresh$_{X,LowP}$) may be included in SIB4, and with respect to a cell at an inter-RAT frequency having a lower priority than the serving frequency, the parameters (e.g., Treselection$_{RAT}$, Thresh$_{X,LowP}$) may be included in SIB5.

Condition D: When at least 1 second has elapsed after the UE camped on the current serving cell, and a reception level S$_{rxlev}$ of the current serving cell is lower than Thresh$_{Serving,LowP}$, and a reception level S$_{rxlev}$ of a cell at a RAT frequency having a lower priority is higher than Thresh$_{X,LowP}$ (The serving frequency fulfills Srxlev<Thresh$_{Serving,LowP}$ and a cell of a lower priority RAT/frequency fulfils Srxlev>Thresh$_{X,LowP}$ during a time interval TreselectionRAT)

In operation 1g-45, the UE may determine whether there are a plurality of cells that satisfy the cell reselection criteria applied to operation 1g-40. In this regard, the plurality of cells may indicate multiple cells at one highest-priority frequency. Also, when there are highest-priority frequencies and one or more cells are present for each of the highest-priority frequencies, the plurality of cells may indicate all of the one or more cells at the highest-priority frequencies.

In operation 1g-50, when one final candidate target cell is present, the UE may perform cell reselection on the target cell. In this regard, the UE may receive MIB and SIB1 broadcast from the target cell, may determine that a cell status is "barred" is not indicated or is not to be treated as if the cell status is "barred" with respect to the target cell, may newly derive a reception level and a reception quality of the target cell, based on the received SIB1, may determine whether the reception level and the reception quality satisfy the cell reselection criteria (S$_{rxlev}$>0 AND S$_{qual}$>0), and then may finally reselect the target cell.

In operation 1g-55, the UE may determine whether a highest-priority frequency is a NR frequency or a frequency of a different RAT.

In operation 1g-60, the UE may reselect a highest-ranked cell from among cells at the highest priority frequency(ies) satisfying cell reselection criteria of the RAT. The UE may receive MIB and SIB1 broadcast from the highest-ranked cell, may determine that a cell status is "barred" is not indicated or is not to be treated as if the cell status is "barred" with respect to the highest-ranked cell, may newly derive a reception level and a reception quality of the highest-ranked cell, based on the received SIB1, may determine whether the reception level and the reception quality satisfy the cell reselection criteria (S$_{rxlev}$>0 AND S$_{qual}$>0), and then may finally reselect the highest-ranked cell.

In operation 1g-55, when the highest-priority frequency is the NR frequency, the UE may perform operation 1g-70. Cells on which the UE performs operation 1g-70 may indicate multiple cells at one highest-priority frequency. Also, when there are highest-priority frequencies and one or more cells are present for each of the highest-priority frequencies, the plurality of cells may indicate all of the one or more cells at the highest-priority frequencies.

When the UE has to apply the cell reselection criteria due to Fourth case caused by Second case, in operation 1g-70, the UE may perform ranking on all cells that satisfy the cell reselection criteria (The UE shall perform ranking of all cells that fulfill the cell selection criterion S). In this regard, the UE may perform ranking only on cells at frequencies derived in operation 1g-55. A cell that satisfies the cell reselection criteria may indicate a cell whose reception level S$_{rxlev}$ and reception quality S$_{qual}$ derived by the UE in operation 1g-30 are greater than 0. Operation 1g-70 may be performed in any one of operations 1g-40, 1g-46, 1g-47, 1g-48, and 1g-49. The UE may derive, based on RSRP measurement quantity values, rankings of the respective cells that satisfy the cell reselection criteria. Rankings of the serving cell and a neighbor cell may be respectively calculated by using Equation 2.

In operation 1g-75, the UE in the RRC idle mode or the RRC inactive mode may determine whether rangeToBestCell is configured in the system information.

In operation 1g-80, the UE in the RRC idle mode or the RRC inactive mode may reselect the highest-ranked cell derived in operation 1g-70. In order for the UE to reselect a new cell (the highest-ranked cell), conditions below have to be satisfied.

A cell that satisfies the cell reselection criteria during a time interval TreselectionRAT has to be better than the current serving cell (the new cell is better than the serving cell according to the cell reselection criteria during a time interval TreselectionRAT).

At least 1 second has to have elapsed after the UE camped on the current serving cell.

The UE may receive MIB and SIB1 broadcast from the cell that satisfies the cell reselection criteria, may determine that a cell status is "barred" is not indicated or is not to be treated as if the cell status is "barred" with respect to the cell, may newly derive a reception level and a reception quality of the cell, based on the received SIB1, may determine whether the reception level and the reception quality satisfy the cell reselection criteria ($S_{rxlev}$>0 AND $S_{qual}$>0), and then may finally reselect the cell.

In operation 1g-85, the UE in the RRC idle mode or the RRC inactive mode may perform cell reselection on a cell with the highest number of beams above the threshold (i.e. absThreshSS-BlocksConsolidation) from among cells whose R value is within rangeToBestCell of the R value of the highest-ranked cell.

In this regard, absThreshSS-BlocksConsolidation may be signaled in SIB4 according to each of NR inter-frequencies. When one NR inter-frequency having the highest priority is derived in operation 1g-55 and a plurality of candidate target cells are present at the one NR inter-frequency, absThreshSS-BlocksConsolidation with respect to the one NR inter-frequency may not be configured in SIB4. In this case, an operation of the UE to reselect a cell may be uncertain. Also, in a case where a plurality of NR inter-frequencies having the highest priority (highest-priority frequencies) are derived in operation 1g-55, and one or more candidate target cells are present at each of the NR inter-frequencies, when absThreshSS-BlocksConsolidation with respect to at least one of the NR inter-frequencies is not configured in SIB4, an operation of the UE to reselect a cell may be uncertain. Therefore, when absThreshSS-BlocksConsolidation is not configured with respect to the NR inter-frequency at which one or more candidate target cells are present, the disclosure proposes that the UE according to an embodiment of the disclosure applies the cell reselection criteria by configuring absThreshSS-BlocksConsolidation as a default value. As the default value, different values may be applied to frequencies, respectively, or a same value may be applied thereto. When absThreshSS-BlocksConsolidation is configured with respect to at least one of the NR inter-frequencies at which one or more candidate target cells are present, the UE may apply the cell reselection criteria by configuring a signaled value as absThreshSS-BlocksConsolidation.

| If absThreshSS-BlocksConsolidation in SIB4 is signaled for the concerned highest-priority NR inter-frequency(ies) | Cell reselection criteria |
| --- | --- |
| Yes, use signaled value for threshold (i.e. absThreshSS-BlocksConsolidation) No, use default value for threshold (i.e. absThreshSS-BlocksConsolidation) | Highest # of beams above threshold (i.e. absThreshSS-BlocksConsolidation) among the cells whose R value is within rangetoBestCell of the R value of the highest ranked cell |

In order for the UE to reselect a new cell (the highest-ranked cell) that satisfies the conditions, conditions below have to be satisfied.

The new cell that satisfies the cell reselection criteria during a time interval $Treselection_{RAT}$ has to be better than the current serving cell (the new cell is better than the serving cell according to the cell reselection criteria during a time interval $Treselection_{RAT}$).

At least 1 second has to have elapsed after the UE camped on the current serving cell.

When one cell satisfies the conditions above, the UE may determine the one cell as a final candidate cell and thus may reselect the one cell. When a plurality of cells satisfy the conditions above, the UE may determine a highest-ranked cell as a final candidate cell, the highest-ranked cell being from among the plurality of cells, and thus may reselect the highest-ranked cell (If there are multiple such cells, the UE shall perform cell reselection to the highest ranked cell among them). The UE may receive MIB and SIB1 broadcast from the final candidate cell, may determine that a cell status is "barred" is not indicated or is not to be treated as if the cell status is "barred" with respect to the final candidate cell, may newly derive a reception level and a reception quality of the final candidate cell, based on the received SIB1, may determine whether the reception level and the reception quality satisfy the cell reselection criteria ($S_{rxlev}$>0 AND $S_{qual}$>0), and then may finally reselect the final candidate cell.

When the UE has to apply the cell reselection criteria, based on Third case, in operation 1g-70, the UE in the RRC idle mode or the RRC inactive mode may perform ranking on all cells that satisfy the cell selection criterion (The UE shall perform ranking of all cells that fulfill the cell selection criterion S). A cell that satisfies the cell reselection criteria may indicate a cell whose reception level $S_{rxlev}$ and reception quality $S_{qual}$ derived by the UE in operation 1g-30 are greater than 0. The UE may derive, based on RSRP measurement quantity values, rankings of the respective cells that satisfy the cell reselection criteria. Rankings of the serving cell and a neighbor cell may be respectively calculated by using Equation 2 above.

In operation 1g-75, the UE in the RRC idle mode or the RRC inactive mode may determine whether rangeToBestCell is configured in the system information. rangeToBestCell may be signaled in SIB2 and may be commonly used in reselecting intra-frequency/inter-frequency cells. Also, rangeToBestCell may be signaled in SIB4 and may be used only in reselecting an inter-frequency cell.

In operation 1g-80, the UE in the RRC idle mode or the RRC inactive mode may reselect a highest-ranked cell, based on the rankings derived in operation 1g-70 (the UE shall perform cell reselection to the highest ranked cell). In order for the UE to reselect a new cell (the highest-ranked cell), conditions below have to be satisfied.

A cell that satisfies the cell reselection criteria during a time interval $Treselection_{RAT}$ has to be better than the current serving cell (the new cell is better than the serving cell according to the cell reselection criteria during a time interval $Treselection_{RAT}$).

At least 1 second has to have elapsed after the UE camped on the current serving cell.

The UE may reselect the cell that satisfies the condition above. In this regard, the UE may receive MIB and SIB1 broadcast from the cell, may determine that a cell status is "barred" is not indicated or is not to be treated as if the cell status is "barred" with respect to the cell, may newly derive a reception level and a reception quality of the cell, based on the received SIB1, may determine whether the reception level and the reception quality satisfy the cell reselection criteria ($S_{rxlev}$>0 AND $S_{qual}$>0), and then may finally reselect the cell.

In operation 1g-85, the UE in the RRC idle mode or the RRC inactive mode may perform cell reselection on a cell with the highest number of beams above the threshold (i.e. absThreshSS-BlocksConsolidation) from among cells whose R value is within rangeToBestCell of the R value of the highest-ranked cell.

In this regard, absThreshSS-BlocksConsolidation with respect to a NR intra-frequency may be signaled in SIB2, and absThreshSS-BlocksConsolidation with respect to an equal-priority NR frequency may be signaled in SIB4 according to each of equal-priority NR frequencies. When absThreshSS-BlocksConsolidation is not signaled in SIB2 or SIB4, an operation of the UE to reselect a cell may be uncertain. Therefore, when absThreshSS-BlocksConsolidation is not configured with respect to a NR inter-frequency at which one or more candidate target cells are present, or absThreshSS-BlocksConsolidation is not configured with respect to equal-priority NR inter-frequency at which one or more candidate target cells are present, the disclosure proposes that the UE according to an embodiment of the disclosure applies the cell reselection criteria by configuring absThreshSS-BlocksConsolidation as a default value. As the default value, different values may be applied to frequencies, respectively, or a same value may be applied thereto. When absThreshSS-BlocksConsolidation is configured with respect to the NR inter-frequency or the equal-priority NR inter-frequency at which one or more candidate target cells are present, the UE may apply the cell reselection criteria by configuring a signaled value as absThreshSS-BlocksConsolidation.

| If absThreshSS-BlocksConsolidation in SIB2 is signaled for NR intra-frequency | If absThreshSS-BlocksConsolidation in SIB4 is signaled for equal-priority NR inter-frequency(ies) | Cell reselection criteria |
|---|---|---|
| Yes, use signaled value for threshold (i.e. absThreshSS-BlocksConsolidation) for cells of NR intra-frequency | Yes, use signaled value for threshold (i.e. absThreshSS-BlocksConsolidation) for cells of equal-priority NR frequency(ies) | Highest # of beams above threshold (i.e. absThreshSS-BlocksConsolidation) among the cells whose R value is within rangetoBestCell of the R value of the highest ranked cell. |
| No, use default value for threshold (i.e. absThreshSS-BlocksConsolidation) for cells of NR intra-frequency | No, use default value for threshold (i.e. absThreshSS-BlocksConsolidation) for cells of equal-priority NR inter-frequency(ies) | |

In order for the UE to reselect a new cell (the highest-ranked cell) that satisfies the conditions, conditions below have to be satisfied.

The new cell that satisfies the cell reselection criteria during a time interval $Treselection_{RAT}$ has to be better than the current serving cell (the new cell is better than the serving cell according to the cell reselection criteria during a time interval $Treselection_{RAT}$).

At least 1 second has to have elapsed after the UE camped on the current serving cell.

When one cell satisfies the conditions above, the UE may determine the one cell as a final candidate cell and thus may reselect the one cell. When a plurality of cells satisfy the conditions above, the UE may determine a highest-ranked cell as a final candidate cell, the highest-ranked cell being from among the plurality of cells, and thus may reselect the highest-ranked cell (If there are multiple such cells, the UE shall perform cell reselection to the highest ranked cell among them). The UE may receive MIB and SIB1 broadcast from the final candidate cell, may determine that a cell status is "barred" is not indicated or is not to be treated as if the cell status is "barred" with respect to the final candidate cell, may newly derive a reception level and a reception quality of the final candidate cell, based on the received SIB1, may determine whether the reception level and the reception quality satisfy the cell reselection criteria ($S_{rxlev}$>0 AND $S_{qual}$>0), and then may finally reselect the final candidate cell.

Also, in operation 1g-85, when absThreshSS-BlocksConsolidation with respect to a NR intra-frequency is not configured in SIB2, and absThreshSS-BlocksConsolidation with respect to all equal-priority NR frequencies are not configured in SIB4, the UE in the RRC idle mode or the RRC inactive mode may reselect a highest-ranked cell, based on the rankings derived in operation 1g-70 (the UE shall perform cell reselection to the highest ranked cell). In order for the UE to reselect a new cell (the highest-ranked cell), conditions below have to be satisfied.

A cell that satisfies the cell reselection criteria during a time interval $Treselection_{RAT}$ has to be better than the current serving cell (the new cell is better than the serving cell according to the cell reselection criteria during a time interval $Treselection_{RAT}$).

At least 1 second has to have elapsed after the UE camped on the current serving cell.

The UE may reselect the cell that satisfies the condition above. In this regard, the UE may receive MIB and SIB1 broadcast from the cell, may determine that a cell status is "barred" is not indicated or is not to be treated as if the cell status is "barred" with respect to the cell, may newly derive a reception level and a reception quality of the cell, based on the received SIB1, may determine whether the reception level and the reception quality satisfy the cell reselection criteria ($S_{rxlev}$>0 AND $S_{qual}$>0), and then may finally reselect the cell.

Figure 1H:
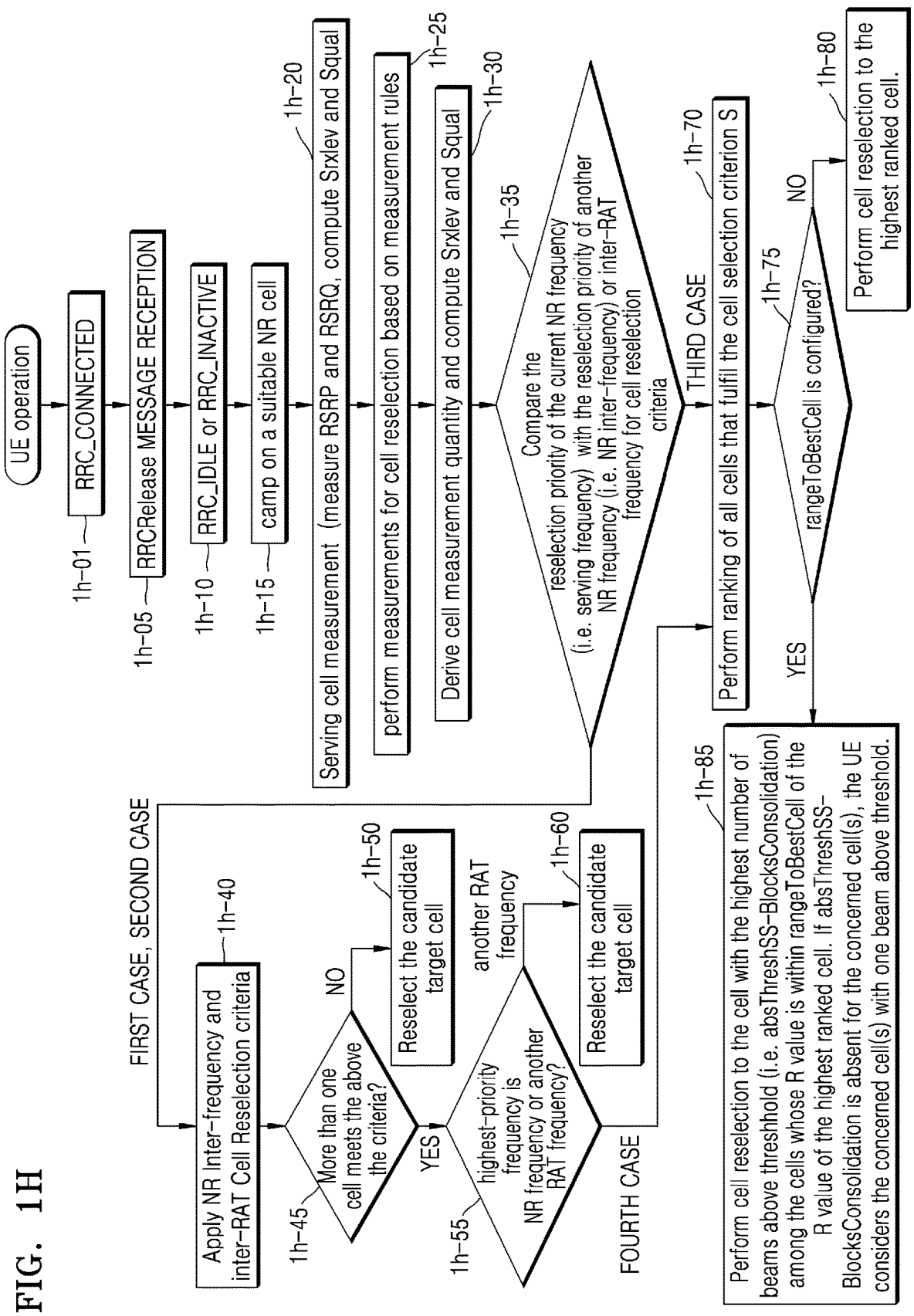
FIG. 1H is a diagram for describing a procedure in which a UE transits from an RRC connected mode to an RRC inactive mode or an RRC idle mode, and then performs a cell reselection procedure, according to an embodiment of the disclosure.

FIG. 1H is a diagram for describing a procedure in which a BS releases connection to a UE and thus the UE transits from an RRC connected mode (RRC_CONNECTED) to an RRC inactive mode (RRC_INACTIVE) or an RRC idle mode (RRC_IDLE), and then the UE in the RRC inactive mode (RRC_INACTIVE) or the RRC idle mode (RRC_IDLE) performs a cell reselection procedure, according to an embodiment of the disclosure.

The cell reselection procedure may refer to a procedure in which, when a service quality of a serving cell deteriorates compared to a service quality of a neighbor cell, the UE in the RRC inactive mode (RRC_INACTIVE) or the RRC idle mode (RRC_IDLE) determines whether to maintain a current serving cell or to reselect the neighbor cell.

In handover, whether to operate handover is determined due to a network (an MME, an AMF, a source eNB, or a source gNB) whereas, in cell reselection, the UE may autonomously determine whether to reselect a cell, based on a cell measurement value. A cell to be reselected by a moving UE may refer to a cell using a same NR frequency (a NR intra-frequency) as a serving cell that the UE currently camps on, a cell using a different NR frequency (a NR intra-frequency) as the serving cell, or a cell using a frequency (an inter-RAT frequency) used in a different RAT.

Referring to FIG. 1H, the UE may be in an RRC connected mode (RRC_CONNECTED) (1h-01).

In operation 1h-05, the UE in the RRC connected mode may receive an RRCRelease message from a BS.

In operation 1h-10, the UE may switch to an RRC inactive mode (RRC_INACTIVE) or an RRC idle mode (RRC_IDLE), according to whether the RRCRelease message received in operation 1h-05 includes suspended configuration information (suspendConfig). For example, when the UE successfully receives the RRCRelease message including the suspended configuration information, the UE in the RRC connected mode may switch to the RRC inactive mode. On the other hand, when the UE successfully receives the RRCRelease message not including the suspended configuration information, the UE in the RRC connected mode may switch to the RRC idle mode.

In operation 1h-15, the UE in the RRC idle mode or the RRC inactive mode may search for and camp on a suitable cell by performing a cell selection procedure. The suitable cell that the UE in the RRC idle mode or the RRC inactive mode found and camped on may be called a serving cell. To perform the cell selection procedure, the UE may receive system information (e.g., MIB and/or SIB1 broadcast from a cell. Alternatively, before or after the UE camps on the cell, the UE may receive system information (e.g., SIB2 and/or SIB3 and/or SIB4 and/or SIB5) broadcast from the cell. SIB2 may include information/parameters that are commonly applied to when the UE in the RRC idle mode or the RRC inactive mode reselects a NR intra-frequency cell, a NR inter-frequency cell, and an inter-RAT frequency cell. SIB3 may include information/parameters that are applied to only when the UE in the RRC idle mode or the RRC inactive mode reselects a NR intra-frequency cell. SIB4 may include information/parameters that are applied to only when the UE in the RRC idle mode or the RRC inactive mode reselects a NR inter-frequency cell. SIB5 may include information/parameters that are applied to only when the UE in the RRC idle mode or the RRC inactive mode reselects an inter-RAT frequency cell.

In operation 1$h$-20, the UE in the RRC idle mode or the RRC inactive mode may measure RSRP $Q_{rxlevmeas}$ and RSRQ $Q_{qualmeas}$. In detail, the UE may calculate a reception level $S_{rxlev}$ and a reception quality $S_{qual}$ of the serving cell by using the parameters included in SIB1 received in operation 1$h$-15. For example, the UE may calculate the reception level $S_{rxlev}$ and the reception quality $S_{qual}$ of the serving cell by using Equation 1 below.

$$Srxlev=Q_{rxlevmeas}-(Q_{rxlevmin}+Q_{rxlevminoffset})-P_{compensation}-Q\text{offset}temp,$$

$$Squal=Q_{qualmeas}-(Q_{qualmin}+Q_{qualminoffset})-Q\text{offset}_{temp}. \quad \text{Equation 1}$$

Definitions of parameters used in Equation 1 may be determined according to the 3GPP standard specification titled "38.304: User Equipment (UE) procedures in Idle mode and RRC Inactive state". Hereinafter, the definitions are equally applied to embodiments of the disclosure to which Equation 1 is applied.

In operation 1$h$-25, the UE in the RRC idle mode or the RRC inactive mode may perform measurement for cell reselection. In this regard, the UE may perform the neighbor cell measurement based on measurement rules so as to minimize consumption of a battery power or due to a certain reason.

When the reception level and the reception quality of the serving cell are greater than a threshold value ($S_{rxlev}>S_{IntmSearchP}$ and $S_{intrasearchQ}$), the UE may not perform NR intra-frequency cell measurement.

When the reception level and the reception quality of the serving cell are equal to or smaller than the threshold value ($S_{rxlev}\leq S_{IntraSearchP}$ and $S_{intraSearchQ}$), the UE may perform NR intra-frequency cell measurement.

For a NR inter-frequency cell or an inter-RAT frequency cell whose reselection priority is higher than a NR frequency of a current serving cell, the UE may perform measurement.

When the reception level and the reception quality of the serving cell are greater than the threshold value ($S_{rxlev}>S_{IntraSearchP}$ and $S_{intraSearchQ}$), the UE may not perform measurement on a NR inter-frequency cell whose reselection priority is equal to or lower than the NR frequency of the current serving cell or an inter-RAT frequency cell whose reselection priority is lower than the NR frequency of the current serving cell.

When the reception level and the reception quality of the serving cell are equal to or smaller than the threshold value ($S_{rxlev}\leq S_{nonIntraSearchP}$ and $S_{nonintraSearchQ}$), the UE may perform measurement on a NR inter-frequency cell whose reselection priority is equal to or lower than the NR frequency of the current serving cell or an inter-RAT frequency cell whose reselection priority is lower than the NR frequency of the current serving cell.

When the RRCRelease message received in operation 1$h$-05 includes cell reselection priority information, frequency priority information may indicate frequency priority information included in the cell reselection priority information included in the RRCRelease message. When the RRCRelease message received in operation 1$h$-05 does not include cell reselection priority information, frequency priority information may indicate cell reselection priority information included in the system information received in operation 1$h$-15.

The aforementioned threshold values of $S_{IntmSearchP}$, $S_{intraSearchQ}$, $S_{nonIntraSearchP}$, and $S_{nonintraSearchQ}$ may be included in SIB2.

In operation 1$h$-30, to reselect a cell that performs a multi-beam operation, the UE in the RRC idle mode or the RRC inactive mode may derive a measurement quantity value of each cell, based on beams respectively corresponding to cells with respect to a SS/PBCH block. According to an embodiment of the disclosure, the UE may derive a measurement quantity value of a cell by using one of methods below.

A case where condition 1 below is satisfied, the UE may derive, as a highest beam measurement quantity value, a measurement quantity value of a neighbor cell at a same NR frequency (a NR intra-frequency) as the serving cell.—A case where condition 1 below is not satisfied, the UE may derive a measurement quantity value of a neighbor cell at a same NR intra-frequency as the serving cell by performing linear averaging on the power values up to nrofSS-BlocksToAverage of highest beam measurement quantity values that are greater than absThreshSS-BlocksConsolidation.

The case where condition 1 is satisfied may indicate a case where at least one of three conditions below is satisfied.
when nrofSS-BlocksToAverage is not configured in SIB2
when absThreshSS-BlocksConsolidation is not configured in SIB2
when a highest beam measurement quantity value is equal to or smaller than absThreshSS-BlocksConsolidation A case where condition 2 below is satisfied, the UE may derive, as a highest beam measurement quantity value, a measurement quantity value of a neighbor cell at a different NR frequency (a NR inter-frequency) from that of the serving cell.—A case where condition 2 below is not satisfied, the UE may derive a measurement quantity value of a neighbor cell at a different NR frequency (a NR inter-frequency) from that of the serving cell by performing linear averaging on the power values up to nrofSS-BlocksToAverage of highest beam measurement quantity values above absThreshSS-BlocksConsolidation.

The case where condition 2 is satisfied may indicate a case where at least one of three conditions below is satisfied.
when nrofSS-BlocksToAverage is not configured in SIB4
when absThreshSS-BlocksConsolidation is not configured in SIB4
when a highest beam measurement quantity value is equal to or smaller than absThreshSS-BlocksConsolidation
nrofSS-BlocksToAverage and absThreshSS-BlocksConsolidation may be signaled in SIB4 at each NR inter-frequency, and thus, the UE may derive a measurement quantity value of a neighbor cell at a NR inter-frequency by applying condition 2 to each of NR inter-frequencies.

In operation 1h-30, the UE in the RRC idle mode or the RRC inactive mode may derive a measurement quantity value of each cell so as to reselect a cell (e.g., an LTE cell in an inter-RAT frequency) that does not perform the multi-beam operation. The measurement quantity value may indicate RSRP $Q_{rxlevmeas}$ or RSRQ $Q_{qualmeas}$.

In operation 1h-30, the UE may derive a reception level and a reception quality of each cell, based on the derived measurement quantity value of each cell. In detail, the UE may derive a reception level and a reception quality of a neighbor cell according to Equation 1 by using parameters included in SIB2 or SIB3 received in operation 1h-15, the neighbor cell being at a same NR frequency (a NR intra-frequency) as the serving cell. The UE may derive a reception level and a reception quality of a neighbor cell according to Equation 1 by using parameters included in SIB2 or SIB4 received in operation 1h-15, the neighbor cell being at a different NR frequency (a NR inter-frequency) as the serving cell. The UE may derive a reception level and a reception quality of a neighbor cell according to Equation 1 by using parameters included in SIB2 or SIB5 received in operation 1h-15, the neighbor cell being at a different RAT frequency (an inter-RAT frequency) as the serving cell.

The UE in the RRC idle mode or the RRC inactive mode may apply different cell reselection criteria, according to frequency priorities. Therefore, in operation 1h-35, the UE may compare a priority of the current serving cell with a priority of a NR inter-frequency cell or the priority of the current serving cell with a priority of an inter-RAT frequency cell. The UE may apply different cell reselection criteria to four cases below.

First case:
When at least one of a NR inter-frequency or an inter-RAT frequency whose priority is higher than that of a current serving frequency is present Second case:
When at least one of a NR inter-frequency or an inter-RAT frequency whose priority is lower than that of the current serving frequency is present Third case:
When the current serving frequency or at least one NR inter-frequency whose priority is equal to that of the current serving frequency is present Fourth case:
When there are a plurality of NR cells that satisfy the cell reselection criteria related to First case or Second case When the plurality of NR cells that satisfy the cell reselection criteria have different priorities, the UE may perform cell reselection according to a condition where RAT/frequency having a higher priority take precedence over RAT/frequency having a lower priority (Cell reselection to a higher priority RAT/frequency shall take precedence over a lower priority RAT/frequency if multiple cells of different priorities fulfill the cell reselection criteria) For example, the UE may perform cell reselection, giving highest precedence on First case or Fourth case caused by First case. When First case or Fourth case caused by First case is not satisfied, the UE may perform cell reselection according to Third case. When Third case is not satisfied, the UE may perform cell reselection, according to Second case or Fourth case caused by Second case. That is, the UE may perform cell reselection by sequentially considering whether First case (and Fourth case caused by First case), Third case, and Second case (and Fourth case caused by Second case) are satisfied.

When the UE applies the cell reselection criteria, based on First case, in operation 1h-40, the UE in the RRC idle mode or the RRC inactive mode may apply NR Inter-frequency and inter-RAT cell reselection criteria. NR Inter-frequency and inter-RAT cell reselection criteria are below.

When the serving cell broadcasts system information (e.g., SIB2) including threshServingLowQ is broadcast and 1 second has elapsed after the UE camped on the serving cell, the UE may determine whether a cell or one of a plurality of cells at respective frequencies satisfies condition A below, and thus may derive a candidate target cell list of each frequency. TreselectionRAT parameter and $Thresh_{X,HighQ}$ parameter used in condition A may be included in the system information. For example, with respect to a cell at a NR frequency whose priority is higher than the serving frequency, parameters may be included in SIB4, and with respect to a cell at an inter-RAT frequency whose priority is higher than the serving frequency, the parameters may be included in SIB5.

Condition A: When a reception quality $S_{qual}$ of a cell at NR frequency or E-UTRAN RAT frequency having a higher priority satisfies $S_{qual}$>$Thresh_{X,HighQ}$ during a time interval TreselectionRAT (A cell of a higher priority NR or E-UTRAN RAT/frequency fulfills Squal>$Thresh_{X,HighQ}$ during a time internal $Treselection_{RAT}$)

Otherwise the UE may determine whether a cell or one of a plurality of cells at respective frequencies satisfies condition B below, and thus may derive a candidate target cell list of each frequency. TreselectionRAT parameter and $Thresh_{X,HighP}$ parameter used in condition B may be included in the system information. For example, with respect to a cell at a NR frequency whose priority is higher than the serving frequency, parameters may be included in SIB4, and with respect to a cell at an inter-RAT frequency whose priority is higher than the serving frequency, the parameters may be included in SIB5.

Condition B: When at least 1 second has elapsed after the UE camped on the current serving cell, and a reception level $S_{rxlev}$ of a cell at a RAT frequency having a higher priority satisfies $S_{rxlev}$>$Thresh_{X,HighP}$ during a time interval $Treselection_{RAT}$ (A cell of a higher priority RAT/frequency fulfills $S_{rxlev}$>$Thresh_{X,HighP}$ during a time internal $Treselection_{RAT}$)

In operation 1h-45, the UE may determine whether there are a plurality of cells that satisfy the cell reselection criteria applied to operation 1h-40. In this regard, the plurality of cells may indicate multiple cells at one highest-priority frequency. Also, when there are highest-priority frequencies and one or more cells are present for each of the highest-priority frequencies, the plurality of cells may indicate all of the one or more cells at the highest-priority frequencies.

In operation 1h-50, when one final candidate target cell is present, the UE may perform cell reselection on the target cell. In this regard, the UE may receive MIB and SIB1 broadcast from the target cell, may determine that a cell status is "barred" is not indicated or is not to be treated as if the cell status is "barred" with respect to the target cell, may newly derive a reception level and a reception quality of the target cell, based on the received SIB1, may determine whether the reception level and the reception quality satisfy the cell reselection criteria ($S_{rxlev}$>0 AND $S_{qual}$>0), and then may finally reselect the target cell.

In operation 1h-55, the UE may determine whether a highest-priority frequency is a NR frequency or a frequency of a different RAT.

In operation 1h-60, the UE may reselect a highest-ranked cell from among cells at the highest priority frequency(ies) satisfying cell reselection criteria of the RAT. The UE may receive MIB and SIB1 broadcast from the highest-ranked cell, may determine that a cell status is "barred" is not indicated or is not to be treated as if the cell status is "barred" with respect to the highest-ranked cell, may newly derive a reception level and a reception quality of the highest-ranked cell, based on the received SIB1, may determine whether the reception level and the reception quality satisfy the cell reselection criteria ($S_{rxlev} > 0$ AND $S_{qual} > 0$), and then may finally reselect the highest-ranked cell.

In operation 1h-55, when the highest-priority frequency is the NR frequency, the UE may perform operation 1h-70. Cells on which the UE performs operation 1h-70 may indicate multiple cells at one highest-priority frequency. Also, when there are highest-priority frequencies and one or more cells are present for each of the highest-priority frequencies, the plurality of cells may indicate all of the one or more cells at the highest-priority frequencies.

When the UE has to apply the cell reselection criteria due to Fourth case caused by First case, in operation 1h-70, the UE may perform ranking on all cells that satisfy the cell reselection criteria (The UE shall perform ranking of all cells that fulfill the cell selection criterion S). In this regard, the UE may perform ranking only on cells at frequency derived in operation 1h-55. A cell that satisfies the cell reselection criteria may indicate a cell whose reception level $S_{rxlev}$ and reception quality $S_{qual}$ derived by the UE in operation 1h-30 are greater than 0. Operation 1h-70 may be performed in any one of operations 1h-40, 1h-45, 1h-50, 1h-55, and 1h-60. The UE may derive, based on RSRP measurement quantity values, rankings of the respective cells that satisfy the cell reselection criteria. Rankings of the serving cell and a neighbor cell may be respectively calculated by using Equation 2 below.

$$R_s = Q_{meas,s} + Q_{hyst} - Q\text{offset}_{temp}$$

$$R_n = Q_{meas,n} - Q\text{offset} - Q\text{offset}_{temp} \quad \text{Equation 2}$$

where:

| | |
|---|---|
| $Q_{meas}$ | RSRP measurement quantity used in cell reselections. |
| Qoffset | For intra-frequency: Equals to Qoffset$_{s,n}$, if Qoffset$_{s,n}$ is valid, otherwise this equals to zero. For inter-frequency: Equals to Qoffset$_{s,n}$ plus Qoffset$_{frequency}$, if Qoffset$_{s,n}$ is valid, otherwise this equals to Qoffset$_{frequency}$. |
| Qoffset$_{temp}$ | Offset temporarily applied to a cell as specified in TS 38.331 [3]. |

In this regard, $Q_{meas,s}$ denotes a RSRP measurement quantity value of the serving cell, $Q_{meas,n}$ denotes a RSRP measurement quantity value of the neighbor cell, $Q_{hyst}$ denotes a hysteresis value of the serving cell, and Qoffset indicates an offset between the serving cell and the neighbor cell. SIB2 includes a $Q_{hyst}$ value, and the $Q_{hyst}$ value may be commonly used in reselecting intra-frequency/inter-frequency cells. When the intra-frequency cell is reselected, Qoffset is signaled according to each cell, is applied only to a designated cell, and is included in SIB3 When the inter-frequency cell is reselected, Qoffset is signaled according to each cell, is applied only to a designated cell, and is included in SIB4.

In operation 1h-75, the UE in the RRC idle mode or the RRC inactive mode may determine whether rangeToBestCell is configured in the system information. rangeToBestCell may be signaled in SIB2 and may be commonly used in reselecting intra-frequency/inter-frequency cells. Also, rangeToBestCell may be signaled in SIB4 and may be used only in reselecting an inter-frequency cell.

In operation 1h-80, the UE in the RRC idle mode or the RRC inactive mode may reselect the highest-ranked cell derived in operation 1h-70. In order for the UE to reselect a new cell (the highest-ranked cell), conditions below have to be satisfied.

A cell that satisfies the cell reselection criteria during a time interval TreselectionRAT has to be better than the current serving cell (the new cell is better than the serving cell according to the cell reselection criteria during a time interval Treselection$_{RAT}$).

At least 1 second has to have elapsed after the UE camped on the current serving cell.

The UE may receive MIB and SIB1 broadcast from the cell that satisfies the cell reselection criteria, may determine that a cell status is "barred" is not indicated or is not to be treated as if the cell status is "barred" with respect to the cell, may newly derive a reception level and a reception quality of the cell, based on the received SIB1, may determine whether the reception level and the reception quality satisfy the cell reselection criteria ($S_{rxlev} > 0$ AND $S_{qual} > 0$), and then may finally reselect the cell.

In operation 1h-85, the UE in the RRC idle mode or the RRC inactive mode may perform cell reselection on a cell with the highest number of beams above the threshold (i.e. absThreshSS-BlocksConsolidation) from among cells whose R value is within rangeToBestCell of the R value of the highest-ranked cell.

In this regard, absThreshSS-BlocksConsolidation may be signaled in SIB4 according to each of NR inter-frequencies. When one NR inter-frequency having the highest priority is derived in operation 1h-55 and a plurality of candidate target cells are present at the one NR inter-frequency, absThreshSS-BlocksConsolidation with respect to the one NR inter-frequency may not be configured in SIB4. In this case, an operation of the UE to reselect a cell may be uncertain. Also, in a case where a plurality of NR inter-frequencies having the highest priority (highest-priority frequencies) are derived in operation 1h-55, and one or more candidate target cells are present at each of the NR inter-frequencies, when absThreshSS-BlocksConsolidation with respect to at least one of the NR inter-frequencies is not configured in SIB4, an operation of the UE to reselect a cell may be uncertain. Therefore, when absThreshSS-BlocksConsolidation is not configured with respect to a NR inter-frequency at which one or more candidate target cells are present, the disclosure proposes that that the UE according to an embodiment of the disclosure applies the cell reselection criteria by considering that a candidate target cell has a beam above absThreshSS-BlocksConsolidation. When absThreshSS-BlocksConsolidation is configured with respect to a NR inter-frequency at which the candidate target cell is present, the UE may apply the cell reselection criteria by configuring a signaled value as absThreshSS-BlocksConsolidation.

| | |
|---|---|
| If absThreshSS-BlocksConsolidation in SIB4 is signaled for the concerned highest-priority NR inter-frequency(ies) | Cell reselection criteria |
| Yes, use signaled value | Highest # of beams above threshold (i.e. absThreshSS-BlocksConsolidation) among the cells whose R value is within rangetoBestCell of the R value of the highest ranked cell |
| No, the UE regards any cell on the concerned highest-priority NR inter-frequency(ies) with one beam above the threshold | |

In order for the UE to reselect a new cell (the highest-ranked cell) that satisfies the conditions, conditions below have to be satisfied.

The new cell that satisfies the cell reselection criteria during a time interval Treselection$_{RAT}$ has to be better than the current serving cell (the new cell is better than the serving cell according to the cell reselection criteria during a time interval TreselectionRAT).

At least 1 second has to have elapsed after the UE camped on the current serving cell.

When one cell satisfies the conditions above, the UE may determine the one cell as a final candidate cell and thus may reselect the one cell. When a plurality of cells satisfy the conditions above, the UE may determine a highest-ranked cell as a final candidate cell, the highest-ranked cell being from among the plurality of cells, and thus may reselect the highest-ranked cell (If there are multiple such cells, the UE shall perform cell reselection to the highest ranked cell among them). The UE may receive MIB and SIB1 broadcast from the final candidate cell, may determine that a cell status is "barred" is not indicated or is not to be treated as if the cell status is "barred" with respect to the final candidate cell, may newly derive a reception level and a reception quality of the final candidate cell, based on the received SIB1, may determine whether the reception level and the reception quality satisfy the cell reselection criteria ($S_{rxlev}$>0 AND $S_{qual}$>0), and then may finally reselect the final candidate cell.

When the UE has to apply the cell reselection criteria, based on Second case, in operation 1g-40, the UE in the RRC idle mode or the RRC inactive mode may apply NR Inter-frequency and inter-RAT cell reselection criteria. NR Inter-frequency and inter-RAT cell reselection criteria are below.

When the serving cell broadcasts system information (e.g., SIB2) including threshServingLowQ is broadcast and 1 second has elapsed after the UE camped on the serving cell, the UE may determine whether a cell or one of a plurality of cells at respective frequencies satisfies condition C below, and thus may derive a candidate target cell list of each frequency. TreselectionRAT parameter, Thresh$_{Serving,LowQ}$ parameter, and Thresh$_{X,LowQ}$ parameter used in condition C may be included in the system information. For example, a parameter (e.g., Thresh$_{Serving,LowQ}$) related to a serving frequency may be included in SIB2, and with respect to a cell at a NR frequency whose priority is lower than the serving frequency, parameters (e.g., Treselection$_{RAT}$, Thresh$_{X,LowQ}$) may be included in SIB4, and with respect to a cell at an inter-RAT frequency whose priority is lower than the serving frequency, the parameters (e.g., Treselection$_{RAT}$, Thresh$_{X,LowQ}$) may be included in SIB5.

Condition C: When a reception quality $S_{qual}$ of the current serving cell is lower than Thresh$_{Serving,LowQ}$, and a reception quality $S_{qual}$ of a cell at a NR frequency or an E-UTRAN/RAT frequency having a lower priority is higher than Thresh$_{X,LowQ}$ (The serving frequency fulfills Squal<Thresh$_{Serving,LowQ}$ and a cell of a lower priority NR or E-UTRAN RAT/frequency fulfils Squal<Thresh$_{X,LowQ}$ during a time internal Treselection$_{RAT}$)

Otherwise the UE may determine whether a cell or one of a plurality of cells at respective frequencies satisfies condition D below, and thus may derive a candidate target cell list of each frequency. Treselection$_{RAT}$ parameter, Thresh$_{Serving,LowP}$ parameter, and Thresh$_{X,LowP}$ parameter used in condition D may be included in the system information. For example, a parameter (e.g., Thresh$_{Serving,LowP}$) related to the serving frequency may be included in SIB2, and with respect to a cell at a NR frequency having a lower priority than the serving frequency, the parameters (e.g., TreselectionRAT, Thresh$_{X,LowP}$) may be included in SIB4, and with respect to a cell at an inter-RAT frequency having a lower priority than the serving frequency, the parameters (e.g., TreselectionRAT, Thresh$_{X,LowP}$) may be included in SIB5.

Condition D: When at least 1 second has elapsed after the UE camped on the current serving cell, and a reception level $S_{rxlev}$ of the current serving cell is lower than Thresh$_{Serving,LowP}$, and a reception level $S_{rxlev}$ of a cell at a RAT frequency having a lower priority is higher than Thresh$_{X,LowP}$ (The serving frequency fulfills Srxlev<Thresh$_{Serving,LowP}$ and a cell of a lower priority RAT/frequency fulfils Srxlev>Thresh$_{X,LowP}$ during a time interval TreselectionRAT)

In operation 1h-45, the UE may determine whether there are a plurality of cells that satisfy the cell reselection criteria applied to operation 1h-40. In this regard, the plurality of cells may indicate multiple cells at one highest-priority frequency. Also, when there are highest-priority frequencies and one or more cells are present for each of the highest-priority frequencies, the plurality of cells may indicate all of the one or more cells at the highest-priority frequencies.

In operation 1h-50, when one final candidate target cell is present, the UE may perform cell reselection on the target cell. In this regard, the UE may receive MIB and SIB1 broadcast from the target cell, may determine that a cell status is "barred" is not indicated or is not to be treated as if the cell status is "barred" with respect to the target cell, may newly derive a reception level and a reception quality of the target cell, based on the received SIB1, may determine whether the reception level and the reception quality satisfy the cell reselection criteria ($S_{rxlev}$>0 AND $S_{qual}$>0), and then may finally reselect the target cell.

In operation 1h-55, the UE may determine whether highest-priority frequency is a NR frequency or a frequency of a different RAT.

In operation 1h-60, the UE may reselect a highest-ranked cell from among cells at the highest priority frequency(ies) satisfying cell reselection criteria of the RAT. The UE may receive MIB and SIB1 broadcast from the highest-ranked cell, may determine that a cell status is "barred" is not indicated or is not to be treated as if the cell status is "barred" with respect to the highest-ranked cell, may newly derive a reception level and a reception quality of the highest-ranked cell, based on the received SIB1, may determine whether the reception level and the reception quality satisfy the cell reselection criteria ($S_{rxlev}>0$ AND $S_{qual}>0$), and then may finally reselect the highest-ranked cell.

In operation 1h-55, when the highest-priority frequency is the NR frequency, the UE may perform operation 1h-70. Cells on which the UE performs operation 1h-70 may indicate multiple cells at one highest-priority frequency. Also, when there are highest-priority frequencies and one or more cells are present for each of the highest-priority frequencies, the plurality of cells may indicate all of the one or more cells at the highest-priority frequencies.

When the UE has to apply the cell reselection criteria due to Fourth case caused by Second case, in operation 1h-70, the UE may perform ranking on all cells that satisfy the cell reselection criteria (The UE shall perform ranking of all cells that fulfill the cell selection criterion S). In this regard, the UE may perform ranking only on cells at frequencies derived in operation 1h-55. A cell that satisfies the cell reselection criteria may indicate a cell whose reception level $S_{rxlev}$ and reception quality $S_{qual}$ derived by the UE in operation 1h-30 are greater than 0. Operation 1h-70 may be performed in any one of operations 1h-40, 1h-46, 1h-47, 1h-48, and 1h-49. The UE may derive, based on RSRP measurement quantity values, rankings of the respective cells that satisfy the cell reselection criteria. Rankings of the serving cell and a neighbor cell may be respectively calculated by using Equation 2.

In operation 1h-75, the UE in the RRC idle mode or the RRC inactive mode may determine whether rangeToBest-Cell is configured in the system information.

In operation 1h-80, the UE in the RRC idle mode or the RRC inactive mode may reselect the highest-ranked cell derived in operation 1h-70. In order for the UE to reselect a new cell (the highest-ranked cell), conditions below have to be satisfied.

- A cell that satisfies the cell reselection criteria during a time interval $Treselection_{RAT}$ has to be better than the current serving cell (the new cell is better than the serving cell according to the cell reselection criteria during a time interval TreselectionRAT).
- At least 1 second has to have elapsed after the UE camped on the current serving cell.
- The UE may receive MIB and SIB1 broadcast from the cell that satisfies the cell reselection criteria, may determine that a cell status is "barred" is not indicated or is not to be treated as if the cell status is "barred" with respect to the cell, may newly derive a reception level and a reception quality of the cell, based on the received SIB1, may determine whether the reception level and the reception quality satisfy the cell reselection criteria ($S_{rxlev}>0$ AND $S_{qual}>0$), and then may finally reselect the cell.

In operation 1h-85, the UE in the RRC idle mode or the RRC inactive mode may perform cell reselection on a cell with the highest number of beams above the threshold (i.e. absThreshSS-BlocksConsolidation) from among cells whose R value is within rangeToBestCell of the R value of the highest-ranked cell.

In this regard, absThreshSS-BlocksConsolidation may be signaled in SIB4 according to each of NR inter-frequencies. When one NR inter-frequency having the highest priority is derived in operation 1h-55 and a plurality of candidate target cells are present at the one NR inter-frequency, absThreshSS-BlocksConsolidation with respect to the one NR inter-frequency may not be configured in SIB4. In this case, an operation of the UE to reselect a cell may be uncertain. Also, in a case where a plurality of NR inter-frequencies having the highest priority (highest-priority frequencies) are derived in operation 1h-55, and one or more candidate target cells are present at each of the NR inter-frequencies, when absThreshSS-BlocksConsolidation with respect to at least one of the NR inter-frequencies is not configured in SIB4, an operation of the UE to reselect a cell may be uncertain.

Therefore, when absThreshSS-BlocksConsolidation is not configured with respect to a NR inter-frequency at which one or more candidate target cells are present, the disclosure proposes that that the UE according to an embodiment of the disclosure applies the cell reselection criteria by considering that the one or more candidate target cells have a beam above absThreshSS-BlocksConsolidation. When absThreshSS-BlocksConsolidation is configured with respect to a NR inter-frequency at which the candidate target cell is present, the UE may apply the cell reselection criteria by configuring a signaled value as absThreshSS-BlocksConsolidation.

| If absThreshSS-BlocksConsolidation in SIB4 is signaled for the concerned highest-priority NR inter-frequency(ies) | Cell reselection criteria |
| --- | --- |
| Yes, use signaled value | Highest # of beams above threshold (i.e. absThreshSS-BlocksConsolidation) |
| No, the UE regards any cell on the concerned highest-priority NR inter-frequency(ies) with one beam above the threshold | among the cells whose R value is within rangetoBestCell of the R value of the highest ranked cell |

In order for the UE to reselect a new cell (the highest-ranked cell) that satisfies the conditions, conditions below have to be satisfied.

- The new cell that satisfies the cell reselection criteria during a time interval $Treselection_{RAT}$ has to be better than the current serving cell (the new cell is better than the serving cell according to the cell reselection criteria during a time interval TreselectionRAT).
- At least 1 second has to have elapsed after the UE camped on the current serving cell.

When one cell satisfies the conditions above, the UE may determine the one cell as a final candidate cell and thus may reselect the one cell. When a plurality of cells satisfy the conditions above, the UE may determine a highest-ranked cell as a final candidate cell, the highest-ranked cell being from among the plurality of cells, and thus may reselect the highest-ranked cell (If there are multiple such cells, the UE shall perform cell reselection to the highest ranked cell among them). The UE may receive MIB and SIB1 broadcast from the final candidate cell, may determine that a cell status is "barred" is not indicated or is not to be treated as if the cell status is "barred" with respect to the final candidate cell, may newly derive a reception level and a reception quality of the final candidate cell, based on the received SIB1, may determine whether the reception level and the reception quality satisfy the cell reselection criteria ($S_{rxlev}>0$ AND $S_{qual}>0$), and then may finally reselect the final candidate cell.

When the UE has to apply the cell reselection criteria, based on Third case, in operation 1h-70, the UE in the RRC idle mode or the RRC inactive mode may perform ranking on all cells that satisfy the cell reselection criteria (The UE shall perform ranking of all cells that fulfill the cell selection criterion S). A cell that satisfies the cell reselection criteria may indicate a cell whose reception level $S_{rxlev}$ and reception quality $S_{qual}$ derived by the UE in operation 1h-30 are greater than 0. The UE may derive, based on RSRP measurement quantity values, rankings of the respective cells that satisfy the cell reselection criteria. Rankings of the serving cell and a neighbor cell may be respectively calculated by using Equation 2.

In operation 1h-75, the UE in the RRC idle mode or the RRC inactive mode may determine whether rangeToBestCell is configured in the system information. rangeToBestCell may be signaled in SIB2 and may be commonly used in reselecting intra-frequency/inter-frequency cells. Also, rangeToBestCell may be signaled in SIB4 and may be used only in reselecting an inter-frequency cell.

In operation 1h-80, the UE in the RRC idle mode or the RRC inactive mode may reselect the highest-ranked cell based on rankings of cells derived in operation 1h-70. In order for the UE to reselect a new cell (the highest-ranked cell), conditions below have to be satisfied.

A cell that satisfies the cell reselection criteria during a time interval Treselection$_{RAT}$ has to be better than the current serving cell (the new cell is better than the serving cell according to the cell reselection criteria during a time interval Treselection$_{RAT}$).

At least 1 second has to have elapsed after the UE camped on the current serving cell.

The UE may reselect the cell that satisfies the condition above. In this regard, the UE may receive MIB and SIB1 broadcast from the cell, may determine that a cell status is "barred" is not indicated or is not to be treated as if the cell status is "barred" with respect to the cell, may newly derive a reception level and a reception quality of the cell, based on the received SIB1, may determine whether the reception level and the reception quality satisfy the cell reselection criteria ($S_{rxlev}$>0 AND $S_{qual}$>0), and then may finally reselect the cell.

In operation 1h-85, the UE in the RRC idle mode or the RRC inactive mode may perform cell reselection on a cell with the highest number of beams above the threshold (i.e. absThreshSS-BlocksConsolidation) from among cells whose R value is within rangeToBestCell of the R value of the highest-ranked cell.

In this regard, absThreshSS-BlocksConsolidation with respect to a NR intra-frequency may be signaled in SIB2, and absThreshSS-BlocksConsolidation with respect to an equal-priority NR frequency may be signaled in SIB4 according to each of equal-priority NR inter-frequencies. When absThreshSS-BlocksConsolidation is not signaled in SIB2 or SIB4, an operation of the UE to reselect a cell may be uncertain.

Therefore, when absThreshSS-BlocksConsolidation is not configured with respect to a NR intra-frequency at which the one or more candidate target cells are present, or absThreshSS-BlocksConsolidation is not configured with respect to an equal-priority NR inter-frequency at which one or more candidate target cells are present, the disclosure proposes that the UE according to an embodiment of the disclosure performs cell reselection by determining that a candidate cell has one beam above absThreshSS-BlocksConsolidation. When absThreshSS-BlocksConsolidation is configured with respect to a candidate target cell, the UE may apply the cell reselection criteria by configuring a signaled value as absThreshSS-BlocksConsolidation.

| If absThreshSS-BlocksConsolidation in SIB2 is signaled for NR intra-frequency | If absThreshSS-BlocksConsolidation in SIB4 is signaled for equal-priority NR inter-frequency(ies) | Cell reselection criteria |
|---|---|---|
| Yes, use signaled value for threshold (i.e. absThreshSS-BlocksConsolidation) for cells of NR intra-frequency | Yes, use signaled value for threshold (i.e. absThreshSS-BlocksConsolidation) for cells of equal-priority NR frequency(ies) | Highest # of beams above threshold (i.e. absThreshSS-BlocksConsolidation) among the cells whose R value is within rangetoBestCell of the R value of the highest ranked cell |
| No, the UE regards any cell on the NR intra-frequency with one beam above the threshold | No, the UE regards any cell on the equal-priority NR inter-frequency(ies) with one beam above the threshold | |

In order for the UE to reselect a new cell (the highest-ranked cell) that satisfies the conditions, conditions below have to be satisfied.

The new cell that satisfies the cell reselection criteria during a time interval TreselectionRAT has to be better than the current serving cell (the new cell is better than the serving cell according to the cell reselection criteria during a time interval Treselection$_{RAT}$).

At least 1 second has to have elapsed after the UE camped on the current serving cell.

When one cell satisfies the conditions above, the UE may determine the one cell as a final candidate cell and thus may reselect the one cell. When a plurality of cells satisfy the conditions above, the UE may determine a highest-ranked cell as a final candidate cell, the highest-ranked cell being from among the plurality of cells, and thus may reselect the highest-ranked cell (If there are multiple such cells, the UE shall perform cell reselection to the highest ranked cell among them). The UE may receive MIB and SIB1 broadcast from the final candidate cell, may determine that a cell status is "barred" is not indicated or is not to be treated as if the cell status is "barred" with respect to the final candidate cell, may newly derive a reception level and a reception quality of the final candidate cell, based on the received SIB1, may determine whether the reception level and the reception quality satisfy the cell reselection criteria ($S_{rxlev}$>0 AND $S_{qual}$>0), and then may finally reselect the final candidate cell.

Figure 1I:
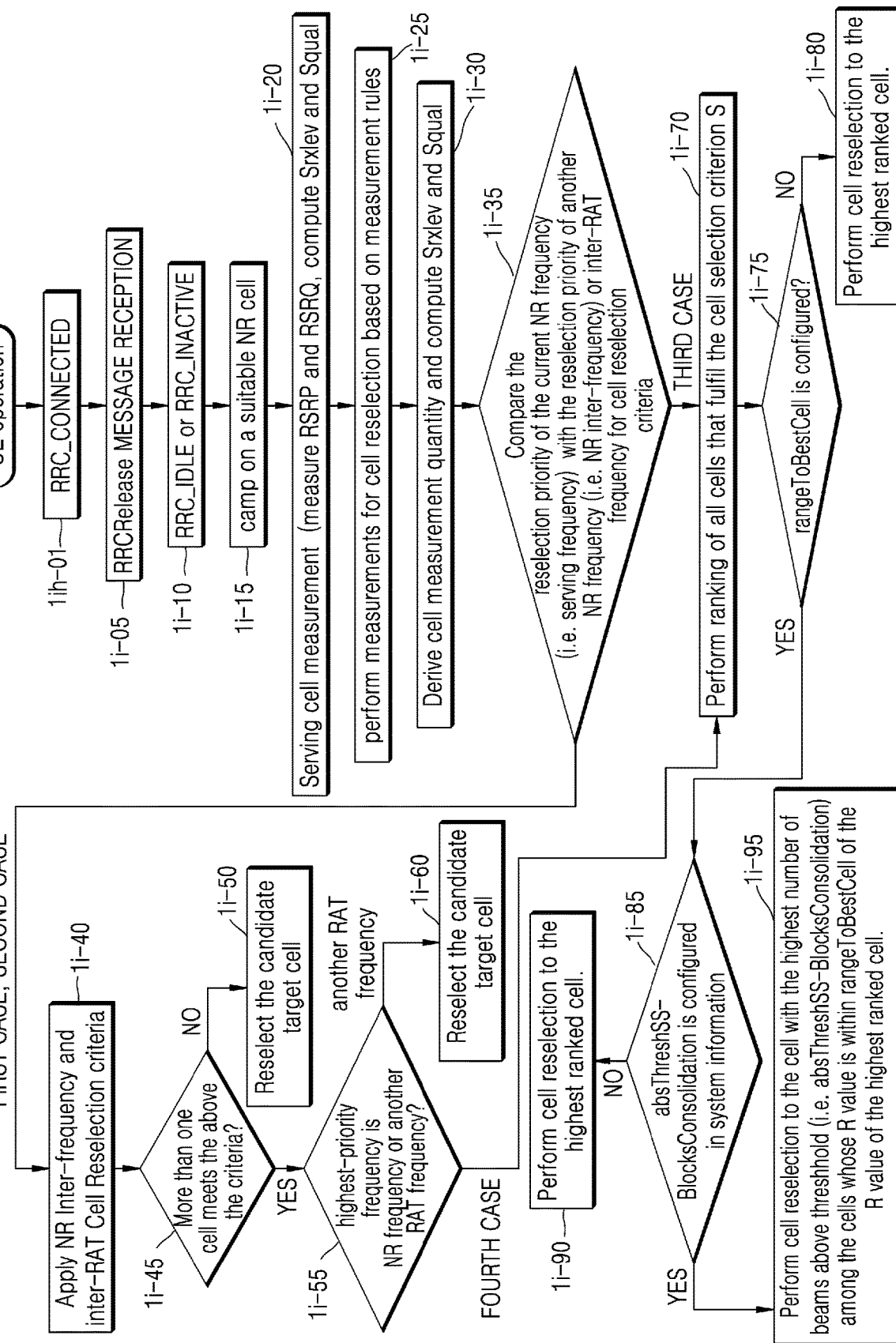
FIG. 1I is a diagram for describing a procedure in which a UE transits from an RRC connected mode to an RRC inactive mode or an RRC idle mode, and then performs a cell reselection procedure, according to an embodiment of the disclosure.

FIG. 1I is a diagram for describing a procedure in which a BS releases connection to a UE and thus the UE transits from an RRC connected mode (RRC_CONNECTED) to an RRC inactive mode (RRC_INACTIVE) or an RRC idle mode (RRC_IDLE), and then the UE in the RRC inactive mode (RRC_INACTIVE) or the RRC idle mode (RRC_IDLE) performs a cell reselection procedure, according to an embodiment of the disclosure.

The cell reselection procedure may refer to a procedure in which, when a service quality of a serving cell deteriorates compared to a service quality of a neighbor cell, the UE in the RRC inactive mode (RRC_INACTIVE) or the RRC idle mode (RRC_IDLE) determines whether to maintain a current serving cell or to reselect the neighbor cell.

In handover, whether to operate handover is determined due to a network (an MME, an AMF, a source eNB, or a source gNB) whereas, in cell reselection, the UE may autonomously determine whether to reselect a cell, based on a cell measurement value. A cell to be reselected by a moving UE may refer to a cell using a same NR frequency (a NR intra-frequency) as a serving cell that the UE currently camps on, a cell using a different NR frequency (a NR intra-frequency) as the serving cell, or a cell using a frequency (an inter-RAT frequency) used in a different RAT.

Referring to FIG. 1I, the UE may be in an RRC connected mode (RRC_CONNECTED) (1i-01).

In operation 1i-05, the UE in the RRC connected mode may receive an RRCRelease message from a BS.

In operation 1i-10, the UE may switch to an RRC inactive mode (RRC_INACTIVE) or an RRC idle mode (RRC_IDLE), according to whether the RRCRelease message received in operation 1i-05 includes suspended configuration information (suspendConfig). For example, when the UE successfully receives the RRCRelease message including the suspended configuration information, the UE in the RRC connected mode may switch to the RRC inactive mode. On the other hand, when the UE successfully receives the RRCRelease message not including the suspended configuration information, the UE in the RRC connected mode may switch to the RRC idle mode.

In operation 1i-15, the UE in the RRC idle mode or the RRC inactive mode may search for and camp on a suitable cell by performing a cell selection procedure. The suitable cell that the UE in the RRC idle mode or the RRC inactive mode found and camped on may be called a serving cell. To perform the cell selection procedure, the UE may receive system information (e.g., MIB and/or SIB1 broadcast from a cell. Alternatively, before or after the UE camps on the cell, the UE may receive system information (e.g., SIB2 and/or SIB3 and/or SIB4 and/or SIB5) broadcast from the cell. SIB2 may include information/parameters that are commonly applied to when the UE in the RRC idle mode or the RRC inactive mode reselects a NR intra-frequency cell, a NR inter-frequency cell, and an inter-RAT frequency cell. SIB3 may include information/parameters that are applied to only when the UE in the RRC idle mode or the RRC inactive mode reselects a NR intra-frequency cell. SIB4 may include information/parameters that are applied to only when the UE in the RRC idle mode or the RRC inactive mode reselects a NR inter-frequency cell. SIB5 may include information/parameters that are applied to only when the UE in the RRC idle mode or the RRC inactive mode reselects an inter-RAT frequency cell.

In operation 1i-20, the UE in the RRC idle mode or the RRC inactive mode may measure RSRP $Q_{rxlevmeas}$ and RSRQ $Q_{qualmeas}$. In detail, the UE may calculate a reception level $S_{rxlev}$ and a reception quality $S_{qual}$ of the serving cell by using the parameters included in SIB1 received in operation 1i-15. For example, the UE may calculate the reception level $S_{rxlev}$ and the reception quality $S_{qual}$ of the serving cell by using Equation 1 below.

$$Srxlev = Q_{rxlevmeas} - (Q_{rxlevmin} + Q_{rxlevminoffset}) - P_{compensation} - Qoffset_{temp},$$

$$Squal Q_{qualmeas} - (Q_{qualmin} + Q_{qualminoffset}) - Qoffset_{temp}. \quad \text{Equation 1}$$

Definitions of parameters used in Equation 1 may be determined according to the 3GPP standard specification titled "38.304: User Equipment (UE) procedures in Idle mode and RRC Inactive state". Hereinafter, the definitions are equally applied to embodiments of the disclosure to which Equation 1 is applied.

In operation 1i-25, the UE in the RRC idle mode or the RRC inactive mode may perform measurement for cell reselection. In this regard, the UE may perform the neighbor cell measurement based on measurement rules so as to minimize consumption of a battery power or due to a certain reason.

When the reception level and the reception quality of the serving cell are greater than a threshold value ($S_{rxlev} > S_{IntmSearchP}$ and $S_{intraSearchQ}$), the UE may not perform NR intra-frequency cell measurement.

When the reception level and the reception quality of the serving cell are equal to or smaller than the threshold value ($S_{rxlev} \leq S_{IntraSearchP}$ and $S_{intraSearchQ}$), the UE may perform NR intra-frequency cell measurement.

For a NR inter-frequency cell or an inter-RAT frequency cell whose reselection priority is higher than a NR frequency of a current serving cell, the UE may perform measurement.

When the reception level and the reception quality of the serving cell are greater than the threshold value ($S_{rxlev} > S_{IntraSearchP}$ and $S_{intraSearchQ}$), the UE may not perform measurement on a NR inter-frequency cell whose reselection priority is equal to or lower than the NR frequency of the current serving cell or an inter-RAT frequency cell whose reselection priority is lower than the NR frequency of the current serving cell.

When the reception level and the reception quality of the serving cell are equal to or smaller than the threshold value ($S_{rxlev} \leq S_{nonIntraSearchP}$ and $S_{nonintraSearchQ}$), the UE may perform measurement on a NR inter-frequency cell whose reselection priority is equal to or lower than the NR frequency of the current serving cell or an inter-RAT frequency cell whose reselection priority is lower than the NR frequency of the current serving cell.

When the RRCRelease message received in operation 1i-05 includes cell reselection priority information, frequency priority information may indicate frequency priority information included in the cell reselection priority information included in the RRCRelease message. When the RRCRelease message received in operation 1i-05 does not include cell reselection priority information, frequency priority information may indicate cell reselection priority information included in the system information received in operation 1i-15.

The aforementioned threshold values of $S_{IntmSearchP}$, $S_{intraSearchQ}$, $S_{nonIntraSearchP}$, and $S_{nonintraSearchQ}$ may be included in SIB2.

In operation 1i-30, to reselect a cell that performs a multi-beam operation, the UE in the RRC idle mode or the RRC inactive mode may derive a measurement quantity value of each cell, based on beams respectively corresponding to cells with respect to a SS/PBCH block. According to an embodiment of the disclosure, the UE may derive a measurement quantity value of a cell by using one of methods below.

A case where condition 1 below is satisfied, the UE may derive, as a highest beam measurement quantity value, a measurement quantity value of a neighbor cell at a same NR frequency (a NR intra-frequency) as the serving cell.—A case where condition 1 below is not satisfied, the UE may derive a measurement quantity value of a neighbor cell at a same NR intra-frequency as the serving cell by performing linear averaging on the power values up to nrofSS-BlocksToAverage of highest beam measurement quantity values that are greater than absThreshSS-BlocksConsolidation.

The case where condition 1 is satisfied may indicate a case where at least one of three conditions below is satisfied.
when nrofSS-BlocksToAverage is not configured in SIB2
when absThreshSS-BlocksConsolidation is not configured in SIB2
when a highest beam measurement quantity value is equal to or smaller than absThreshSS-BlocksConsolidation A case where condition 2 below is satisfied, the UE may derive, as a highest beam measurement quantity value, a measurement quantity value of a neighbor cell at a different NR frequency (a NR inter-frequency) from that of the serving cell.—A case where condition 2 below is not satisfied, the UE may derive a measurement quantity value of a neighbor cell at a different NR frequency (a NR inter-frequency) from that of the serving cell by performing linear averaging on the power values up to nrofSS-BlocksToAverage of highest beam measurement quantity values above absThreshSS-BlocksConsolidation.

The case where condition 2 is satisfied may indicate a case where at least one of three conditions below is satisfied.
when nrofSS-BlocksToAverage is not configured in SIB4
when absThreshSS-BlocksConsolidation is not configured in SIB4
when a highest beam measurement quantity value is equal to or smaller than absThreshSS-BlocksConsolidation nrofSS-BlocksToAverage and absThreshSS-BlocksConsolidation may be signaled in SIB4 at each NR inter-frequency, and thus, the UE may derive a measurement quantity value of a neighbor cell at a NR inter-frequency by applying condition 2 to each of NR inter-frequencies.

In operation 1*i*-30, the UE in the RRC idle mode or the RRC inactive mode may derive a measurement quantity value of each cell so as to reselect a cell (e.g., an LTE cell in an inter-RAT frequency) that does not perform the multi-beam operation. The measurement quantity value may indicate RSRP $Q_{rxlevmeas}$ or RSRQ $Q_{qualmeas}$.

In operation 1*i*-30, the UE may derive a reception level and a reception quality of each cell, based on the derived measurement quantity value of each cell. In detail, the UE may derive a reception level and a reception quality of a neighbor cell according to Equation 1 by using parameters included in SIB2 or SIB3 received in operation 1*i*-15, the neighbor cell being at a same NR frequency (a NR intra-frequency) as the serving cell. The UE may derive a reception level and a reception quality of a neighbor cell according to Equation 1 by using parameters included in SIB2 or SIB4 received in operation 1*i*-15, the neighbor cell being at a different NR frequency (a NR inter-frequency) as the serving cell. The UE may derive a reception level and a reception quality of a neighbor cell according to Equation 1 by using parameters included in SIB2 or SIB5 received in operation 1*i*-15, the neighbor cell being at a different RAT frequency (an inter-RAT frequency) as the serving cell.

The UE in the RRC idle mode or the RRC inactive mode may apply different cell reselection criteria, according to frequency priorities. Therefore, in operation 1*i*-35, the UE may compare a priority of the current serving cell with a priority of a NR inter-frequency cell or the priority of the current serving cell with a priority of an inter-RAT frequency cell. The UE may apply different cell reselection criteria to four cases below.

First case:
When at least one of a NR inter-frequency or an inter-RAT frequency whose priority is higher than that of a current serving frequency is present Second case:
When at least one of a NR inter-frequency or an inter-RAT frequency whose priority is lower than that of the current serving frequency is present Third case:
When the current serving frequency or at least one NR inter-frequency whose priority is equal to that of the current serving frequency is present Fourth case:
When there are a plurality of NR cells that satisfy the cell reselection criteria related to First case or Second case
When the plurality of NR cells that satisfy the cell reselection criteria have different priorities, the UE may perform cell reselection according to a condition where RAT/frequency having a higher priority take precedence over RAT/frequency having a lower priority (Cell reselection to a higher priority RAT/frequency shall take precedence over a lower priority RAT/frequency if multiple cells of different priorities fulfill the cell reselection criteria) For example, the UE may perform cell reselection, giving highest precedence on First case or Fourth case caused by First case. When First case or Fourth case caused by First case is not satisfied, the UE may perform cell reselection according to Third case. When Third case is not satisfied, the UE may perform cell reselection, according to Second case or Fourth case caused by Second case. That is, the UE may perform cell reselection by sequentially considering whether First case (and Fourth case caused by First case), Third case, and Second case (and Fourth case caused by Second case) are satisfied. When the UE applies the cell reselection criteria, based on First case, in operation 1*i*-40, the UE in the RRC idle mode or the RRC inactive mode may apply NR inter-frequency and inter-RAT cell reselection criteria. NR Inter-frequency and inter-RAT cell reselection criteria are below.

When the serving cell broadcasts system information (e.g., SIB2) including threshServingLowQ is broadcast and 1 second has elapsed after the UE camped on the serving cell,
the UE may determine whether a cell or one of a plurality of cells at respective frequencies satisfies condition A below, and thus may derive a candidate target cell list of each frequency. TreselectionRAT parameter and $Thresh_{X,HighQ}$ parameter used in condition A may be included in the system information. For example, with respect to a cell at a NR frequency whose priority is higher than the serving frequency, parameters may be included in SIB4, and with respect to a cell at an inter-RAT frequency whose priority is higher than the serving frequency, the parameters may be included in SIB5.

Condition A: When a reception quality $S_{qual}$ of a cell at a NR frequency or an E-UTRAN RAT frequency having a higher priority satisfies $S_{qual}>Thresh_{X,HighQ}$ during a time interval TreselectionRAT (A cell of a higher priority NR or E-UTRAN RAT/frequency fulfills Squal>$Thresh_{X,HighQ}$ during a time internal $Treselection_{RAT}$)

Otherwise
the UE may determine whether a cell or one of a plurality of cells at respective frequencies satisfies condition B below, and thus may derive a candidate target cell list of each frequency. TreselectionRAT parameter and $Thresh_{X,HighP}$ parameter used in condition B may be included in the system information. For example, with respect to a cell at a NR frequency whose priority is higher than the serving frequency, parameters may be included in SIB4, and with respect to a cell at an inter-RAT frequency whose priority is higher than the serving frequency, the parameters may be included in SIB5.

Condition B: When at least 1 second has elapsed after the UE camped on the current serving cell, and a reception level $S_{rxlev}$ of a cell at a RAT frequency having a higher priority satisfies $S_{rxlev}>Thresh_{X,HighP}$ during a time interval $Treselection_{RAT}$ (A cell of a higher priority RAT/frequency fulfills Srxlev>Thresh$_{X,HighP}$ during a time internal Treselection$_{RAT}$)

In operation 1i-45, the UE may determine whether there are a plurality of cells that satisfy the cell reselection criteria applied to operation 1i-40. In this regard, the plurality of cells may indicate multiple cells at one highest-priority frequency. Also, when there are highest-priority frequencies and one or more cells are present for each of the highest-priority frequencies, the plurality of cells may indicate all of the one or more cells at the highest-priority frequencies.

In operation 1i-50, when one final candidate target cell is present, the UE may perform cell reselection on the target cell. In this regard, the UE may receive MIB and SIB1 broadcast from the target cell, may determine that a cell status is "barred" is not indicated or is not to be treated as if the cell status is "barred" with respect to the target cell, may newly derive a reception level and a reception quality of the target cell, based on the received SIB1, may determine whether the reception level and the reception quality satisfy the cell reselection criteria (S$_{rxlev}$>0 AND S$_{qual}$>0), and then may finally reselect the target cell.

In operation 1i-55, the UE may determine whether a highest-priority frequency of final candidate target cells is a NR frequency or a frequency of a different RAT.

In operation 1i-60, the UE may reselect a highest-ranked cell from among cells at the highest priority frequency(ies) satisfying cell reselection criteria of the RAT. The UE may receive MIB and SIB1 broadcast from the highest-ranked cell, may determine that a cell status is "barred" is not indicated or is not to be treated as if the cell status is "barred" with respect to the highest-ranked cell, may newly derive a reception level and a reception quality of the highest-ranked cell, based on the received SIB1, may determine whether the reception level and the reception quality satisfy the cell reselection criteria (S$_{rxlev}$>0 AND S$_{qual}$>0), and then may finally reselect the highest-ranked cell.

In operation 1i-55, when the highest-priority frequency is the NR frequency, the UE may perform operation 1i-70. Cells on which the UE performs operation 1i-70 may indicate multiple cells at one highest-priority frequency. Also, when there are highest-priority frequencies and one or more cells are present for each of the highest-priority frequencies, the plurality of cells may indicate all of the one or more cells at the highest-priority frequencies.

When the UE has to apply the cell reselection criteria due to Fourth case caused by First case, in operation 1i-70, the UE may perform ranking on all cells that satisfy the cell reselection criteria (The UE shall perform ranking of all cells that fulfill the cell selection criterion S). In this regard, the UE may perform ranking only on cells at frequency(ies) derived in operation 1i-55. A cell that satisfies the cell reselection criteria may indicate a cell whose reception level S$_{rxlev}$ and reception quality S$_{qual}$ derived by the UE in operation 1i-30 are greater than 0. Operation 1i-70 may be performed in any one of operations 1i-40, 1i-45, 1i-50, 1i-55, and 1i-60. The UE may derive, based on RSRP measurement quantity values, rankings of the respective cells that satisfy the cell reselection criteria. Rankings of the serving cell and a neighbor cell may be respectively calculated by using Equation 2 below.

$$R_s = Q_{meas,s} + Q_{hyst} - Q\text{offset}_{temp}$$

$$R_n = Q_{meas,n} - Q\text{offset} - Q\text{offset}_{temp} \quad \text{Equation 2}$$

where:

| | |
|---|---|
| Q$_{meas}$ | RSRP measurement quantity used in cell reselections. |
| Qoffset | For intra-frequency: Equals to Qoffset$_{s,\,n}$, if Qoffset$_{s,\,n}$ is valid, otherwise this equals to zero. For inter-frequency: Equals to Qoffset$_{s,\,n}$ plus Qoffset$_{frequency}$, if Qoffset$_{s,\,n}$ is valid, otherwise this equals to Qoffset$_{frequency}$. |
| Qoffset$_{temp}$ | Offset temporarily applied to a cell as specified in TS 38.331 [3]. |

In this regard, Q$_{meas,s}$ denotes a RSRP measurement quantity value of the serving cell, Q$_{meas,n}$ denotes a RSRP measurement quantity value of the neighbor cell, Q$_{hyst}$ denotes a hysteresis value of the serving cell, and Qoffset indicates an offset between the serving cell and the neighbor cell. SIB2 includes a Q$_{hyst}$ value, and the Q$_{hyst}$ value may be commonly used in reselecting intra-frequency/inter-frequency cells. When the intra-frequency cell is reselected, Qoffset is signaled according to each cell, is applied only to a designated cell, and is included in SIB3 When the inter-frequency cell is reselected, Qoffset is signaled according to each cell, is applied only to a designated cell, and is included in SIB4.

In operation 1i-75, the UE in the RRC idle mode or the RRC inactive mode may determine whether rangeToBestCell is configured in the system information. rangeToBestCell may be signaled in SIB2 and may be commonly used in reselecting intra-frequency/inter-frequency cells. Also, rangeToBestCell may be signaled in SIB4 and may be used only in reselecting an inter-frequency cell.

In operation 1i-80, the UE in the RRC idle mode or the RRC inactive mode may reselect the highest-ranked cell derived in operation 1i-70. In order for the UE to reselect a new cell (the highest-ranked cell), conditions below have to be satisfied.

A cell that satisfies the cell reselection criteria during a time interval TreselectionRAT has to be better than the current serving cell (the new cell is better than the serving cell according to the cell reselection criteria during a time interval Treselection$_{RAT}$).

At least 1 second has to have elapsed after the UE camped on the current serving cell.

The UE may receive MIB and SIB1 broadcast from the cell that satisfies the cell reselection criteria, may determine that a cell status is "barred" is not indicated or is not to be treated as if the cell status is "barred" with respect to the cell, may newly derive a reception level and a reception quality of the cell, based on the received SIB1, may determine whether the reception level and the reception quality satisfy the cell reselection criteria (S$_{rxlev}$>0 AND S$_{qual}$>0), and then may finally reselect the cell.

In operation 1i-85, when absThreshSS-BlocksConsolidation is not configured with respect to at least one NR inter-frequency at which one or more candidate target cells derived in operation 1i-55 are present, the UE in the RRC idle mode or the RRC inactive mode may reselect a highest-ranked cell in operation 1i-90. In order for the UE to reselect a new cell (the highest-ranked cell), conditions below have to be satisfied.

A cell that satisfies the cell reselection criteria during a time interval TreselectionRAT has to be better than the current serving cell (the new cell is better than the serving cell according to the cell reselection criteria during a time interval Treselection$_{RAT}$).

At least 1 second has to have elapsed after the UE camped on the current serving cell.

The UE may receive MIB and SIB1 broadcast from the cell that satisfies the cell reselection criteria, may determine that a cell status is "barred" is not indicated or is not to be treated as if the cell status is "barred" with respect to the cell, may newly derive a reception level and a reception quality of the cell, based on the received SIB1, may determine whether the reception level and the reception quality satisfy the cell reselection criteria ($S_{rxlev}$>0 AND $S_{qual}$>0), and then may finally reselect the cell.

In operation 1*i*-85, when absThreshSS-BlocksConsolidation is configured with respect to all NR inter-frequencies at which one or more candidate target cells derived in operation 1*i*-55 are present, in operation 1*i*-95, the UE in the RRC idle mode or the RRC inactive mode may perform cell reselection on a cell with the highest number of beams above the threshold (i.e. absThreshSS-BlocksConsolidation) from among cells whose R value is within rangeToBestCell of the R value of the highest-ranked cell. In order for the UE to reselect a new cell (the highest-ranked cell) that satisfies the conditions, conditions below have to be satisfied.

The new cell that satisfies the cell reselection criteria during a time interval TreselectionRAT has to be better than the current serving cell (the new cell is better than the serving cell according to the cell reselection criteria during a time interval Treselection$_{RAT}$).

At least 1 second has to have elapsed after the UE camped on the current serving cell.

When one cell satisfies the conditions above, the UE may determine the one cell as a final candidate cell and thus may reselect the one cell. When a plurality of cells satisfy the conditions above, the UE may determine a highest-ranked cell as a final candidate cell, the highest-ranked cell being from among the plurality of cells, and thus may reselect the highest-ranked cell (If there are multiple such cells, the UE shall perform cell reselection to the highest ranked cell among them). The UE may receive MIB and SIB1 broadcast from the final candidate cell, may determine that a cell status is "barred" is not indicated or is not to be treated as if the cell status is "barred" with respect to the final candidate cell, may newly derive a reception level and a reception quality of the final candidate cell, based on the received SIB1, may determine whether the reception level and the reception quality satisfy the cell reselection criteria ($S_{rxlev}$>0 AND $S_{qual}$>0), and then may finally reselect the final candidate cell.

Alternatively, in operation 1*i*-85, when absThreshSS-BlocksConsolidation is configured with respect to at least one NR inter-frequency at which one or more candidate target cells derived in operation 1*i*-55 are present, in operation 1*i*-95, the UE in the RRC idle mode or the RRC inactive mode may perform cell reselection on a cell with the highest number of beams above the threshold (i.e. absThreshSS-BlocksConsolidation) from among cells whose R value is within rangeToBestCell of the R value of the highest-ranked cell. In this regard, the UE may apply the cell reselection criteria to a frequency for which absThreshSS-BlocksConsolidation is not configured, by applying a value of absThreshSS-BlocksConsolidation configured with respect to at least one NR inter-frequency. The value of absThreshSS-BlocksConsolidation may be any value, a smallest value, or a greatest value from among configured values. In order for the UE to reselect a new cell (a highest-ranked cell) that satisfies the conditions, conditions below have to be satisfied.

The new cell that satisfies the cell reselection criteria during a time interval TreselectionRAT has to be better than the current serving cell (the new cell is better than the serving cell according to the cell reselection criteria during a time interval TreselectionRAT).

At least 1 second has to have elapsed after the UE camped on the current serving cell.

When one cell satisfies the conditions above, the UE may determine the one cell as a final candidate cell and thus may reselect the one cell. When a plurality of cells satisfy the conditions above, the UE may determine a highest-ranked cell as a final candidate cell, the highest-ranked cell being from among the plurality of cells, and thus may reselect the highest-ranked cell (If there are multiple such cells, the UE shall perform cell reselection to the highest ranked cell among them). The UE may receive MIB and SIB1 broadcast from the final candidate cell, may determine that a cell status is "barred" is not indicated or is not to be treated as if the cell status is "barred" with respect to the final candidate cell, may newly derive a reception level and a reception quality of the final candidate cell, based on the received SIB1, may determine whether the reception level and the reception quality satisfy the cell reselection criteria ($S_{rxlev}$>0 AND $S_{qual}$>0), and then may finally reselect the final candidate cell.

When the UE has to apply the cell reselection criteria, based on Second case, in operation 1*g*-40, the UE in the RRC idle mode or the RRC inactive mode may apply NR Inter-frequency and inter-RAT cell reselection criteria. NR Inter-frequency and inter-RAT cell reselection criteria are below.

When the serving cell broadcasts system information (e.g., SIB2) including threshServingLowQ is broadcast and 1 second has elapsed after the UE camped on the serving cell, the UE may determine whether a cell or one of a plurality of cells at respective frequencies satisfies condition C below, and thus may derive a candidate target cell list of each frequency. TreselectionRAT parameter, Thresh$_{Serving,LowQ}$ parameter, and Thresh$_{X,LowQ}$ parameter used in condition C may be included in the system information. For example, a parameter (e.g., Thresh$_{Serving,LowQ}$) related to a serving frequency may be included in SIB2, and with respect to a cell at a NR frequency whose priority is lower than the serving frequency, parameters (e.g., TreselectionRAT, Thresh$_{X,LowQ}$) may be included in SIB4, and with respect to a cell at an inter-RAT frequency whose priority is lower than the serving frequency, the parameters (e.g., TreselectionRAT, Thresh$_{X,LowQ}$) may be included in SIB5.

Condition C: When a reception quality $S_{qual}$ of the current serving cell is lower than Thresh$_{Serving,LowQ}$, and a reception quality $S_{qual}$ of a cell at a NR frequency or an E-UTRAN/RAT frequency having a lower priority is higher than Thresh$_{X,LowQ}$ (The serving frequency fulfills Squal<Thresh$_{Serving,LowQ}$ and a cell of a lower priority NR or E-UTRAN RAT/frequency fulfils Squal<Thresh$_{X,LowQ}$ during a time internal Treselection$_{RAT}$)

Otherwise the UE may determine whether a cell or one of a plurality of cells at respective frequencies satisfies condition D below, and thus may derive a candidate target cell list of each frequency. TreselectionRAT parameter, Thresh$_{Serving,LowP}$ parameter, and Thresh$_{X,LowP}$ parameter used in condition D may be included in the system information. For example, a parameter (e.g., $Thresh_{Serving,LowP}$) related to the serving frequency may be included in SIB2, and with respect to a cell at a NR frequency having a lower priority than the serving frequency, the parameters (e.g., $Treselection_{RAT}$, $Thresh_{X,LowP}$) may be included in SIB4, and with respect to a cell at an inter-RAT frequency having a lower priority than the serving frequency, the parameters (e.g., $Treselection_{RAT}$, $Thresh_{X,LowP}$) may be included in SIB5.

Condition D: When at least 1 second has elapsed after the UE camped on the current serving cell, and a reception level $S_{rxlev}$ of the current serving cell is lower than $Thresh_{Serving,LowP}$, and a reception level $S_{rxlev}$ of a cell at a RAT frequency having a lower priority is higher than $Thresh_{X,LowP}$ (The serving frequency fulfills Srxlev<$Thresh_{Serving,LowP}$ and a cell of a lower priority RAT/frequency fulfills Srxlev>$Thresh_{X,LowP}$ during a time interval $Treselection_{RAT}$)

In operation 1i-45, the UE may determine whether there are a plurality of cells that satisfy the cell reselection criteria applied to operation 1i-40. In this regard, the plurality of cells may indicate multiple cells at one highest-priority frequency. Also, when there are highest-priority frequencies and one or more cells are present for each of the highest-priority frequencies, the plurality of cells may indicate all of the one or more cells at the highest-priority frequencies.

In operation 1i-50, when one final candidate target cell is present, the UE may perform cell reselection on the target cell. In this regard, the UE may receive MIB and SIB1 broadcast from the target cell, may determine that a cell status is "barred" is not indicated or is not to be treated as if the cell status is "barred" with respect to the target cell, may newly derive a reception level and a reception quality of the target cell, based on the received SIB1, may determine whether the reception level and the reception quality satisfy the cell reselection criteria ($S_{rxlev}$>0 AND $S_{qual}$>0), and then may finally reselect the target cell.

In operation 1i-55, the UE may determine whether a highest-priority frequency is a NR frequency or a frequency of a different RAT.

In operation 1i-60, the UE may reselect a highest-ranked cell from among cells at the highest priority frequency(ies) satisfying cell reselection criteria of the RAT. The UE may receive MIB and SIB1 broadcast from the highest-ranked cell, may determine that a cell status is "barred" is not indicated or is not to be treated as if the cell status is "barred" with respect to the highest-ranked cell, may newly derive a reception level and a reception quality of the highest-ranked cell, based on the received SIB1, may determine whether the reception level and the reception quality satisfy the cell reselection criteria ($S_{rxlev}$>0 AND $S_{qual}$>0), and then may finally reselect the highest-ranked cell.

In operation 1i-55, when the highest-priority frequency is the NR frequency, the UE may perform operation 1i-70. Cells on which the UE performs operation 1i-70 may indicate multiple cells at one highest-priority frequency. Also, when there are highest-priority frequencies and one or more cells are present for each of the highest-priority frequencies, the plurality of cells may indicate all of the one or more cells at the highest-priority frequencies.

When the UE has to apply the cell reselection criteria due to Fourth case caused by Second case, in operation 1i-70, the UE may perform ranking on all cells that satisfy the cell reselection criteria (The UE shall perform ranking of all cells that fulfill the cell selection criterion S). In this regard, the UE may perform ranking only on cells at frequencies derived in operation 1i-55. A cell that satisfies the cell reselection criteria may indicate a cell whose reception level $S_{rxlev}$ and reception quality $S_{qual}$ derived by the UE in operation 1i-30 are greater than 0. Operation 1i-70 may be performed in any one of operations 1i-40, 1i-45, 1i-50, 1i-55, and 1i-60. The UE may derive, based on RSRP measurement quantity values, rankings of the respective cells that satisfy the cell reselection criteria. Rankings of the serving cell and a neighbor cell may be respectively calculated by using Equation 2.

In operation 1i-75, the UE in the RRC idle mode or the RRC inactive mode may determine whether rangeToBestCell is configured in the system information.

In operation 1i-80, the UE in the RRC idle mode or the RRC inactive mode may reselect the highest-ranked cell derived in operation 1i-70. In order for the UE to reselect a new cell (the highest-ranked cell), conditions below have to be satisfied.

A cell that satisfies the cell reselection criteria during a time interval $Treselection_{RAT}$ has to be better than the current serving cell (the new cell is better than the serving cell according to the cell reselection criteria during a time interval $Treselection_{RAT}$).

At least 1 second has to have elapsed after the UE camped on the current serving cell.

The UE may receive MIB and SIB1 broadcast from the cell that satisfies the cell reselection criteria, may determine that a cell status is "barred" is not indicated or is not to be treated as if the cell status is "barred" with respect to the cell, may newly derive a reception level and a reception quality of the cell, based on the received SIB1, may determine whether the reception level and the reception quality satisfy the cell reselection criteria ($S_{rxlev}$>0 AND $S_{qual}$>0), and then may finally reselect the cell.

In operation 1i-85, when absThreshSS-BlocksConsolidation is not configured with respect to at least one NR inter-frequency at which one or more candidate target cells derived in operation 1i-55 are present, the UE in the RRC idle mode or the RRC inactive mode may reselect a highest-ranked cell in operation 1i-90. In order for the UE to reselect a new cell (the highest-ranked cell), conditions below have to be satisfied.

A cell that satisfies the cell reselection criteria during a time interval $Treselection_{RAT}$ has to be better than the current serving cell (the new cell is better than the serving cell according to the cell reselection criteria during a time interval $Treselection_{RAT}$).

At least 1 second has to have elapsed after the UE camped on the current serving cell.

The UE may receive MIB and SIB1 broadcast from the cell that satisfies the cell reselection criteria, may determine that a cell status is "barred" is not indicated or is not to be treated as if the cell status is "barred" with respect to the cell, may newly derive a reception level and a reception quality of the cell, based on the received SIB1, may determine whether the reception level and the reception quality satisfy the cell reselection criteria ($S_{rxlev}$>0 AND $S_{qual}$>0), and then may finally reselect the cell.

In operation 1i-85, when absThreshSS-BlocksConsolidation is configured with respect to all NR inter-frequencies at which one or more candidate target cells derived in operation 1i-55 are present, in operation 1i-95, the UE in the RRC idle mode or the RRC inactive mode may perform cell reselection on a cell with the highest number of beams above the threshold (i.e. absThreshSS-BlocksConsolidation) from among cells whose R value is within rangeToBestCell of the R value of the highest-ranked cell. In order for the UE to reselect a new cell (the highest-ranked cell) that satisfies the conditions, conditions below have to be satisfied.

The new cell that satisfies the cell reselection criteria during a time interval Treselection$_{RAT}$ has to be better than the current serving cell (the new cell is better than the serving cell according to the cell reselection criteria during a time interval Treselection$_{RAT}$).

At least 1 second has to have elapsed after the UE camped on the current serving cell.

When one cell satisfies the conditions above, the UE may determine the one cell as a final candidate cell and thus may reselect the one cell. When a plurality of cells satisfy the conditions above, the UE may determine a highest-ranked cell as a final candidate cell, the highest-ranked cell being from among the plurality of cells, and thus may reselect the highest-ranked cell (If there are multiple such cells, the UE shall perform cell reselection to the highest ranked cell among them). The UE may receive MIB and SIB1 broadcast from the final candidate cell, may determine that a cell status is "barred" is not indicated or is not to be treated as if the cell status is "barred" with respect to the final candidate cell, may newly derive a reception level and a reception quality of the final candidate cell, based on the received SIB1, may determine whether the reception level and the reception quality satisfy the cell reselection criteria ($S_{rxlev}$>0 AND $S_{qual}$>0), and then may finally reselect the final candidate cell.

Alternatively, in operation 1$i$-85, when absThreshSS-BlocksConsolidation is configured with respect to at least one NR inter-frequency at which one or more candidate target cells derived in operation 1$i$-55 are present, in operation 1$i$-95, the UE in the RRC idle mode or the RRC inactive mode may perform cell reselection on a cell with the highest number of beams above the threshold (i.e. absThreshSS-BlocksConsolidation) from among cells whose R value is within rangeToBestCell of the R value of the highest-ranked cell. In this regard, the UE may apply the cell reselection criteria to a frequency for which absThreshSS-BlocksConsolidation is not configured, by applying a value of absThreshSS-BlocksConsolidation configured with respect to at least one NR inter-frequency. The value of absThreshSS-BlocksConsolidation may be any value, a smallest value, or a greatest value from among configured values. In order for the UE to reselect a new cell (a highest-ranked cell) that satisfies the conditions, conditions below have to be satisfied.

The new cell that satisfies the cell reselection criteria during a time interval Treselection$_{RAT}$ has to be better than the current serving cell (the new cell is better than the serving cell according to the cell reselection criteria during a time interval TreselectionRAT).

At least 1 second has to have elapsed after the UE camped on the current serving cell.

When one cell satisfies the conditions above, the UE may determine the one cell as a final candidate cell and thus may reselect the one cell. When a plurality of cells satisfy the conditions above, the UE may determine a highest-ranked cell as a final candidate cell, the highest-ranked cell being from among the plurality of cells, and thus may reselect the highest-ranked cell (If there are multiple such cells, the UE shall perform cell reselection to the highest ranked cell among them). The UE may receive MIB and SIB1 broadcast from the final candidate cell, may determine that a cell status is "barred" is not indicated or is not to be treated as if the cell status is "barred" with respect to the final candidate cell, may newly derive a reception level and a reception quality of the final candidate cell, based on the received SIB1, may determine whether the reception level and the reception quality satisfy the cell reselection criteria ($S_{rxlev}$>0 AND $S_{qual}$>0), and then may finally reselect the final candidate cell.

When the UE has to apply the cell reselection criteria, based on Third case, in operation 1$i$-70, the UE in the RRC idle mode or the RRC inactive mode may perform ranking on all cells that satisfy the cell selection criterion (The UE shall perform ranking of all cells that fulfill the cell selection criterion S). A cell that satisfies the cell reselection criteria may indicate a cell whose reception level $S_{rxlev}$ and reception quality $S_{qual}$ derived by the UE in operation 1$i$-30 are greater than 0. The UE may derive, based on RSRP measurement quantity values, rankings of the respective cells that satisfy the cell reselection criteria. Rankings of the serving cell and a neighbor cell may be respectively calculated by using Equation 2.

In operation 1$i$-75, the UE in the RRC idle mode or the RRC inactive mode may determine whether rangeToBestCell is configured in the system information. rangeToBestCell may be signaled in SIB2 and may be commonly used in reselecting intra-frequency/inter-frequency cells. Also, rangeToBestCell may be signaled in SIB4 and may be used only in reselecting an inter-frequency cell.

In operation 1$i$-80, the UE in the RRC idle mode or the RRC inactive mode may reselect a highest-ranked cell, based on the rankings derived in operation 1$i$-70 (the UE shall perform cell reselection to the highest ranked cell). In order for the UE to reselect a new cell (the highest-ranked cell), conditions below have to be satisfied.

A cell that satisfies the cell reselection criteria during a time interval TreselectionRAT has to be better than the current serving cell (the new cell is better than the serving cell according to the cell reselection criteria during a time interval Treselection$_{RAT}$).

At least 1 second has to have elapsed after the UE camped on the current serving cell.

The UE may reselect the cell that satisfies the condition above. In this regard, the UE may receive MIB and SIB1 broadcast from the cell, may determine that a cell status is "barred" is not indicated or is not to be treated as if the cell status is "barred" with respect to the cell, may newly derive a reception level and a reception quality of the cell, based on the received SIB1, may determine whether the reception level and the reception quality satisfy the cell reselection criteria ($S_{rxlev}$>0 AND $S_{qual}$>0), and then may finally reselect the cell.

In operation 1$i$-85, when absThreshSS-BlocksConsolidation is not configured with respect to a NR intra-frequency at which the one or more candidate target cells are present, or absThreshSS-BlocksConsolidation is not configured with respect to an equal-priority NR inter-frequency at which one or more candidate target cells are present, in operation 1$i$-90, the UE in the RRC idle mode or the RRC inactive mode may reselect a highest-ranked cell. In order for the UE to reselect a new cell (the highest-ranked cell), conditions below have to be satisfied.

A cell that satisfies the cell reselection criteria during a time interval TreselectionRAT has to be better than the current serving cell (the new cell is better than the serving cell according to the cell reselection criteria during a time interval Treselection$_{RAT}$).

At least 1 second has to have elapsed after the UE camped on the current serving cell.

The UE may receive MIB and SIB1 broadcast from the cell that satisfies the cell reselection criteria, may determine that a cell status is "barred" is not indicated or is not to be treated as if the cell status is "barred" with respect to the cell, may newly derive a reception level and a reception quality of the cell, based on the received SIB1, may determine whether the reception level and the reception quality satisfy the cell reselection criteria ($S_{rxlev}$>0 AND $S_{qual}$>0), and then may finally reselect the cell.

In operation 1*i*-85, when absThreshSS-BlocksConsolidation is configured with respect to a NR intra-frequency at which the one or more candidate target cells are present, and absThreshSS-BlocksConsolidation is configured with respect to all equal-priority NR inter-frequencies at which one or more candidate target cells are present, in operation 1*i*-95, the UE in the RRC idle mode or the RRC inactive mode may perform cell reselection on a cell with the highest number of beams above the threshold (i.e. absThreshSS-BlocksConsolidation) from among cells whose R value is within rangeToBestCell of the R value of the highest-ranked cell. In order for the UE to reselect a new cell (the highest-ranked cell) that satisfies the conditions, conditions below have to be satisfied.

The new cell that satisfies the cell reselection criteria during a time interval TreselectionRAT has to be better than the current serving cell (the new cell is better than the serving cell according to the cell reselection criteria during a time interval $Treselection_{RAT}$).

At least 1 second has to have elapsed after the UE camped on the current serving cell.

When one cell satisfies the conditions above, the UE may determine the one cell as a final candidate cell and thus may reselect the one cell. When a plurality of cells satisfy the conditions above, the UE may determine a highest-ranked cell as a final candidate cell, the highest-ranked cell being from among the plurality of cells, and thus may reselect the highest-ranked cell (If there are multiple such cells, the UE shall perform cell reselection to the highest ranked cell among them). The UE may receive MIB and SIB1 broadcast from the final candidate cell, may determine that a cell status is "barred" is not indicated or is not to be treated as if the cell status is "barred" with respect to the final candidate cell, may newly derive a reception level and a reception quality of the final candidate cell, based on the received SIB1, may determine whether the reception level and the reception quality satisfy the cell reselection criteria ($S_{rxlev}$>0 AND $S_{qual}$>0), and then may finally reselect the final candidate cell.

Alternatively, in operation 1*i*-85, when absThreshSS-BlocksConsolidation is configured with respect to at least one equal-priority NR inter-frequency at which one or more candidate target cells derived in operation 1*i*-55 are present, or absThreshSS-BlocksConsolidation is configured with respect to a NR intra-frequency, in operation 1*i*-95, the UE in the RRC idle mode or the RRC inactive mode may perform cell reselection on a cell with the highest number of beams above the threshold (i.e. absThreshSS-BlocksConsolidation) from among cells whose R value is within rangeToBestCell of the R value of the highest-ranked cell.

In this regard, the UE may apply the cell reselection criteria to a frequency for which absThreshSS-BlocksConsolidation is not configured, by applying a value of absThreshSS-BlocksConsolidation configured with respect to at least one NR inter-frequency. The value of absThreshSS-BlocksConsolidation may be any value, a smallest value, or a greatest value from among configured values. In order for the UE to reselect a new cell (a highest-ranked cell) that satisfies the conditions, conditions below have to be satisfied.

A cell that satisfies the cell reselection criteria during a time interval $Treselection_{RAT}$ has to be better than the current serving cell (the new cell is better than the serving cell according to the cell reselection criteria during a time interval $Treselection_{RAT}$).

At least 1 second has to have elapsed after the UE camped on the current serving cell.

When one cell satisfies the conditions above, the UE may determine the one cell as a final candidate cell and thus may reselect the one cell. When a plurality of cells satisfy the conditions above, the UE may determine a highest-ranked cell as a final candidate cell, the highest-ranked cell being from among the plurality of cells, and thus may reselect the highest-ranked cell (If there are multiple such cells, the UE shall perform cell reselection to the highest ranked cell among them). The UE may receive MIB and SIB1 broadcast from the final candidate cell, may determine that a cell status is "barred" is not indicated or is not to be treated as if the cell status is "barred" with respect to the final candidate cell, may newly derive a reception level and a reception quality of the final candidate cell, based on the received SIB1, may determine whether the reception level and the reception quality satisfy the cell reselection criteria (Srxlev>0 AND Squal>0), and then may finally reselect the final candidate cell.

Figure 1J:
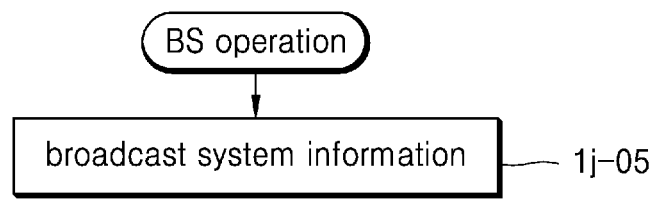
FIG. 1J is a diagram illustrating a method, performed by a base station (BS), of broadcasting system information, according to an embodiment of the disclosure.

FIG. 1J is a diagram illustrating a method, performed by a BS, of broadcasting system information, according to an embodiment of the disclosure.

In operation 1*j*-05, the BS or a cell may broadcast system information.

In operation 1*j*-05, when the BS or the cell configures rangeToBestCell in SIB2 and broadcasts the system information, the BS or the cell may configure absThreshSS-BlocksConsolidation in SIB2 or SIB4 by using one or more methods below and may broadcast the system information.

Method 1: The BS or the cell configures absThreshSS-BlocksConsolidation in SIB2 and configures, in SIB4, absThreshSS-BlocksConsolidation with respect to an equal-priority NR inter-frequency.

Method 2: The BS or the cell configures absThreshSS-BlocksConsolidation in SIB2 and configures, in SIB4, absThreshSS-BlocksConsolidation with respect to an equal-priority NR inter-frequency to be a same value as absThreshSS-BlocksConsolidation configured in SIB2.

Method 3: When the BS or the cell does not configure absThreshSS-BlocksConsolidation in SIB2, the BS or the cell does not configure, in SIB4, absThreshSS-BlocksConsolidation with respect to an equal-priority NR inter-frequency. On the contrary, when absThreshSS-BlocksConsolidation with respect to an equal-priority NR inter-frequency is not configured in SIB4, the BS or the cell does not configure absThreshSS-BlocksConsolidation in SIB2.

Method 4: The BS or the cell may configure, in SIB4, absThreshSS-BlocksConsolidation with respect to at least one NR inter-frequency having different priority.

Method 5: When the BS or the cell configures absThreshSS-BlocksConsolidation, the BS or the cell may also configure nrfoSS-BlocksToAverage with respect to the same frequency.

In operation 1*j*-05, when the BS or the cell configures rangeToBestCell in SIB4 and broadcasts the system information, the BS or the cell may configure absThreshSS-BlocksConsolidation in SIB4 by using one or more methods below and may broadcast the system information.

Method 1: The BS or the cell may configure absThreshSS-BlocksConsolidation with respect to at least one frequency in a frequency list included in SIB4 and may broadcast the system information.

Method 2: The BS or the cell may configure both absThreshSS-BlocksConsolidation and nrofSS-Blocks-ToAverage with respect to at least one frequency in a frequency list included in SIB4 and may broadcast the system information.

Figure 1K:
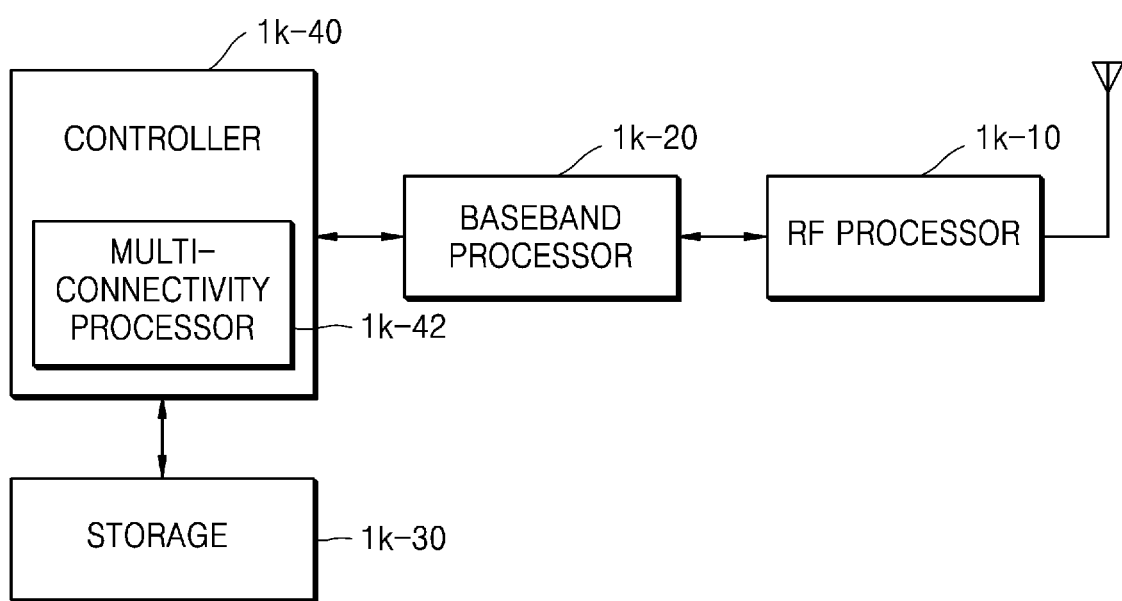
FIG. 1K is a block diagram illustrating an inner structure of a UE, according to an embodiment of the disclosure.

FIG. 1K is a block diagram illustrating an inner structure of a UE, according to an embodiment of the disclosure.

Referring to FIG. 1K, the UE may include a radio frequency (RF) processor 1k-10, a baseband processor 1k-20, a storage 1k-30, and a controller 1k-40 including a multi-connectivity processor 1k-42. However, the UE is not limited thereto and may include more or less elements compared to the elements illustrated in FIG. 1K.

According to an embodiment of the disclosure, the RF processor 1k-10 performs functions for transmitting and receiving signals through wireless channels, e.g., band conversion and amplification of the signals. That is, the RF processor 1k-10 may up-convert a baseband signal provided from the baseband processor 1k-20, into an RF band signal and then may transmit the RF band signal through an antenna, and may down-convert an RF band signal received through the antenna, into a baseband signal. For example, the RF processor 1k-10 may include a transmit filter, a receive filter, an amplifier, a mixer, an oscillator, a digital-to-analog convertor (DAC), an analog-to-digital convertor (ADC), or the like. Although only one antenna is illustrated in FIG. 1K, the UE may include a plurality of antennas.

The RF processor 1k-10 may include a plurality of RF chains. Also, the RF processor 1k-10 may perform beamforming. For beamforming, the RF processor 1k-10 may adjust phases and intensities of respective signals that are transmitted or received through a plurality of antennas or antenna elements. The RF processor 1k-10 may perform a MIMO operation and may receive data of a plurality of layers in the MIMO operation. The RF processor 1k-10 may perform receive beam sweeping by appropriately configuring a plurality of antennas or antenna elements, or may adjust a direction and a beam width of a received beam to coordinate with a transmit beam, by the control of the controller 1k-40.

The baseband processor 1k-20 may perform conversion between a baseband signal and a bitstream based on physical layer specifications of a system. For example, for data transmission, the baseband processor 1k-20 may generate complex symbols by encoding and modulating a transmit bitstream. For data reception, the baseband processor 1k-20 may reconstruct a received bitstream by demodulating and decoding a baseband signal provided from the RF processor 1k-10. For example, according to an OFDM scheme, for data transmission, the baseband processor 1k-20 may generate complex symbols by encoding and modulating a transmit bitstream, may map the complex symbols to subcarriers, and then may configure OFDM symbols by performing inverse fast Fourier transformation (IFFT) and inserting a cyclic prefix (CP). For data reception, the baseband processor 1k-20 may segment a baseband signal provided from the RF processor 1k-10, into OFDM symbol units, may reconstruct signals mapped to subcarriers by performing fast Fourier transformation (FFT), and then may reconstruct a received bitstream by demodulating and decoding the signals.

The baseband processor 1k-20 and the RF processor 1k-10 transmit and receive signals in a manner described above. Accordingly, the baseband processor 1k-20 and the RF processor 1k-10 may also be called a transmitter, a receiver, a transceiver, or a communicator. At least one of the baseband processor 1k-20 or the RF processor 1k-10 may include a plurality of communication modules to support a plurality of different radio access technologies. At least one of the baseband processor 1k-20 or the RF processor 1k-10 may include different communication modules to process signals of different frequency bands. For example, the different radio access technologies may include a wireless local area network (WLAN) (e.g., IEEE 802.11), a cellular network (e.g., LTE), or the like. The different frequency bands may include a super-high frequency (SHF) (e.g., 2 NRHz or 1 NRHz) band and a millimeter wave (mmWave) (e.g., 60 GHz) band. The UE may transmit and receive signals to and from a base station by using the baseband processor 1k-20 and the RF processor 1k-10, and the signals may include control information and data.

The storage 1k-30 may store basic programs, application programs, and data, e.g., configuration information, for operations of the UE. The storage 1k-30 may provide the stored data upon request by the controller 1k-40. The storage 1k-30 may include any or a combination of storage media such as read-only memory (ROM), random access memory (RAM), a hard disk, a compact disc (CD)-ROM, and a digital versatile disc (DVD). The storage 1k-30 may include a plurality of memories.

The controller 1k-40 may control overall operations of the UE. For example, the controller 1k-40 transmits and receives signals through the baseband processor 1k-20 and the RF processor 1k-10. The controller 1k-40 records or reads data on or from the storage 1k-30. To this end, the controller 1k-40 may include at least one processor. For example, the controller 1k-40 may include a communication processor (CP) for controlling communications and an application processor (AP) for controlling an upper layer such as an application program. Also, the controller 1k-40 may control the UE to perform the aforementioned method of performing cell reselection. At least one element in the UE may be implemented as a chip.

Figure 1L:
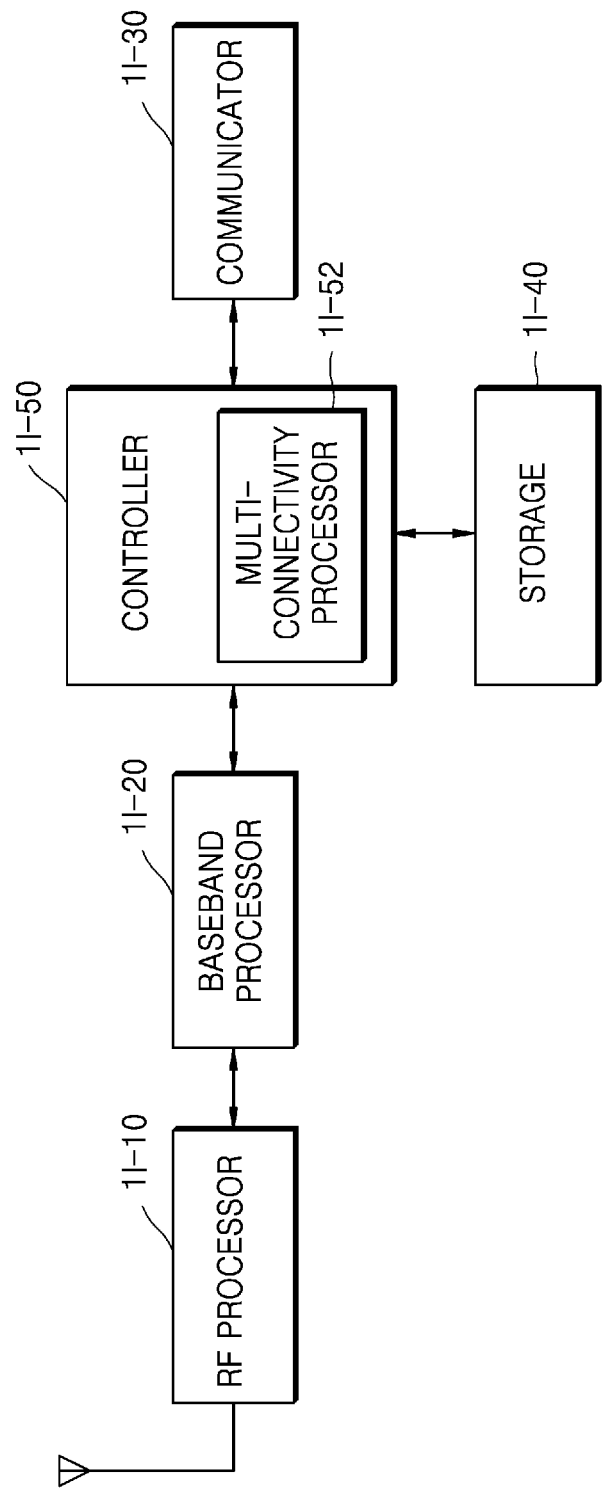
FIG. 1L is a block diagram illustrating a configuration of a BS, according to an embodiment of the disclosure.

FIG. 1L is a block diagram illustrating a configuration of a BS, according to an embodiment of the disclosure.

Referring to FIG. 1L, the BS may include an RF processor 1l-10, a baseband processor 1l-20, a communicator 1l-30, a storage 1l-40, and a controller 1l-50 including a multi-connectivity processor 1l-52. However, the BS is not limited thereto and may include more or less elements compared to the elements illustrated in FIG. 1L.

The RF processor 1l-10 may perform functions for transmitting and receiving signals through wireless channels, e.g., band conversion and amplification of the signals. The RF processor 1l-10 may up-convert a baseband signal provided from the baseband processor 1l-20, into an RF band signal and then may transmit the RF band signal through an antenna, and may down-convert an RF band signal received through an antenna, into a baseband signal. For example, the RF processor 1l-10 may include a transmit filter, a receive filter, an amplifier, a mixer, an oscillator, a DAC, an ADC, or the like. Although only one antenna is illustrated in FIG. 1L, the BS may include a plurality of antennas. The RF processor 1l-10 may include a plurality of RF chains. In addition, the RF processor 1l-10 may perform beamforming. For beamforming, the RF processor 1l-10 may adjust phases and intensities of signals to be transmitted or received through a plurality of antennas or antenna elements. The RF processor 1l-10 may perform a DL MIMO operation by transmitting data of one or more layers.

The baseband processor 1*l*-20 performs conversion between a baseband signal and a bitstream based on physical layer specifications of a first radio access technology. For example, for data transmission, the baseband processor 1*l*-20 may generate complex symbols by encoding and modulating a transmit bitstream. For data reception, the baseband processor 1*l*-20 may reconstruct a received bitstream by demodulating and decoding a baseband signal provided from the RF processor 1*l*-10. For example, according to an OFDM scheme, for data transmission, the baseband processor 1*l*-20 may generate complex symbols by encoding and modulating a transmit bitstream, may map the complex symbols to subcarriers, and then may configure OFDM symbols by performing IFFT and inserting a CP. For data reception, the baseband processor 1*l*-20 may segment a baseband signal provided from the RF processor 1*l*-10, into OFDM symbol units, may reconstruct signals mapped to subcarriers by performing FFT, and then may reconstruct a received bitstream by demodulating and decoding the signals. The baseband processor 1*l*-20 and the RF processor 1*l*-10 may transmit and receive signals as described above. As such, the baseband processor 1*l*-20 and the RF processor 1*l*-10 may also be called a transmitter, a receiver, a transceiver, a communicator, or a wireless communicator. The BS may transmit and receive signals to and from the UE by using the baseband processor 1*l*-20 and the RF processor 1*l*-10, and the signals may include control information and data.

The communicator 1*l*-30 may provide an interface for communicating with other nodes in a network. The communicator 1*l*-30 may be a backhaul communicator. The communicator 1*l*-30 may convert a bitstream to be transmitted from a primary BS to another node, e.g., a secondary BS or a core network, into a physical signal, and converts a physical signal received from the other node, into a bitstream.

The storage 1*l*-40 may store basic programs, application programs, and data, e.g., configuration information, for operations of the BS. In particular, the storage 1*l*-40 may store, for example, information about bearers assigned for a connected UE and measurement results reported from the connected UE. The storage 1*l*-40 may store criteria information used to determine whether to provide or release multiconnection to or from the UE. The storage 1*l*-40 provides the stored data upon request by the controller 1*l*-50. The storage 1*l*-40 may include any or a combination of storage media such as ROM, RAM, a hard disk, a CD-ROM, and a DVD. The storage 1*l*-40 may include a plurality of memories.

The controller 1*l*-50 controls overall operations of the BS. For example, the controller 1*l*-50 transmits and receives signals through the baseband processor 1*l*-20 and the RF processor 1*l*-10, or the communicator 1*l*-30. The controller 1*l*-50 records or reads data on or from the storage 1*l*-40. To this end, the controller 1*l*-50 may include at least one processor. Also, the controller 1*l*-50 may control the BS to perform the aforementioned method of performing cell reselection. At least one element of the BS may be implemented as a chip.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including RAM or flash memory, ROM, electrically erasable programmable read only memory (EEPROM), a magnetic disc storage device, a CD-ROM, DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access the electronic device.

In the afore-described embodiments of the disclosure, an element or elements included in the disclosure are expressed in a singular or plural form depending on the described embodiments of the disclosure. However, the singular or plural form is selected appropriately for a situation assumed for convenience of description, the disclosure is not limited to the singular or plural form, and an element expressed in a singular form may include a plurality of elements and elements expressed in a plural form may include a single element.

The embodiments of the disclosure provide a method and apparatus for efficiently providing a service in a mobile communication system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a user equipment (UE), of performing a cell reselection procedure, the method comprising:
   receiving priority information about one or more frequencies;
   performing a serving cell measurement based on a signal received from a serving cell;
   identifying at least one frequency among the one or more frequencies, based on the serving cell measurement and the priority information;
   performing ranking of cells related with the identified at least one frequency including a first frequency and a second frequency, based on measurements performed on the at least one frequency, wherein the cells fulfill cell selection criterion S, and a new radio (NR) frequency includes the first frequency and the second frequency; and
   performing cell reselection by selecting at least one cell with highest number of beams above a first threshold value, from among candidate cells,
   wherein the candidate cells include cells having rank values within a value of a rangeToBestCell parameter from a rank value of highest ranked cell among the ranked cells, wherein for the first frequency configured with an absThreshSS-BlocksConsolidation parameter, the first threshold value is the absThreshSS-BlocksConsolidation parameter, and wherein for the second frequency not configured with an absThreshSS-BlocksConsolidation parameter, the candidate cells include a cell on the second frequency, the cell on the second frequency has one beam, for which measurement is greater than the first threshold value.

2. The method of claim 1, further comprising:
when a priority of a NR inter-frequency or an inter-Radio Access Technology (RAT) frequency among the identified at least one frequency is higher than a priority of a frequency of the serving cell:
  selecting, from among at least one cell of the NR inter-frequency or the inter-RAT frequency, a cell whose signal quality or signal power measured during a preset duration is greater than a second threshold value, based on the performed measurement; and
when the priority of the NR inter-frequency or the inter-RAT frequency is lower than the priority of the frequency of the serving cell, and signal quality or signal power of the frequency of the serving cell is smaller than a third threshold value during the preset duration:
  selecting, from among the at least one cell of the NR inter-frequency or the inter-RAT frequency, a cell whose signal quality or signal power measured during the preset duration is greater than a fourth threshold value, based on the performed measurement.

3. The method of claim 2, wherein the cell reselection procedure is performed after at least 1 second has elapsed after the UE camped on the serving cell.

4. The method of claim 1, further comprising:
in case that the value of the rangeToBestCell parameter is not configured, selecting a highest-ranked cell among the ranked cells.

5. The method of claim 1, wherein the absThreshSS-BlocksConsolidation parameter is configured for the NR frequency.

6. A user equipment (UE) for performing a cell reselection procedure, the UE comprising:
a transceiver; and
a processor operatively coupled to the transceiver and configured to:
  receive priority information about one or more frequencies,
  perform a serving cell measurement based on a signal received from a serving cell,
  identify at least one frequency among the one or more frequencies, based on the serving cell measurement and the priority information,
  perform ranking of cells related with the identified at least one frequency including a first frequency and a second frequency, based on measurements performed on the at least one frequency, wherein the cells fulfill cell selection criterion S and a new radio (NR) frequency includes the first frequency and the second frequency, and
  perform cell reselection by selecting at least one cell with highest number of beams above a first threshold value, from among candidate cells,
wherein the candidate cells include cells having rank values within a value of a rangeToBestCell parameter from a rank value of highest ranked cell among the ranked cells,
wherein when an absThreshSS-BlocksConsolidation parameter is configured for the first frequency, the first threshold value is the absThreshSS-BlocksConsolidation parameter, and
wherein when an absThreshSS-BlocksConsolidation parameter is not configured for the second frequency, the candidate cells include a cell on the second frequency, the cell on the second frequency has one beam, for which measurement is greater than the first threshold value.

7. The UE of claim 6, wherein the processor is further configured to:
when a priority of NR inter-frequency or an inter-radio access technology (RAT) frequency among the identified at least one frequency is higher than a priority of a frequency of the serving cell:
  select, from among at least one cell of the NR inter-frequency or the inter-RAT frequency, a cell whose signal quality or signal power measured during a preset duration is greater than a second threshold value, based on the performed measurement, and
when the priority of the NR inter-frequency or the inter-RAT frequency is lower than the priority of the frequency of the serving cell, and signal quality or signal power of the frequency of the serving cell is smaller than a third threshold value during the preset duration:
  select, from among the at least one cell of the NR inter-frequency or the inter-RAT frequency, a cell whose signal quality or signal power measured during the preset duration is greater than a fourth threshold value, based on the performed measurement.

8. The UE of claim 7, wherein the processor is further configured to perform the cell reselection procedure after at least 1 second has elapsed after the UE camped on the serving cell.

9. The UE of claim 6, wherein the processor is further configured to:
in case that the value of the rangeToBestCell parameter is not configured, select a highest-ranked cell among the ranked cells.

10. The UE of claim 6, wherein the absThreshSS-BlocksConsolidation parameter is configured for the NR frequency.

* * * * *